United States Patent [19]

Nakae et al.

[11] Patent Number: 5,818,116
[45] Date of Patent: Oct. 6, 1998

[54] STARTING CONTROL APPARATUS FOR INTERNAL COMBUSTION ENGINE AND METHOD OF THE SAME

[75] Inventors: Koichi Nakae; Kiyoo Hirose, both of Susono; Tsuyoshi Mikami, Toyota; Ryuji Ibaraki, Toyota; Hiroshi Hata, Toyota, all of Japan

[73] Assignee: Toyota Jidosha kabushiki Kaisha, Toyota, Japan

[21] Appl. No.: 766,151

[22] Filed: Dec. 12, 1996

[30] Foreign Application Priority Data

Dec. 12, 1995 [JP] Japan .................................. 7-346683
Jul. 12, 1996 [JP] Japan .................................. 8-203239

[51] Int. Cl.$^6$ ........................................................ F02N 11/00
[52] U.S. Cl. ........................ 290/38 R; 322/16; 123/339.1
[58] Field of Search ................................... 290/38 R, 45, 290/46; 322/14, 15, 16; 123/436, 339.1

[56] References Cited

U.S. PATENT DOCUMENTS

| | | | |
|---|---|---|---|
| 4,779,595 | 10/1988 | Fujimori | 123/436 |
| 4,843,553 | 6/1989 | Ohata | 364/426.04 |
| 5,081,365 | 1/1992 | Field et al. | 290/45 |
| 5,256,959 | 10/1993 | Nagato et al. | 322/25 |
| 5,461,289 | 10/1995 | Boll | 180/65.2 |
| 5,497,741 | 3/1996 | Tashiro et al. | 123/192.1 |
| 5,529,040 | 6/1996 | Takeda et al. | 123/425 |
| 5,621,304 | 4/1997 | Kiuchi et al. | 322/18 |
| 5,650,713 | 7/1997 | Takeuchi et al. | 322/16 |
| 5,705,859 | 1/1998 | Karg et al. | 290/45 |

FOREIGN PATENT DOCUMENTS

| | | |
|---|---|---|
| 50-30223 | 3/1975 | Japan . |
| 1-151741 | 6/1989 | Japan . |
| 6-141405 | 5/1994 | Japan . |

*Primary Examiner*—Steven L. Stephan
*Assistant Examiner*—Nicholas Ponomarenko
*Attorney, Agent, or Firm*—Oblon, Spivak, McClelland, Maier & Neustadt, P.C.

[57] ABSTRACT

A starting control apparatus of the present invention prevents a variation in output torque of an internal combustion engine at a time of starting the internal combustion engine, while effectively reducing an emission. In response to a requirement for starting an engine (150) (S212), a controller (180) calculates an idle revolving speed Ni that is a target at a starting time and a required amount of the air Qi for maintaining the idle revolving speed Ni (S213). The idle revolving speed Ni and the required amount of the air Qi are respectively set equal to a target engine speed Ne* and a target amount of air intake Q* (S214). The controller (180) sets torque command values Tm1* and Tm2* of first and second motors MG1 and MG2, in order to enable the motors MG1 and MG2 to generate a cranking torque required for revolving the engine (150) at the target revolving speed Ne* (S216 and S218), and controls the first motor MG1 and the second motor MG2 (S220 and S222). The controller (180) subsequently adjusts the amount of air intake Q into the engine (150) to the target amount of air intake Q* by idle speed control (S224). After the revolving speed Ne of the engine (150) and the amount of air intake Q are stabilized, the controller (180) starts fuel injection control and ignition timing control (S230) to start the engine (150). The amount of fuel injection and the ignition timing are determined according to the target engine speed Ne* and the target amount of air intake Q*.

16 Claims, 32 Drawing Sheets

STARTING CONTROL APPARATUS FOR INTERNAL COMBUSTION ENGINE AND METHOD OF THE SAME

BACKGROUND OF THE INVENTION

1. Field of the Invention

The present invention relates to a starting control apparatus for an internal combustion engine that starts the internal combustion engine in response to a requirement for starting the internal combustion engine, and also to a method of the same.

2. Description of the Prior Art

One of known starting control apparatuses for an internal combustion engine is disclosed in JAPANESE PATENT LAID-OPEN GAZETTE No. 6-141405. This apparatus utilizes a technique of restricting an amount of air intake to a sufficiently little flow for a predetermined time period after a start of an internal combustion engine, thereby reducing a total flow of exhaust while the temperature of a catalytic converter in an exhaust system has not been sufficiently increased for effective activation. This technique effectively reduces an emission after the start of the internal combustion engine.

The conventional starting control apparatus for an internal combustion engine, however, only controls the amount of air intake after a start of the internal combustion engine, and still has a problem arising in ignition and combustion control at the time of starting the internal combustion engine.

A general procedure of controlling a start of an internal combustion engine includes a series of rather complicated steps; that is rotating the internal combustion engine with a starter motor to carry out fuel injection and ignition control, fully opening an idle speed control valve (hereinafter referred to as ISCV) for firing, and realizing a predetermined idle revolving speed. This general procedure is applied to the conventional starting control apparatuses as discussed above.

The starting control process drastically changes the revolving speed of the internal combustion engine from 250 to 300 [rpm] at the time of motoring with a starter motor, to approximately 1,300 [rpm] at the time of firing, and finally to approximately 800 [rpm] that is the idle revolving speed. This leads to a significant variation in amount of air intake into the internal combustion engine and thereby to a drastic change in torque output from the internal combustion engine before and after the start of the internal combustion engine.

In the control procedure of the prior art discussed above, wherein the control apparatus of the internal combustion engine estimates an amount of air intake and carries out a control to reduce the emission immediately after the start of the internal combustion engine, the significant change in amount of air intake results in inaccurate estimation and insufficient reduction of the emission.

SUMMARY OF THE INVENTION

The object of the present invention is thus to prevent a variation in output torque of an internal combustion engine at a time of starting the internal combustion engine, while effectively reducing an emission.

At least part of the object is realized by a starting control apparatus for an internal combustion engine, which includes: an internal combustion engine having an output shaft; a driving device linked with the output shaft; motoring means for controlling the driving device and motoring the internal combustion engine at a predetermined revolving speed in response to a requirement for starting the internal combustion engine; calculation means for calculating a value of a specified physical quantity among a plurality of physical quantities used for controlling the internal combustion engine, the value enabling the internal combustion engine to be stably driven at the predetermined revolving speed; and starter means for starting the motored internal combustion engine by a control corresponding to the value calculated by the calculation means.

The term 'revolving speed' here represents the number of revolutions per unit time and is equivalent to a speed of rotation. In the description hereinafter, the number of revolutions per unit time is simply referred to as the revolving speed. The starter means starts ignition and combustion of the internal combustion engine and carries out fuel supply control and ignition control to start the internal combustion engine.

This structure allows the control corresponding to the value calculated by the calculation means at the time of starting the internal combustion engine (more concretely, between immediately before and after a start of ignition and combustion). In the description hereafter, the term 'starting time' implies the very moment of a start of ignition and combustion as well as immediately before and after the start of ignition and combustion. This enables the internal combustion engine to be stably driven at the predetermined revolving speed, thereby effectively preventing a variation in torque output from the internal combustion engine at the time of starting the internal combustion engine.

In the starting control apparatus of the present invention, it is preferable that the predetermined revolving speed is an idle revolving speed. The idle revolving speed herein represents a revolving speed of the internal combustion engine at an idling time, when the internal combustion engine is driven at a low speed with no loading. This structure enables the internal combustion engine to be started immediately at the idle revolving speed.

In accordance with one preferable application, the driving device further includes: a first motor having a revolving shaft; a second motor connected in order to input and output a power from and to a drive shaft that is an object to be driven; and three shaft-type power input/output means having three shafts linked with the output shaft, the revolving shaft, and the drive shaft to allow transmission of powers therebetween, when powers input into or output from any two shafts among the three shafts are determined, the power input/output means automatically setting a power input into or output from a residual shaft based on the powers thus determined. The motoring means further includes motor control means for controlling the first motor and the second motor, so as to enable the three shaft-type power input/output means to output a required power for motoring to the output shaft.

This structure allows the internal combustion engine to be driven at driving points of high efficiency, thus improving the energy efficiency of the whole apparatus.

In this preferable structure, the motor control means may be provided with means for controlling the first motor, which accordingly outputs a predetermined power; and means for controlling the second motor, in order to cancel a variation power applied to the drive shaft via the three shaft-type power input/output means.

This structure effectively prevents a variation in torque on the drive shaft at the time of motoring.

In accordance with another preferable application of the present invention, the starting control apparatus further includes a drive shaft that is an object to be driven, and the internal combustion engine is mechanically linked with the drive shaft. In this structure, the predetermined revolving speed is a revolving speed that is determined based on a revolving speed of the drive shaft, and the value of the specified physical quantity calculated by the calculation means is a value that enables the internal combustion engine to be driven at the predetermined revolving speed with an output torque substantially equal to zero.

This structure effectively prevents a variation in output torque of the internal combustion engine, thereby preventing a variation in torque on the drive shaft mechanically linked with the internal combustion engine.

In this application, it is preferable that the starting control apparatus further includes: target torque setting means for setting a target value of the output torque of the internal combustion engine as a target torque; and engine torque increase means for controlling the internal combustion engine, so as to enable the output torque of the internal combustion engine to gradually increase from substantially zero to the target torque, after the starter means starting the internal combustion engine.

This structure prevents the torque output from the internal combustion engine from abruptly chanting after the start of the internal combustion engine.

It is also preferable that the starting control apparatus of this construction further includes motor torque decrease means for controlling the motor, so as to enable an output torque of the motor to gradually decrease, while the engine torque increase means carrying out the control.

This structure decreases the output torque of the motor to cancel the increase in output torque of the internal combustion engine, so that the sum of the output torque of the internal combustion engine and the output torque of the motor to be kept within a predetermined range. The torque acting on the drive shaft, which receives powers from both the internal combustion engine and the motor, is accordingly kept in a predetermined range. This results in a smooth variation in torque on the drive shaft.

In the starting control apparatus of the preferable construction, the driving device may include: a first motor having a revolving shaft; a second motor connected in order to input and output a power from and to a drive shaft that is an object to be driven; and three shaft-type power input/output means having three shafts linked with the output shaft of the internal combustion engine, the revolving shaft, and the drive shaft to allow transmission of powers therebetween, when powers input from or output to any two shafts among the three shafts are determined, the power input/output means automatically determining a power input from or output to a residual one shaft based on the powers previously determined. The motoring means further has motor control means for controlling the first motor and the second motor, so as to enable the three shaft-type power input/output means to output a power required for motoring to the output shaft.

This preferable structure allows the internal combustion engine to be driven at driving points of high efficiency, thus improving the energy efficiency of the whole apparatus.

In this preferable structure, the motor control means may be provided with means for controlling the first motor, which accordingly outputs a predetermined power; and means for controlling the second motor, in order to cancel a variation power applied to said drive shaft via the three shaft-type power input/output means.

This structure effectively prevents a variation in torque on the drive shaft at the time of motoring.

The starting control apparatus of the above preferable construction may further include: target power setting means for setting a target power to be input into the drive shaft and calculating the predetermined revolving speed and a target torque from the target power; and control means for controlling to enable the three shaft-type power input/output means, the first motor, and the second motor to output a power based on the internal combustion engine to drive shaft as the target power, after the starter means starting the internal combustion engine.

This structure enables the internal combustion engine to be controlled to a specific driving state, which is defined by the predetermined revolving speed and the target torque, after the start of the internal combustion engine. The power output from the internal combustion engine is thereby given to the drive shaft.

In accordance with still another preferable application, the starting control apparatus further includes: a vehicle; and transmission means mounted on the vehicle for transmitting an output of the motor to an axle of the vehicle.

This structure enables the axle of the vehicle to be stably driven and rotated by the motor at the time of starting or stopping the internal combustion engine.

In this preferable application, the starting control apparatus may further includes: a chargeable battery working as a power source of the motor; a generator for receiving a rotational force of the internal combustion engine and generating electricity supplied to the battery; and operation timing determination means for determining an operation timing of the internal combustion engine according to a remaining charge of the battery.

In this structure, the internal combustion engine is started whenever the remaining charge of the battery decreases to a predetermined level. This means that there are many opportunities of starting the engine, and the effects of preserving the environment and preventing a variation in torque are thus fully exerted.

The present invention is also directed to a first method of controlling a start of an internal combustion engine. The first method includes the steps of:

(a) motoring the internal combustion engine at a predetermined revolving speed in response to a requirement for starting the internal combustion engine; and (b) controlling a specified physical quantity among a plurality of physical quantities used for controlling the internal combustion engine, so as to enable the motored internal combustion engine to be driven at the predetermined revolving speed.

In the first method of the present invention, it is preferable that the predetermined revolving speed is an idle revolving speed.

The present invention is also directed to a second method of controlling a start of an internal combustion engine. The second method includes the steps of:

(a) setting a target revolving speed at a time of starting the internal combustion engine based on a revolving speed of a drive shaft mechanically linked with the internal combustion engine, in response to a requirement for starting the internal combustion engine;

(b) motoring the internal combustion engine at the target revolving speed set in the step (a); and (c) controlling a specified physical quantity among a plurality of physical quantities used for controlling the internal combustion engine, so as to enable the motored internal combustion engine to be driven at the target revolving speed with an output torque substantially equal to zero.

In accordance with one preferable application, the second method further includes the steps of:

(d) setting a target value of the output torque of the internal combustion engine as a target torque; and (e) controlling the internal combustion engine, so as to enable the output torque of the internal combustion engine to gradually increase from substantially zero to the target torque set in the step (f), after a start of the internal combustion engine.

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
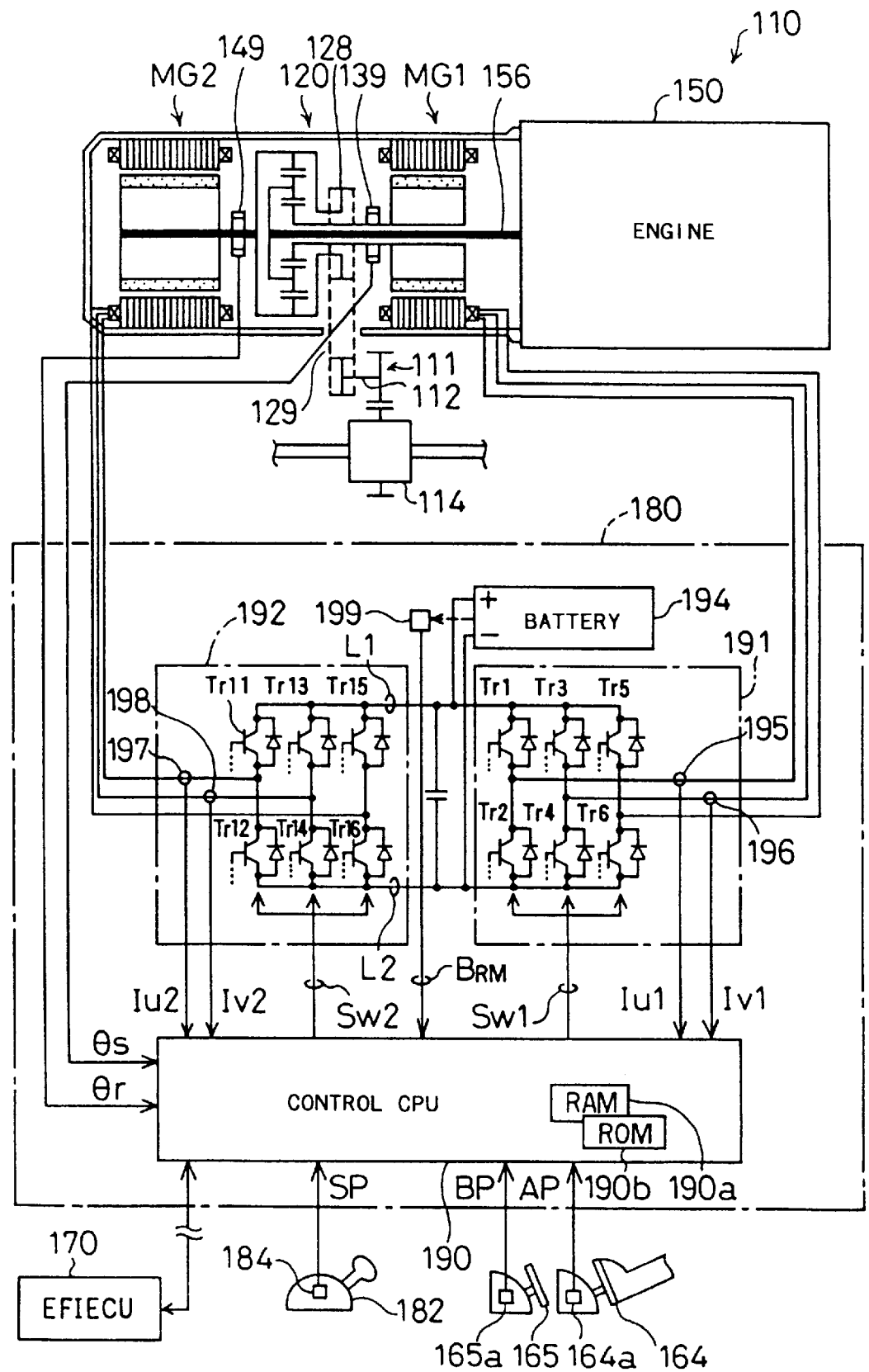
FIG. 1 schematically illustrates structure of a power output apparatus 110 functioning as a starting control apparatus of a first embodiment according to the present invention.

Modes of carrying out the present invention are described below as preferred embodiments.

1. First Embodiment

A starting control apparatus illustrated as a first embodiment according to the present invention is applied to a hybrid automobile having a mechanical distribution mechanism for distributing kinetic energy evolved from an engine into kinetic energy for driving an axle and electrical energy for driving a motor. The following description includes (1) hardware structure (2) principle of operation (3) operation control (4) process of controlling torque in ordinary driving mode (5) process of controlling torque in motor driving mode (6) other processes of torque control, which all relate to the hybrid automobile, and (7) engine-starting control, which regards the principle of the present invention.

(1) Hardware Structure

Figure 2:
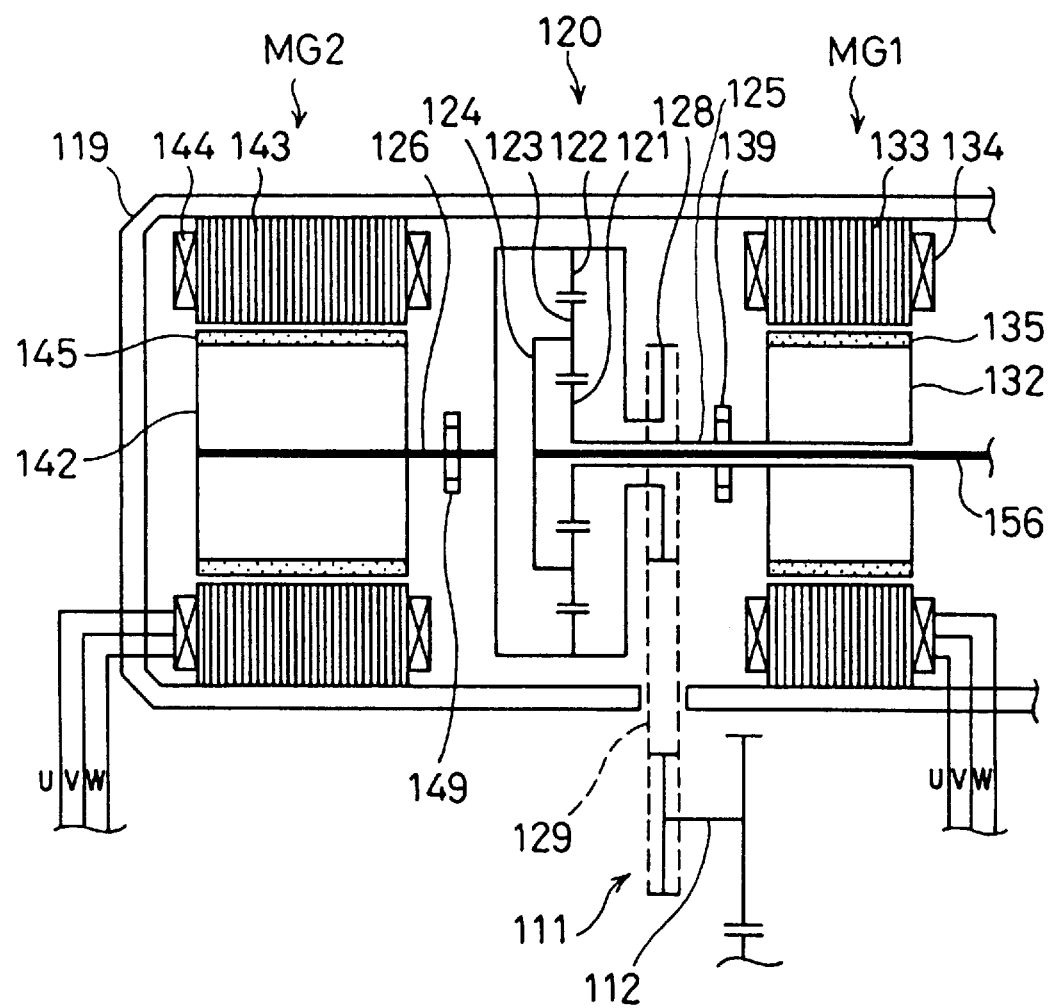
FIG. 2 is an enlarged view illustrating an essential part of the power output apparatus 110 of FIG. 1.
Figure 3:
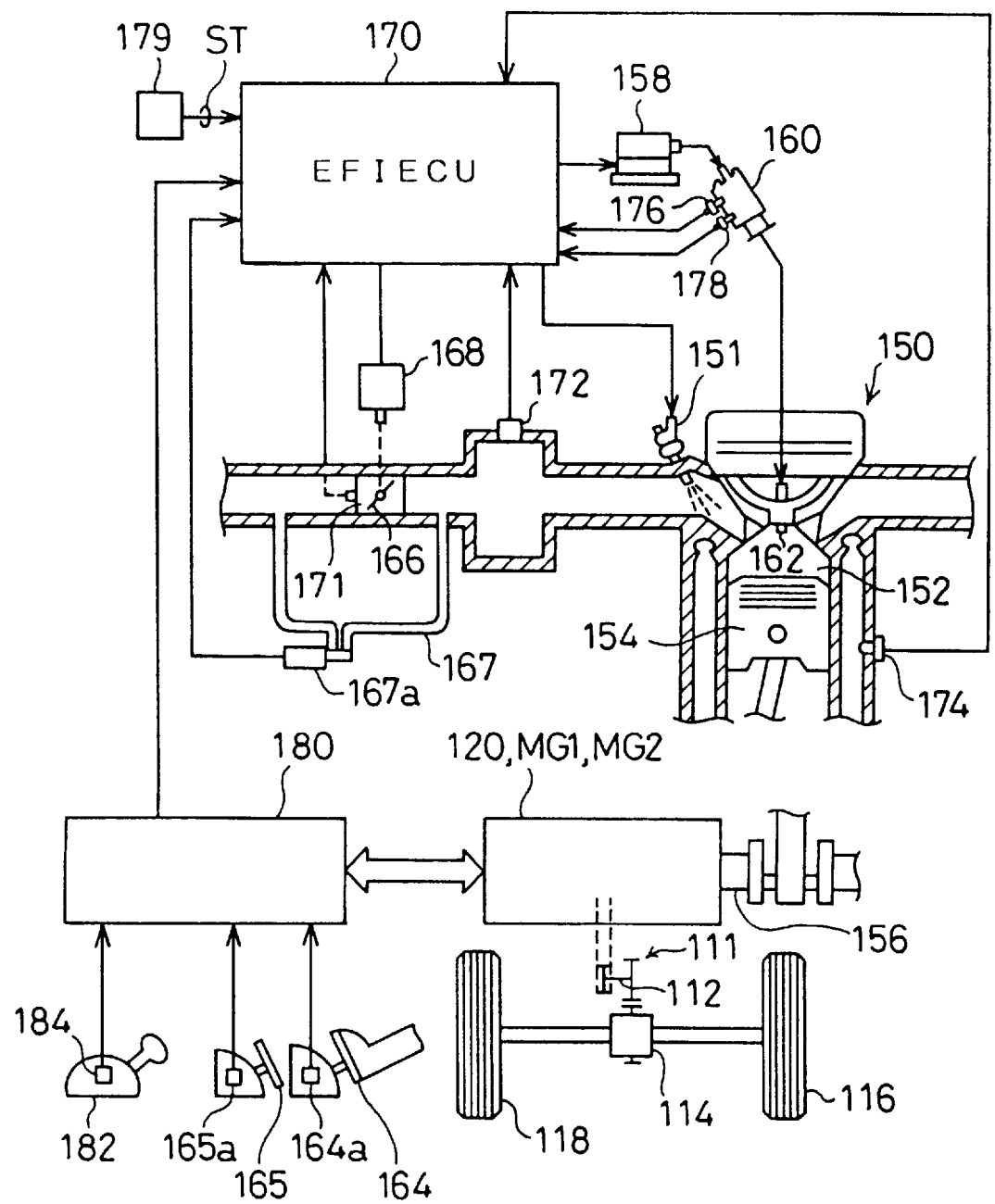
FIG. 3 is a schematic view illustrating general structure of a vehicle with the power output apparatus 110 of FIG. 1 incorporated therein.

FIG. 1 schematically illustrates structure of a power output apparatus 110 functioning as a starting control apparatus of a first embodiment according to the present invention; FIG. 2 is an enlarged view illustrating an essential part of the power output apparatus 110 of FIG. 1; and FIG. 3 is a schematic view illustrating general structure of a vehicle with the power output apparatus 110 of FIG. 1 incorporated therein. The general structure of the vehicle is described first for the convenience of description.

Referring to FIG. 3, the vehicle is provided with an engine 150 which consumes gasoline as a fuel and outputs power. The air ingested from an air supply system via a throttle valve 166 is mixed with a fuel, that is, gasoline in this embodiment, injected from a fuel injection valve 151. The air/fuel mixture is supplied into a combustion chamber 152 to be explosively ignited and burned. Linear motion of a piston 154 pressed down by the explosion of the air/fuel mixture is converted to rotational motion of a crankshaft 156. The throttle valve 166 is driven to open and close by a throttle actuator 168. An ignition plug 162 converts a high voltage applied from an igniter 158 via a distributor 160 to a spark, which explosively ignites and combusts the air/fuel mixture.

The air supply system of the engine 150 is further provided with a bypass passage 167 that makes a circuit round a portion of air ingestion with the throttle valve 166. An idle speed control valve (hereinafter referred to as ISCV) 167a is disposed in the bypass passage 167. The ISCV 167a has a valve disc having an excellent high-speed response and its valve travel controlled by a linear solenoid, and outputs a duty signal, which has a duty ratio corresponding to a ratio of closing time to opening time of the valve disc, to the linear solenoid, so as to control the air flow with a high accuracy. The ISCV 167a enables the amount of intake air at the time of idling the engine 150 to be controlled at a high speed without using the throttle actuator 168 that generally includes a large-sized DC motor.

Operation of the engine 150 is controlled by an electronic control unit (hereinafter referred to as EFIECU) 170. The EFIECU 170 receives information from various sensors, which detect operating conditions of the engine 150. These sensors include a throttle position sensor 171 for detecting a valve travel or position of the throttle valve 166, a manifold vacuum sensor 172 for measuring a load applied to the engine 150, a water temperature sensor 174 for measuring the temperature of cooling water in the engine 150, and a speed sensor 176 and an angle sensor 178 mounted on the distributor 160 for measuring the revolving speed (the number of revolutions per a predetermined time period) and the rotational angle of the crankshaft 156. A starter switch 179 for detecting a starting condition ST of an ignition key (not shown) is also connected to the EFIECU 170. Other sensors and switches connecting with the EFIECU 170 are omitted from the illustration.

The crankshaft 156 of the engine 150 is mechanically linked with a power transmission gear 111, which has a drive shaft 112 as a rotating axis, via a planetary gear 120 and first and second motors MG1 and MG2 (described later in detail). The power transmission gear 111 is further linked with a differential gear 114, so that the power output from the power output apparatus 110 is eventually transmitted to left and right driving wheels 116 and 118. The first motor MG1 and the second motor MG2 are electrically connected to and controlled by a controller 180. The controller 180 includes an internal control CPU and receives inputs from a gearshift position sensor 184 attached to a gearshift 182, an accelerator position sensor 164a attached to an accelerator pedal 164, and a brake pedal position sensor 165a attached to a brake pedal 165, as described later in detail. The controller 180 sends and receives a variety of data and information to and from the EFIECU 170 through communication. Details of the control procedure including a communication protocol will be described later.

Referring to FIGS. 1 and 2, the power output apparatus 110 primarily includes the engine 150, the planetary gear 120 having a planetary carrier 124 mechanically linked with the crankshaft 156 of the engine 150, the first motor MG1 linked with a sun gear 121 of the planetary gear 120, the second motor MG2 linked with a ring gear 122 of the planetary gear 120, and the controller 180 for driving and controlling the first and the second motors MG1 and MG2.

The following describes structure of the planetary gear 120 and the first and the second motors MG1 and MG2 based on the drawing of FIG. 2. The planetary gear 120 includes the sun gear 121 linked with a hollow sun gear shaft 125 which the crankshaft 156 passes through, the ring gear 122 linked with a ring gear shaft 126 coaxial with the crankshaft 156, a plurality of planetary pinion gears 123 arranged between the sun gear 121 and the ring gear 122 to revolve around the sun gear 121 while rotating on its axis, and the planetary carrier 124 connecting with one end of the crankshaft 156 to support the rotating shafts of the planetary pinion gears 123. In the planetary gear 120, three shafts, that is, the sun gear shaft 125, the ring gear shaft 126, and the crankshaft 156 respectively connecting with the sun gear 121, the ring gear 122, and the planetary carrier 124, work as input and output shafts of the power. Determination of the power input to or output from any two shafts among the three shafts automatically determines the power input to or output from the residual one shaft. The details of the input and output operations of the power into or from the three shafts of the planetary gear 120 will be discussed later.

A power feed gear 128 for taking out the power is linked with the ring gear 122 and arranged on the side of the first motor MG1. The power feed gear 128 is further connected to the power transmission gear 111 via a chain belt 129, so that the power is transmitted between the power feed gear 128 and the power transmission gear 111.

The first motor MG1 is constructed as a synchronous motor-generator and includes a rotor 132 having a plurality of permanent magnets 135 on its outer surface and a stator 133 having three-phase coils 134 wound thereon to form a revolving magnetic field. The rotor 132 is linked with the sun gear shaft 125 connecting with the sun gear 121 of the planetary gear 120. The stator 133 is prepared by laying thin plates of non-directional electromagnetic steel one upon another and is fixed to a casing 119. The first motor MG1 works as a motor for rotating the rotor 132 through the interaction between a magnetic field produced by the permanent magnets 135 and a magnetic field produced by the three-phase coils 134, or as a generator for generating an electromotive force on either ends of the three-phase coils 134 through the interaction between the magnetic field produced by the permanent magnets 135 and the rotation of the rotor 132. The sun gear shaft 125 is further provided with a resolver 139 for measuring its rotational angle $\theta s$.

Like the first motor MG1, the second motor MG2 is also constructed as a synchronous motor-generator and includes a rotor 142 having a plurality of permanent magnets 145 on its outer surface and a stator 143 having three-phase coils 144 wound thereon to form a revolving magnetic field. The rotor 142 is linked with the ring gear shaft 126 connecting with the ring gear 122 of the planetary gear 120, whereas the stator 143 is fixed to the casing 119. The stator 143 of the motor MG2 is also produced by laying thin plates of non-directional electromagnetic steel one upon another. Like the first motor MG1, the second motor MG2 also works as a motor or a generator. The ring gear shaft 126 is further provided with a resolver 149 for measuring its rotational angle θr.

The controller 180 for driving and controlling the first and the second motor MG1 and MG2 has the following configuration. Referring back to FIG. 1, the controller 180 includes a first driving circuit 191 for driving the first motor MG1, a second driving circuit 192 for driving the second motor MG2, a control CPU 190 for controlling both the first and the second driving circuits 191 and 192, and a battery 194 including a number of secondary cells. The control CPU 190 is a one-chip microprocessor including a RAM 190a used as a working memory, a ROM 190b in which various control programs are stored, an input/output port (not shown), and a serial communication port (not shown) through which data are sent to and received from the EFIECU 170.

The control CPU 190 receives a variety of data via the input port. The input data include a rotational angle θs of the sun gear shaft 125 measured with the resolver 139, a rotational angle θr of the ring gear shaft 126 measured with the resolver 149, an accelerator pedal position AP (step-on amount of the accelerator pedal 164) output from the accelerator position sensor 164a, a brake pedal position BP (step-on amount of the brake pedal 165) output from the brake pedal position sensor 165a, a gearshift position SP output from the gearshift position sensor 184, values of currents Iu1 and Iv1 from two ammeters 195 and 196 disposed in the first driving circuit 191, values of currents Iu2 and Iv2 from two ammeters 197 and 198 disposed in the second driving circuit 192, and a remaining charge BRM of the battery 194 measured with a remaining charge meter 199. The remaining charge meter 199 may determine the remaining charge BRM of the battery 194 by any known method; for example, by measuring the specific gravity of an electrolytic solution in the battery 194 or the whole weight of the battery 194, by computing the currents and time of charge and discharge, or by causing an instantaneous short circuit between terminals of the battery 194 and measuring an internal resistance against the electric current.

The control CPU 190 outputs a first control signal SW1 for driving six transistors Tr1 through Tr6 working as switching elements of the first driving circuit 191 and a second control signal SW2 for driving six transistors Tr11 through Tr16 working as switching elements of the second driving circuit 192. The six transistors Tr1 through Tr6 in the first driving circuit 191 constitute a transistor inverter and are arranged in pairs to work as a source and a drain with respect to a pair of power lines L1 and L2. The three-phase coils (U,V,W) 134 of the first motor MG1 are connected to the respective contacts of the paired transistors in the first driving circuit 191. The power lines L1 and L2 are respectively connected to plus and minus terminals of the battery 194. The control signal SW1 output from the control CPU 190 thus successively controls the power-on time of the paired transistors Tr1 through Tr6. The electric currents flowing through the three-phase coils 134 undergo PWM (pulse width modulation) control to give quasi-sine waves, which enable the three-phase coils 134 to form a revolving magnetic field.

The six transistors Tr11 through Tr16 in the second driving circuit 192 also constitute a transistor inverter and are arranged in the same manner as the transistors Tr1 through Tr6 in the first driving circuit 191. The three-phase coils (U,V,W) 144 of the second motor MG2 are connected to the respective contacts of the paired transistors in the second driving circuit 191. The second control signal SW2 output from the control CPU 190 thus successively controls the power-on time of the paired transistors Tr11 through Tr16. The electric currents flowing through the three-phase coils 144 undergo PWM control to give quasi-sine waves, which enable the three-phase coils 144 to form a revolving magnetic field.

(2) Principle of Operation

Figure 4:
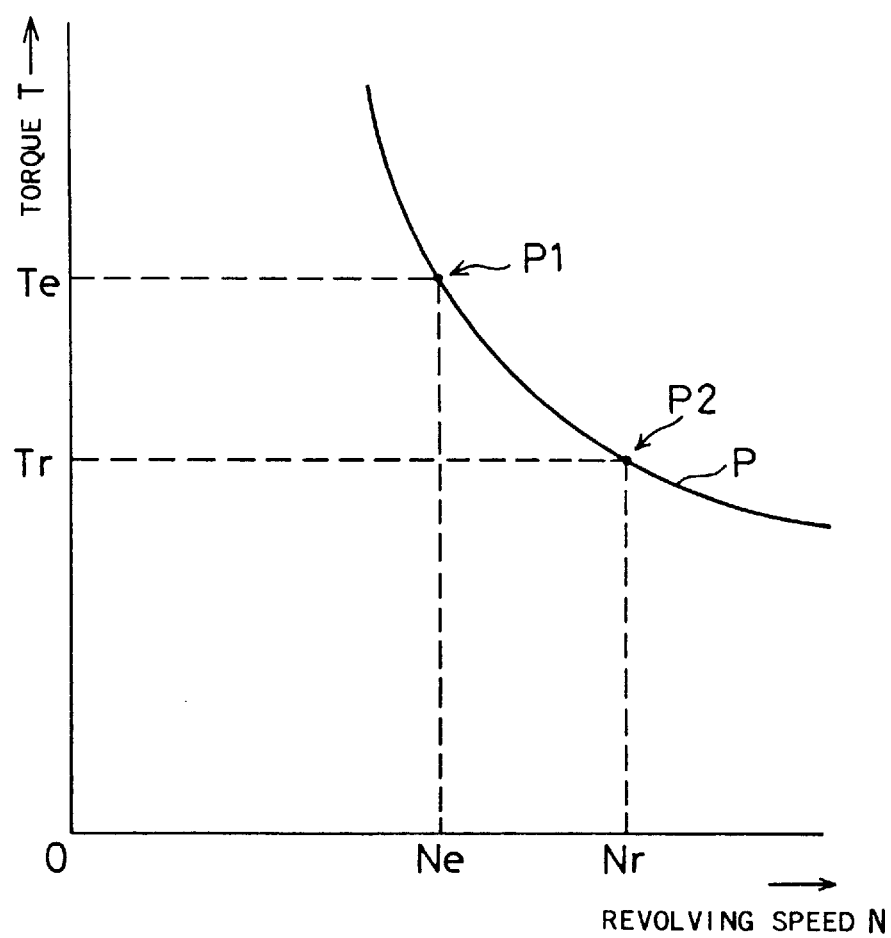
FIG. 4 is a graph showing the operation principle of the power output apparatus 110.

The power output apparatus 110 of the first embodiment thus constructed works in accordance with the operation principles discussed below, especially with the principle of torque conversion. By way of example, it is assumed that the engine 150 is driven at a driving point P1 having the revolving speed Ne and the torque Te and that the ring gear shaft 126 is driven at another driving point P2 having different revolving speed Nr and torque Tr but the same energy as an energy Pe output from the engine 150. This means that the power output from the engine 150 is subjected to torque conversion and applied to the ring gear shaft 126. The relationship between the torque and the revolving speed of the engine 150 and the ring gear shaft 126 under such conditions is shown in the graph of FIG. 4.

Figure 5:
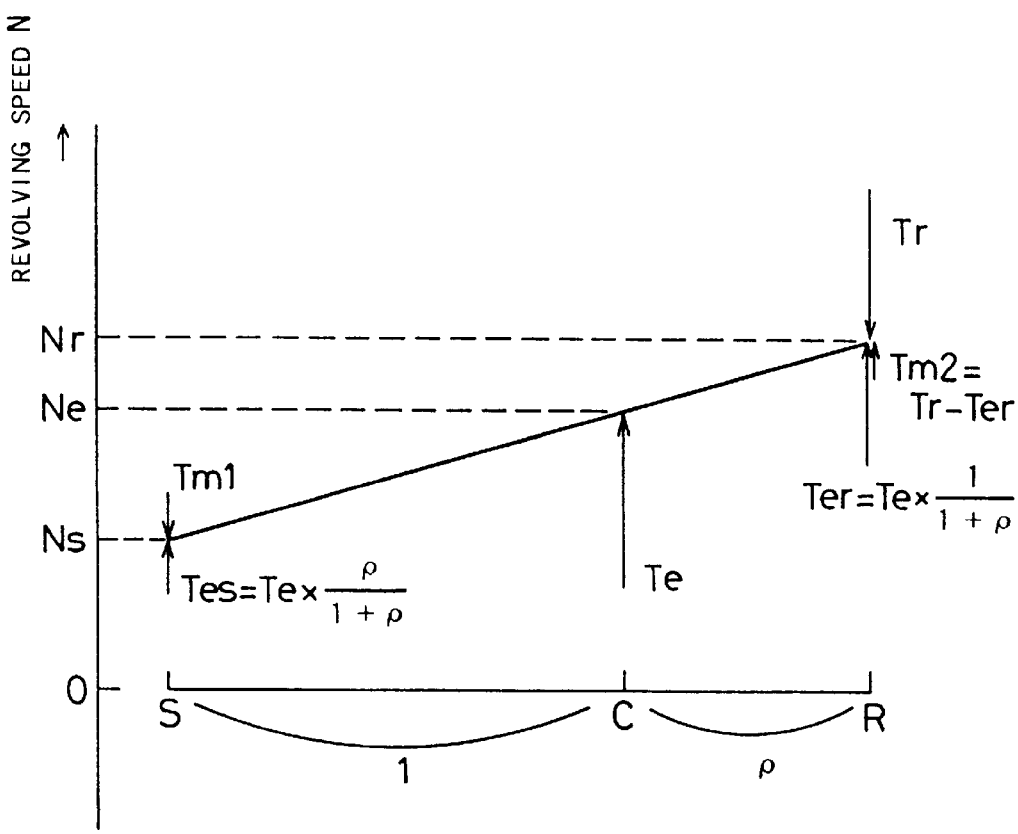
FIG. 5 is a nomogram showing the relationship between the revolving speed and the torque on the three shafts linked with the planetary gear 120.
Figure 6:
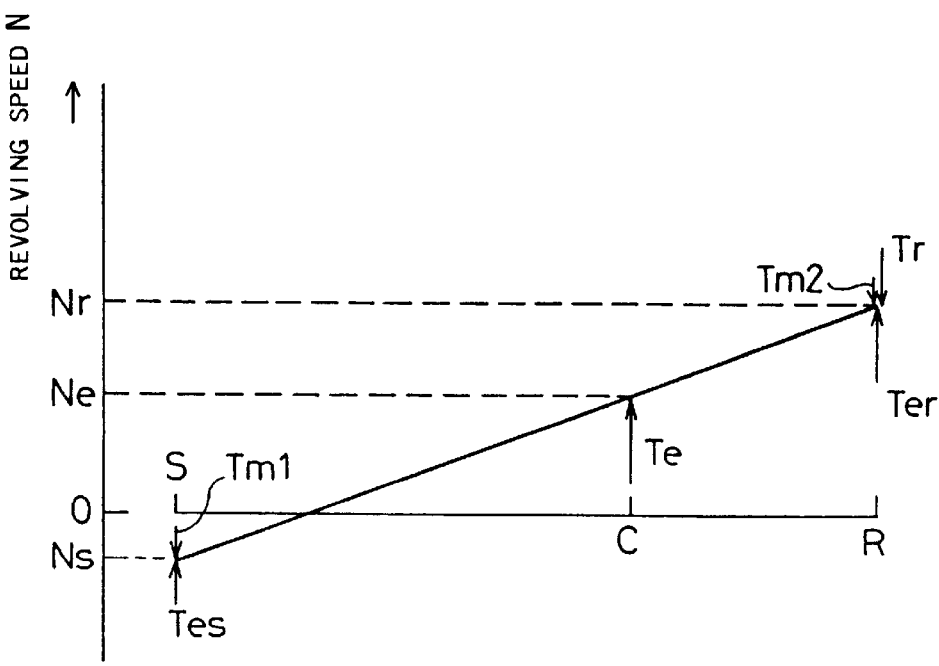
FIG. 6 is a nomogram showing the relationship between the revolving speed and the torque on the three shafts linked with the planetary gear 120.

According to the mechanics, the relationship between the revolving speed and the torque of the three shafts in the planetary gear 120 (that is, the sun gear shaft 125, the ring gear shaft 126, and the planetary carrier 124) can be expressed as nomograms illustrated in FIGS. 5 and 6 and solved geometrically. The relationship between the revolving speed and the torque of the three shafts in the planetary gear 120 may be analyzed numerically through calculation of energies of the respective shafts, without using the nomograms. For the clarity of explanation, the nomograms are used in the first embodiment.

In the graph of FIG. 5, the revolving speed of the three shafts is plotted as ordinate and the positional ratio of the coordinate axes of the three shafts as abscissa. When a coordinate axis S of the sun gear shaft 125 and a coordinate axis R of the ring gear shaft 126 are positioned on either ends of a line segment, a coordinate axis C of the planetary carrier 124 is given as an interior division of the axes S and R at the ratio of 1 to ρ, where ρ represents a ratio of the number of teeth of the ring gear 122 to that of the sun gear 121 and expressed as Equation (1) given below:

$$\rho = \frac{\text{the number of teeth of the sun gear}}{\text{the number of teeth of the ring gear}} \qquad (1)$$

As mentioned above, the engine 150 is driven at the revolving speed Ne, while the ring gear shaft 126 is driven at the revolving speed Nr. The revolving speed Ne of the engine 150 can thus be plotted on the coordinate axis C of the planetary carrier 124 linked with the crankshaft 156 of the engine 150, and the revolving speed Nr of the ring gear shaft 126 on the coordinate axis R of the ring gear shaft 126. A straight line passing through both the points is drawn, and a revolving speed Ns of the sun gear shaft 125 is then given as the intersection of this straight line and the coordinate axis S. This straight line is hereinafter referred to as dynamic collinear line. The revolving speed Ns of the sun gear shaft 125 can be calculated from the revolving speed Ne of the engine 150 and the revolving speed Nr of the ring gear shaft 126 according to a proportional expression given as Equation (2) below. In the planetary gear 120, the determination of the rotations of the two gears among the sun gear 121, the ring gear 122, and the planetary carrier 124 results in automatically setting the rotation of the residual one gear.

$$Ns = Nr - (Nr - Ne)\frac{1+\rho}{\rho} \quad (2)$$

The torque Te of the engine 150 is then applied (upward in the drawing) to the dynamic collinear line at the coordinate axis C of the planetary carrier 124 as a line of action. The dynamic collinear line against the torque can be handled as a rigid body to which a force is applied as a vector. Based on the technique of dividing the force into different lines of action having the same direction, the torque Te acting on the coordinate axis C is divided into a torque Tes on the coordinate axis S and a torque Ter on the coordinate axis R. The magnitudes of the torques Tes and Ter are given by Equations (3) and (4) below:

$$Tes = Te \times \frac{\rho}{1+\rho} \quad (3)$$

$$Ter = Te \times \frac{1}{1+\rho} \quad (4)$$

The equilibrium of forces on the dynamic collinear line is essential for the stable state of the dynamic collinear line. In accordance with a concrete procedure, a torque Tm1 having the same magnitude as but the opposite direction to the torque Tes is applied to the coordinate axis S, whereas a torque Tm2 having the same magnitude as but the opposite direction to a resultant force of the torque Ter and the torque that has the same magnitude as but the opposite direction to the torque Tr output to the ring gear shaft 126 is applied to the coordinate axis R. The torque Tm1 is given by the first motor MG1, and the torque Tm2 by the second motor MG2. The first motor MG1 applies the torque Tm1 in reverse of its rotation and thereby works as a generator to regenerate an electrical energy Pm1, which is given as the product of the torque Tm1 and the revolving speed Ns, from the sun gear shaft 125. The second motor MG2 applies the torque Tm2 in the direction of its rotation and thereby works as a motor to output an electrical energy or power Pm2, which is given as the product of the torque Tm2 and the revolving speed Nr, to the ring gear shaft 126.

In case that the electrical energy Pm1 is identical with the electrical energy Pm2, all the electric power consumed by the second motor MG2 can be supplied by the electric power regenerated by the first motor MG1. In order to attain such a state, all the input energy should be output; that is, the energy Pe output from the engine 150 should be equal to an energy Pr output to the ring gear shaft 126. Namely the energy Pe expressed as the product of the torque Te and the revolving speed Ne is made equal to the energy Pr expressed as the product of the torque Tr and the revolving speed Nr. Referring to FIG. 4, the power that is expressed as the product of the torque Te and the revolving speed Ne and output from the engine 150 driven at the driving point P1 is subjected to torque conversion and output to the ring gear shaft 126 as the power of the same energy but expressed as the product of the torque Tr and the revolving speed Nr. As discussed previously, the power output to the ring gear shaft 126 is transmitted to a drive shaft 112 via the power feed gear 128 and the power transmission gear 111, and further transmitted to the driving wheels 116 and 118 via the differential gear 114. A linear relationship is accordingly held between the power output to the ring gear shaft 126 and the power transmitted to the driving wheels 116 and 118. The power transmitted to the driving wheels 116 and 118 can thus be controlled by adjusting the power output to the ring gear shaft 126.

Although the revolving speed Ns of the sun gear shaft 125 is positive in the nomogram of FIG. 5, it may be negative according to the revolving speed Ne of the engine 150 and the revolving speed Nr of the ring gear shaft 126 as shown in the nomogram of FIG. 6. In the latter case, the first motor MG1 applies the torque in the direction of its rotation and thereby works as a motor to consume the electrical energy Pm1 given as the product of the torque Tm1 and the revolving speed Ns. The second motor MG2, on the other hand, applies the torque in reverse of its rotation and thereby works as a generator to regenerate the electrical energy Pm2, which is given as the product of the torque Tm2 and the revolving speed Nr, from the ring gear shaft 126. In case that the electrical energy Pm1 consumed by the first motor MG1 is made equal to the electrical energy Pm2 regenerated by the second motor MG2 under such conditions, all the electric power consumed by the first motor MG1 can be supplied by the electric power regenerated by the second motor MG2.

The operation principle discussed above is on the assumption that the efficiency of power conversion by the planetary gear 120, the motors MG1 and MG2, and the transistors Tr1 through Tr16 is equal to the value '1', which represents 100%. In the actual state, however, the conversion efficiency is less than the value '1', so that the energy Pe output from the engine 150 should be a little greater than the energy Pr output to the ring gear shaft 126 or alternatively the energy Pr output to the ring gear shaft 126 should be a little smaller than the energy Pe output from the engine 150. By way of example, the energy Pe output from the engine 150 may be calculated by multiplying the energy Pr output to the ring gear shaft 126 by the reciprocal of the conversion efficiency. In the state of the nomogram of FIG. 5, the torque Tm2 of the second motor MG2 is calculated by multiplying the electric power regenerated by the first motor MG1 by the efficiencies of both the motors MG1 and MG2. In the state of the nomogram of FIG. 6, on the other hand, the torque Tm2 of the second motor MG2 is calculated by dividing the electric power consumed by the first motor MG1 by the efficiencies of both the motors MG1 and MG2. In the planetary gear 120, there is an energy loss or heat loss due to a mechanical friction or the like, though the amount of energy loss is significantly smaller than the whole amount of energy concerned. The efficiency of the synchronous motors used for the first and the second motors MG1 and MG2 is substantially equal to the value '1'. Known devices such as GTOs applicable to the transistors Tr1 through Tr16 have extremely small ON-resistance. The efficiency of power conversion thus becomes practically equal to the value '1'. For the matter of convenience, in the following discussion of the embodiment, the efficiency is assumed to be equal to the value '1' (=100%) unless otherwise specified.

Other than the operation of carrying out the torque conversion for all the power output from the engine 150 and outputting the converted torque to the ring gear shaft 126 as discussed above, there are some possible operations; that is, an operation for adding electrical energy stored in the battery 194 to the power output from the engine 150 and outputting the total energy to the ring gear shaft 126 and another operation of storing part of the power output from the engine 150 into the battery 194. These alternative operations will be discussed later.

(3) Operation Control

Figure 7:
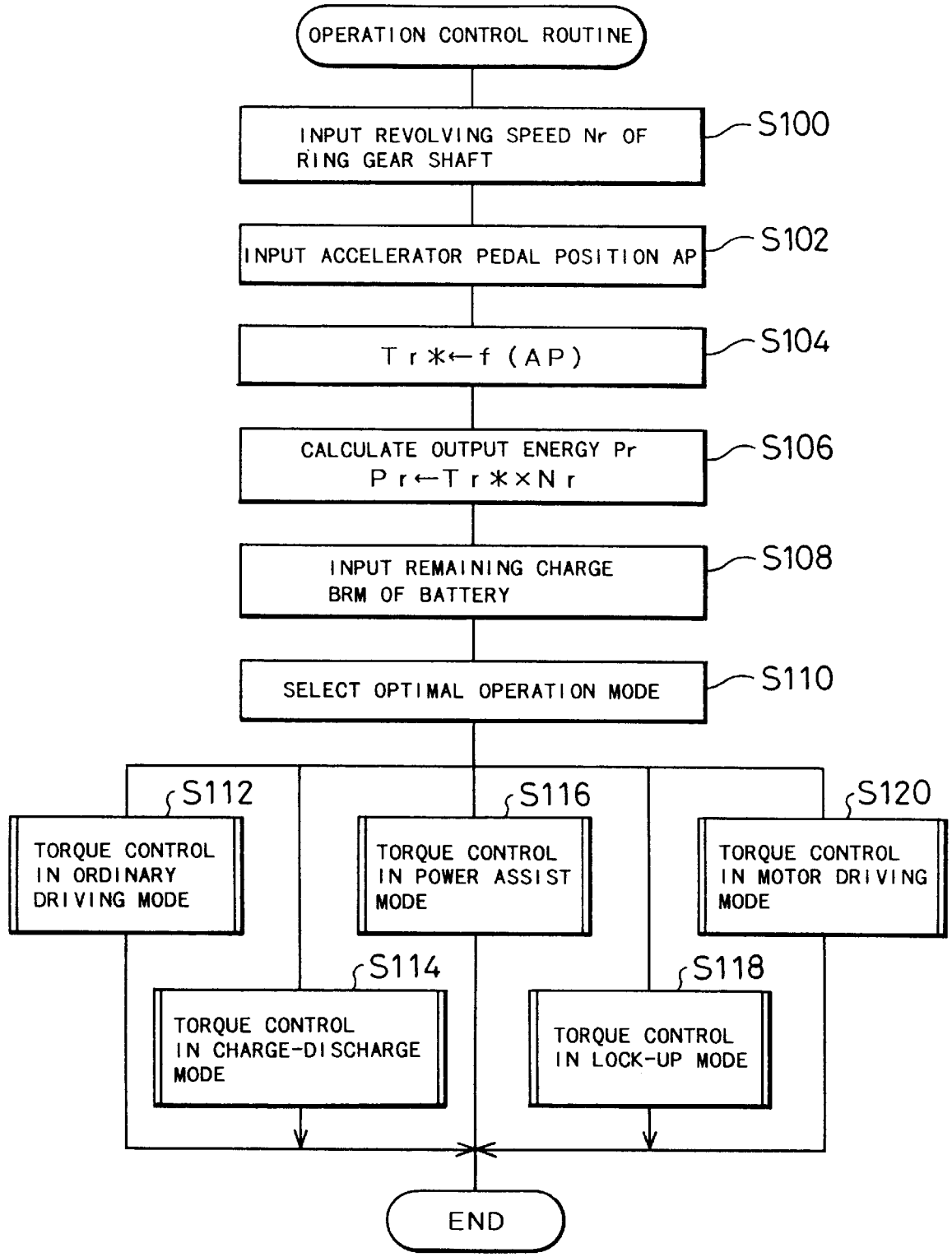
FIG. 7 is a flowchart showing an operation control routine executed by the control CPU 190 of the controller 180.

The following describes a concrete procedure of controlling operation of the power output apparatus 110, based on an operation control routine shown in the flowchart of FIG. 7. When the program enters the operation control routine, the control CPU 190 of the controller 180 first reads the revolving speed Nr of the ring gear shaft 126 at step S100.

The revolving speed Nr of the ring gear shaft 126 may be calculated from the rotational angle θr of the ring gear shaft 126 read from the resolver 149. The control CPU 190 then reads the accelerator pedal position AP detected by the accelerator position sensor 164a at step S102. The driver steps on the accelerator pedal 164 when feeling insufficiency of the output torque. The value of the accelerator pedal position AP accordingly represents the desired output torque (that is, the torque output to the driving wheels 116 and 118) which the driver requires.

Figure 8:
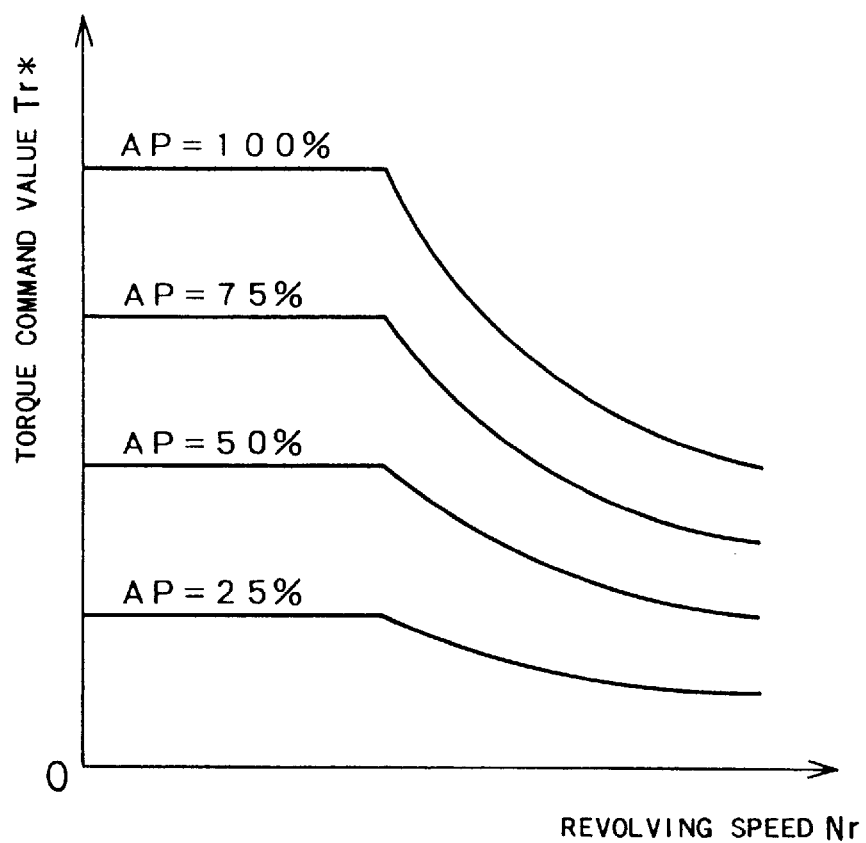
FIG. 8 is a map showing the relationship between the torque command value Tr*, the revolving speed Nr, and the accelerator pedal position AP.

The control CPU 190 subsequently determines a torque command value Tr* or a target torque to be output to the ring gear shaft 126, based on the input accelerator pedal position AP at step S104. Not the torque to be output to the driving wheels 116 and 118 but the torque to be output to the ring gear shaft 126 is calculated here from the accelerator pedal position AP. This is because the ring gear shaft 126 is mechanically linked with the driving wheels 116 and 118 via the power feed gear 128, the power transmission gear 111, and the differential gear 114 and the determination of the torque to be output to the ring gear shaft 126 thus results in determining the torque to be output to the driving wheels 116 and 118. In this embodiment, a map representing the relationship between the torque command value Tr*, the revolving speed Nr of the ring gear shaft 126, and the accelerator pedal position AP is prepared in advance and stored in the ROM 190b. The torque command value Tr* corresponding to the input accelerator pedal position AP and the input revolving speed Nr of the ring gear shaft 126 is read from the map. An example of such maps is shown in FIG. 8.

At next step S106, the control CPU 190 calculates an energy Pr to be output to the ring gear shaft 126 from the torque command value Tr* thus obtained and the input revolving speed Nr of the ring gear shaft 126 (Pr=Tr*×Nr). The program then proceeds to step S108 to read the remaining charge BRM of the battery 194 measured with the remaining charge meter 199 and to step S110 to determine the operation mode. The determination of the operation mode is carried out according to an operation mode determination routine shown in the flowchart of FIG. 9. The operation mode determination routine selects an optimal operation mode of the power output apparatus 110 under the current conditions based on the data read or calculated at steps S100 through S108 in the operation control routine of FIG. 7. The following describes a concrete procedure of determining the operation mode, based on the operation mode determination routine of FIG. 9.

When the program enters the operation mode determination routine, the control CPU 190 of the controller 180 first determines whether or not the remaining charge BRM of the battery 194 is within a specific range defined by a first threshold value BL and a second threshold value BH at step S130. When the remaining charge BRM is out of the specific range, the program determines the necessity for charge or discharge of the battery 194 and proceeds to step S132, at which a charge-discharge mode is selected as the optimal operation mode of the power output apparatus 110. The first threshold value BL and the second threshold value BH respectively represent a lower limit and an upper limit of the remaining charge BRM of the battery 194. In this embodiment, the first threshold value BL is set to be equal to or greater than a required amount of electric power for continuing operation only with the second motor MG2 in a motor driving mode (described later) or addition of electric power discharged from the battery 194 in a power assist mode (described later) for a predetermined time period. The second threshold value BH is, on the other hand, set to be equal to or less than a value obtained by subtracting an amount of electric power that is regenerated by the first motor MG1 or the second motor MG2 when the vehicle stops from an ordinary running state, from the remaining charge BRM at the time of full charge of the battery 194.

When the remaining charge BRM of the battery 194 is determined to be within the specific range defined by the first threshold value BL and the second threshold value BH at step S130, on the contrary, the program proceeds to step S134, at which the energy Pr to be output to the ring gear shaft 126 is compared with a maximum energy Pemax that can be output from the engine 150. When the output energy Pr exceeds the maximum energy Pemax, the program determines the necessity for supplementing the insufficiency of the maximum energy Pemax output from the engine 150 by the energy stored in the battery 194 and proceeds to step S136, at which a power assist mode is selected as the optimal operation mode of the power output apparatus 110.

Figure 10:
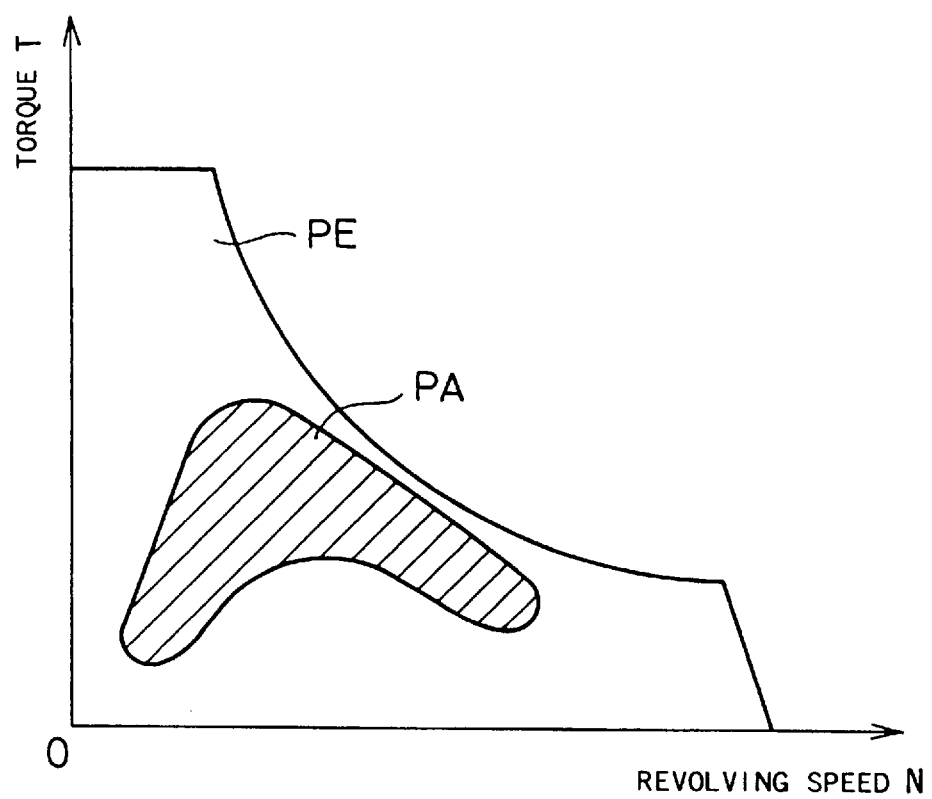
FIG. 10 shows an efficient operable range of the engine 150.

When the energy Pr to be output to the ring gear shaft 126 is equal to or less than the maximum energy Pemax that can be output from the engine 150 at step S134, on the other hand, the program goes to step S138, at which it is determined whether or not the torque command value Tr* and the revolving speed Nr are within a predetermined range. When the torque command value Tr* and the revolving speed Nr are within the predetermined range, a lock-up mode, in which rotation of the sun gear shaft 125 is stopped, is selected as the optimal operation mode of the power output apparatus 110 at step S140. The predetermined range herein represents a specific range that allows the engine 150 to be driven at a high efficiency while the sun gear 121 stops its rotation. In accordance with a concrete procedure, the relationship between the revolving speed of the ring gear shaft 126 and the torque output to the ring gear shaft 126 when the engine 150 is driven at respective driving points within the specific range, which allows the engine 150 to be driven at a high efficiency while the sun gear 121 stops its operation, is prepared in advance and stored as a map in the ROM 190b. It is accordingly determined at step S138 whether or not the driving point defined by the torque command value Tr* and the revolving speed Nr is within the range of the map. The specific range that allows the engine 150 to be driven at a high efficiency is illustrated as an example in FIG. 10. In the drawing of FIG. 10, the engine 150 can be driven in a range PE, whereas the engine 150 can be driven at a high efficiency in a range PA. The range PA depends upon the driving efficiency of the engine 150, the emission, and the other conditions and can be set in advance experimentally.

When it is determined that the torque command value Tr* and the revolving speed Nr of the ring gear shaft 126 are out of the predetermined range at step S138, the program further proceeds to step S142, at which it is determined whether or not the energy Pr to be output to the ring gear shaft 126 is smaller than a predetermined energy PML and whether or not the revolving speed Nr of the ring gear shaft 126 is lower than a predetermined revolving speed NML. When both the answers are YES at step S142, the program goes to step S144 to set a motor driving mode, in which only the second motor MG2 is driven, as the optimal operation mode of the power output apparatus 110. The engine 150 lowers its efficiency under the condition of low revolving speed and small torque. The predetermined energy PML and the predetermined revolving speed NML accordingly define a certain range, in which the driving efficiency of the engine 150 is smaller than a predetermined level. The concrete values of PML and NML are determined by taking into account the properties of the engine 150 and the gear ratio of the planetary gear 120. When the output energy Pr is equal to or greater than the predetermined energy PML or when the revolving speed Nr is equal to or higher than the predetermined revolving speed NML at step S142, the program proceeds to step S146, at which an ordinary driving mode is selected as the optimal operation mode of the power output apparatus 110 for ordinary driving.

Figure 9:
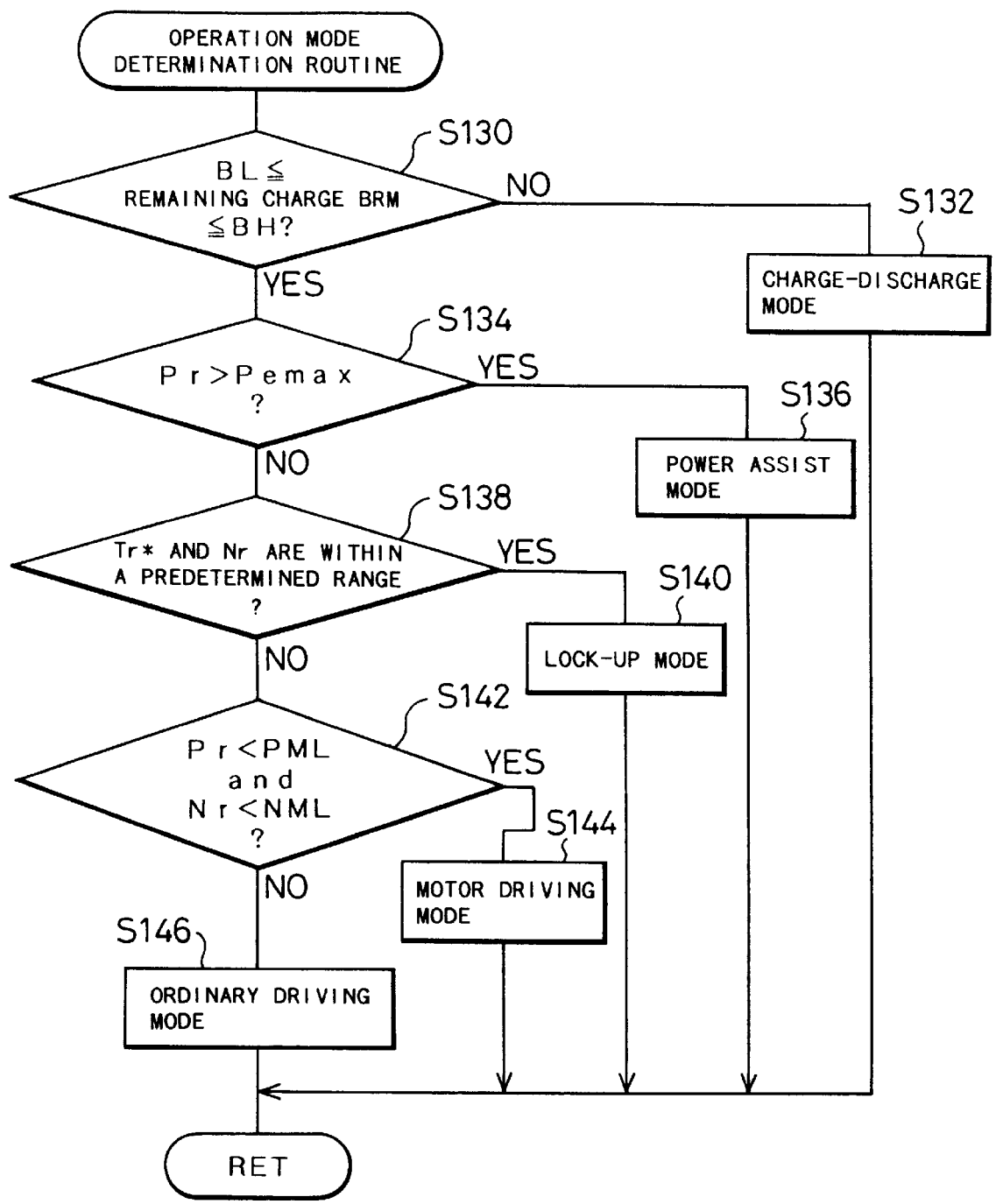
FIG. 9 is a flowchart showing an operation mode determination routine executed by the control CPU 190 of the controller 180.

Referring back to the operation control routine of FIG. 7, required processing is carried out, based on the results of the operation mode determination routine of FIG. 9. When the ordinary driving mode is selected as the optimal operation mode at step S110, a process of controlling the torque in the ordinary driving mode is executed at step S112. When the charge-discharge mode is selected, a process of controlling the torque in the charge-discharge mode is executed at step S114. When the power assist mode is selected, a process of controlling the torque in the power assist mode is executed at step S116. When the lock-up mode is selected, a process of controlling the torque in the lock-up mode is executed at step S118. When the motor driving mode is selected, a process of controlling the torque in the motor driving mode is executed at step S120. The following describes concrete procedures of such toque control processes.

(4) Process of Controlling Torque in Ordinary Driving Mode

Figure 11:
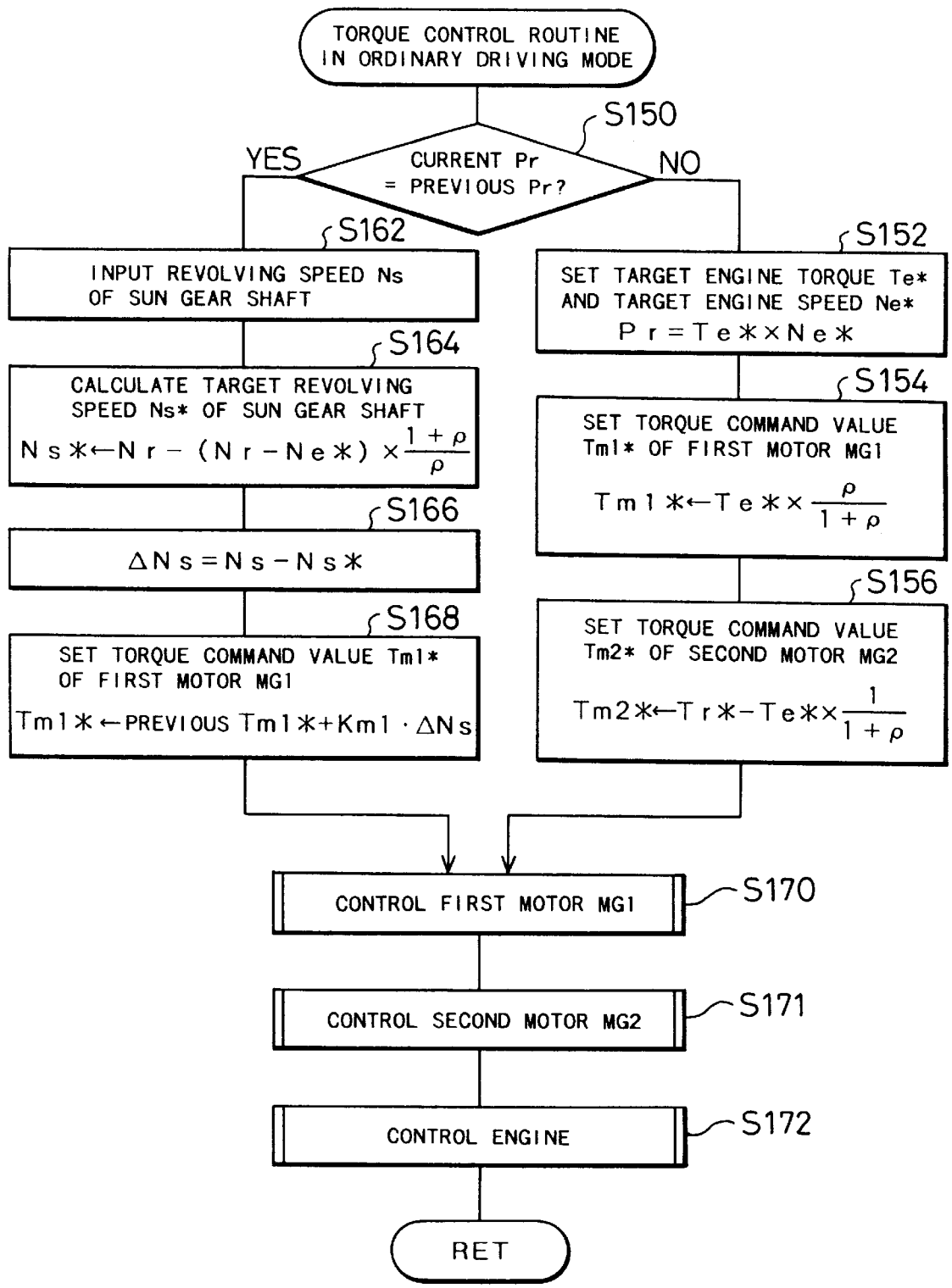
FIG. 11 is a flowchart showing a torque control routine in the ordinary driving mode executed by the control CPU 190 of the controller 180.

The process of controlling the torque in the ordinary driving mode at step S112 in the flowchart of FIG. 7 is carried out according to a routine of controlling the torque in the ordinary driving mode shown in the flowchart of FIG. 11. When the program enters the routine, at step S150, the control CPU 190 of the controller 180 first compares the energy Pr to be currently output to the ring gear shaft 126 with a previous value of energy Pr used in a previous cycle when this routine is activated the last time. The last time herein represents the latest time of activating the torque control routine in the ordinary driving mode shown in FIG. 11 in the continuous processing of step S112 in the operation control routine of FIG. 7. When the current output energy Pr is different from the previous value of energy Pr, the program executes the processing of steps S152 through S156 and steps S170 through S172. When the current output energy Pr is identical with the previous value of energy Pr, on the other hand, the program executes the processing of steps S162 through S172. The following describes first the processing when the current output energy Pr is different from the previous value of energy Pr and then the processing when the current output energy Pr is identical with the previous value of energy Pr.

When the current output energy Pr is different from the previous value of energy Pr, the control CPU 190 first sets a target engine torque Te* and a target engine speed Ne* of the engine 150 based on the energy Pr to be currently output to the ring gear shaft 126 at step S152. The energy supplied from the engine 150 is equal to the product of the torque Te and the revolving speed Ne of the engine 150, so that the relationship between the output energy Pr, the target engine torque Te*, and the target engine speed Ne* can be defined as Pr=Te*×Ne*. There are, however, numerous combinations of the target engine torque Te* and the target engine speed Ne* of the engine 150 satisfying the above relationship. In this embodiment, favorable combinations of the target torque Te* and the target revolving speed Ne* of the engine 150 are experimentally or otherwise determined in advance for the respective amounts of output energy Pr. In such favorable combinations, the engine 150 is driven at the highest possible efficiency and the driving state of the engine 150 is smoothly varied with a variation in output energy Pr.

The predetermined favorable combinations are stored in the form of a map in the ROM 190b. In practice, the combination of the target torque Te* and the target revolving speed Ne* of the engine 150 corresponding to the output energy Pr is read from the map at step S152. The following gives a further description of the map.

Figure 12:
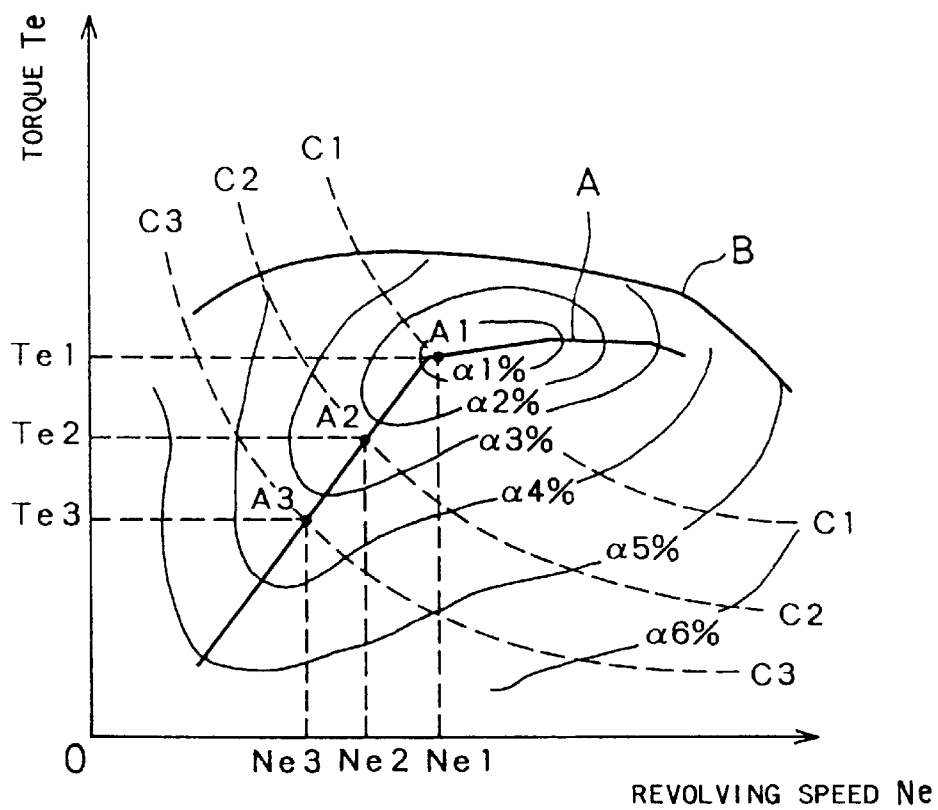
FIG. 12 is a graph illustrating the relationship between the driving point and the efficiency.

FIG. 12 is a graph showing the relationship between the driving point of the engine 150 (defined by the engine torque Te and the engine speed Ne) and the efficiency of the engine 150. The curve B in FIG. 12 represents a boundary of an engine-operable range, in which the engine 150 can be driven. In the engine-operable range, efficiency curves, such as curves α1 through α6, can be drawn by successively joining the driving points having the identical efficiency. In the engine-operable range, constant energy curves expressed as the product of the torque Te and the revolving speed Ne, such as curves C1—C1 through C3—C3, can also be drawn. The graph of FIG. 13 shows the efficiency of the respective driving points along the constant energy curves C1—C1 through C3—C3 plotted against the revolving speed Ne of the engine 150.

Figure 13:
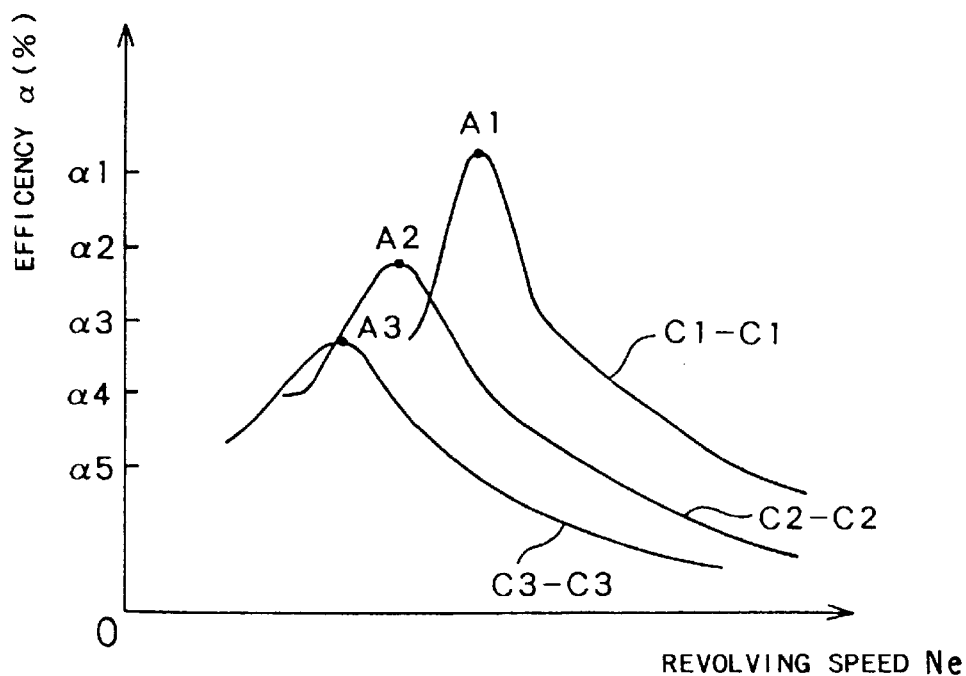
FIG. 13 is a graph showing the efficiencies of the engine 50 at various driving points along the constant-output energy curves, which are plotted against the revolving speed Ne of the engine 50.

Referring to FIG. 13, the efficiency of the engine 150 with respect to the same output energy is significantly varied by the driving point of the engine 150. On the constant energy curve C1—C1, for example, the efficiency of the engine 150 reaches its maximum when the engine 150 is driven at a driving point A1 (torque Te1 and revolving speed Ne1). Such a driving point attaining the highest possible efficiency exists on each constant energy curve; a driving point A2 for the constant energy curve C2—C2 and a driving point A3 for the constant energy curve C3—C3. The curve A in FIG. 12 is obtained by joining such driving points attaining the highest possible efficiency of the engine 150 for the respective amounts of output energy Pr by a continuous curve. In this embodiment, the map representing the relationship between each driving point (torque Te and revolving speed Ne) on the curve A and the output energy Pr is used at step S152 in the flowchart of FIG. 11 for setting the target torque Te* and the target revolving speed Ne* of the engine 150.

The curve A should be continuous because of the following reason. In case that discontinuous curves are used to set the driving point of the engine 150 against a variation in output energy Pr, the driving state of the engine 150 is abruptly varied with a variation in output energy Pr crossing over the discontinuous driving points. The abrupt variation may prevent the driving state from being smoothly shifted to a target level, thereby knocking or even stopping the vehicle. Each driving point on the continuous curve A may accordingly not correspond to the driving point attaining the highest possible efficiency on the constant energy curve.

After setting the target torque Te* and the target revolving speed Ne* of the engine 150 at step S152, the control CPU 190 calculates a torque command value Tm1* of the first motor MG1 based on the target engine torque Te* and the gear ratio ρ according to Equation (5) given below at step S154, and calculates a torque command value Tm2* of the second motor MG2 based on the torque command value Tr*, the target engine torque Te*, and the gear ratio ρ according to Equation (6) given below at step S156. Equations (5) and (6) can determine the torque command values Tm1* and Tm2* because of the balance on the dynamic collinear line as discussed above in the nomograms of FIGS. 5 and 6.

$$Tm1^* \leftarrow Te^* \times \frac{\rho}{1+\rho} \qquad (5)$$

-continued $$Tm2^* \leftarrow Tr^* - Te^* \times \frac{1}{1+\rho} \quad (6)$$

After setting the target torque Te* and the target revolving speed Ne* of the engine 150 and the torque command values Tm1* and Tm2* of the first and the second motors MG1 and MG2, the program proceeds to steps S170, S171, and S172 to control the first motor MG1, the second motor MG2, and the engine 150. As a matter of convenience of illustration, the control operations of the first motor MG1, the second motor MG2, and the engine 150 are shown as separate steps. In the actual procedure, however, these control operations are carried out simultaneously. By way of example, the control CPU 190 simultaneously controls the first motor MG1 and the second motor MG2 by utilizing an interrupting process, while transmitting an instruction to the EFIECU 170 through communication in order to allow the EFIECU 170 to control the engine 150 concurrently.

Figure 14:
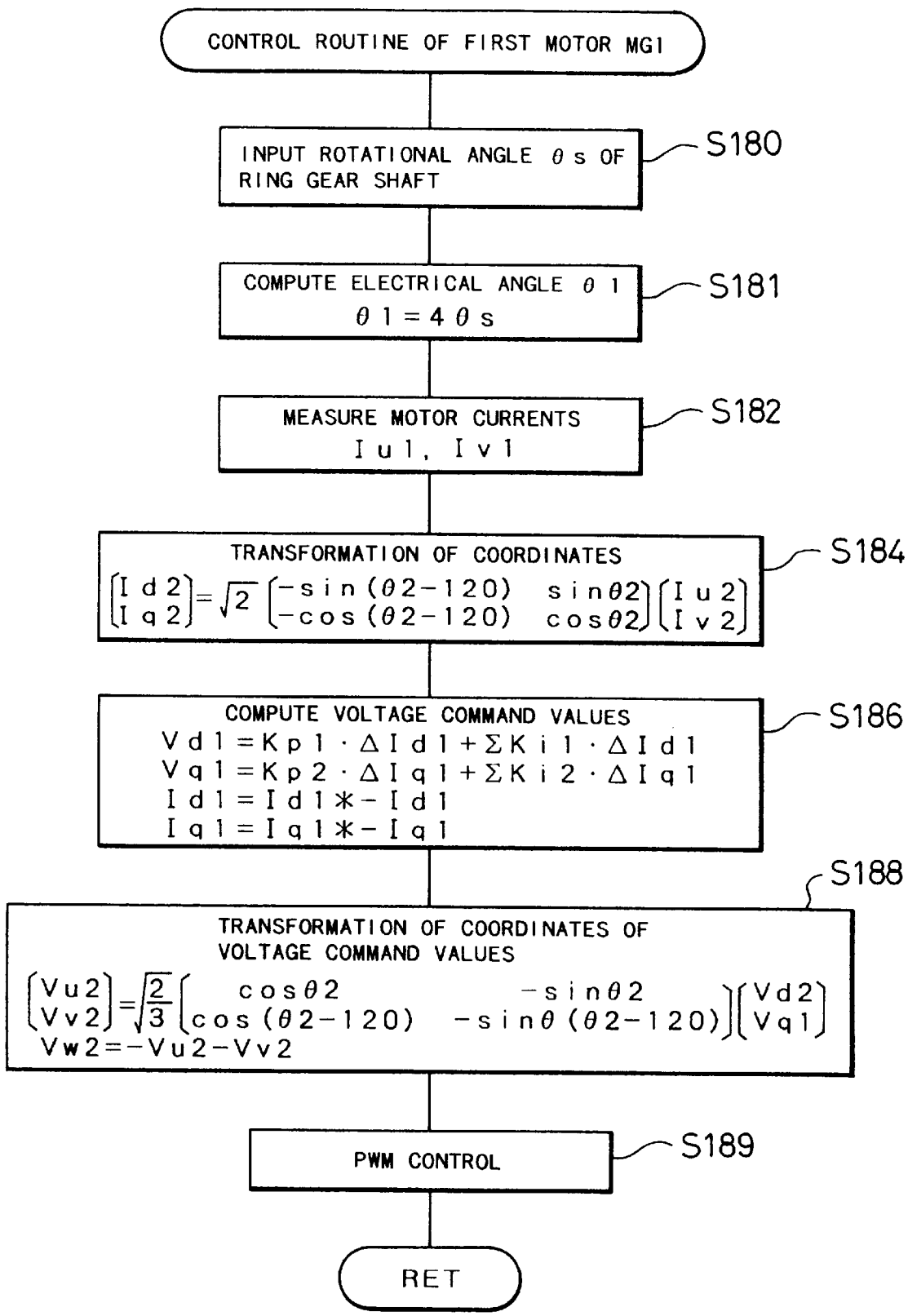
FIG. 14 is a flowchart showing an essential routine of controlling the first motor MG1 executed by the control CPU 190 of the controller 180.

FIG. 14 is a flowchart showing details of the control process of the first motor MG1 executed at step S170 in the flowchart of FIG. 11. When the program enters the control routine, the control CPU 190 first receives the rotational angle θs of the sun gearshaft 125 from the revolver 139 at step S180, and computes an electrical angle θ1 of the first motor MG1 at step S181. In accordance with a concrete procedure, the following calculation is carried out at step S181. In case that a synchronous motor of four-pole pair (that is, four N poles and four S poles) is applied for the first motor MG1, the rotational angle θs of the sun gear shaft 125 is quadrupled to yield the electrical angle θ1. The CPU 190 then detects values of currents Iu1 and Iv1 flowing through the U phase and V phase of the three-phase coils 134 in the first motor MG1 with the ammeters 195 and 196 at step S182. Although the currents naturally flow through all the three phases U, V, and W, measurement is required only for the currents passing through the two phases since the sum of the currents is equal to zero. At subsequent step S184, the control CPU 190 executes transformation of coordinates (three-phase to two-phase transformation) using the values of currents flowing through the three phases obtained at step S182. The transformation of coordinates maps the values of currents flowing through the three phases to the values of currents passing through d and q axes of the permanent magnet-type synchronous motor and is executed according to Equation (7) given below:

$$\begin{bmatrix} Id1 \\ Iq1 \end{bmatrix} = \sqrt{2} \begin{bmatrix} -\sin(\theta1 - 120) & \sin\theta1 \\ -\cos(\theta1 - 120) & \cos\theta1 \end{bmatrix} \begin{bmatrix} Iu1 \\ Iv1 \end{bmatrix} \quad (7)$$

The transformation of coordinates is carried out because the currents flowing through the d and q axes are essential for the torque control in the permanent magnet-type synchronous motor. Alternatively, the torque control may be executed directly with the currents flowing through the three phases. After the transformation to the currents of two axes, the control CPU 190 computes deviations of currents Id1 and Iq1 actually flowing through the d and q axes from current command values Id1* and Iq1* of the respective axes, which are calculated from the torque command value Tm1* of the first motor MG1, and subsequently determines voltage command values Vd1 and Vq1 with respect to the d and q axes at step S186. In accordance with a concrete procedure, the control CPU 190 executes arithmetic operations of Equations (8) and Equations (9) given below:

$$\Delta Id1 = Id1^* - Id1 \quad (8)$$

-continued $$\Delta Iq1 = Iq1^* - Iq1$$

$$Vd1 = Kp1 \cdot \Delta Id1 + \Sigma Ki1 \cdot \Delta Id1 \quad (9)$$

$$Vq1 = Kp2 \cdot \Delta Iq1 + \Sigma Ki2 \cdot \Delta Iq1$$

wherein Kp1, Kp2, Kip1, and Ki2 represent coefficients, which are adjusted to be suited to the characteristics of the motor applied. Each voltage command value Vd1 (Vq1) includes a part in proportion to the deviation ΔI from the current command value I* (the first term in the right side of Equation (9)) and a summation of historical data of the deviations ΔI for 'i' times (the second term in the right side). The control CPU 190 then re-transforms the coordinates of the voltage command values thus obtained (two-phase to three-phase transformation) at step S188. This corresponds to an inverse of the transformation executed at step S184. The inverse transformation determines voltages Vu1, Vv1, and Vw1 actually applied to the three-phase coils 134 as expressed by Equations (10) given below:

$$\begin{bmatrix} Vu1 \\ Vv1 \end{bmatrix} = \sqrt{\frac{2}{3}} \begin{bmatrix} \cos\theta1 & -\sin\theta1 \\ \cos(\theta1 - 120) & -\sin(\theta1 - 120) \end{bmatrix} \begin{bmatrix} Vd1 \\ Vq1 \end{bmatrix} \quad (10)$$

$$Vw1 = -Vu1 - Vv1$$

The actual voltage control is accomplished by on-off operation of the transistors Tr1 through Tr6 in the first driving circuit 191. At step S189, the on- and off-time of the transistors Tr1 through Tr6 in the first driving circuit 191 is PWM (pulse width modulation) controlled, in order to attain the voltage command values Vu1, Vv1, and Vw1 determined by Equations (10) above.

It is assumed that the torque command value Tm1* of the first motor MG1 is positive when the torque Tm1 is applied in the direction shown in the nomograms of FIGS. 5 and 6. For an identical positive torque command value Tm1*, the first motor MG1 is controlled to carry out the regenerative operation when the torque command value Tm1* acts in reverse of the rotation of the sun gear shaft 125 as in the state of the nomogram of FIG. 5, and controlled to carry out the power operation when the torque command value Tm1* acts in the direction of rotation of the sun gear shaft 125 as in the state of the nomogram of FIG. 6. For the positive torque command value Tm1*, both the regenerative operation and the power operation of the first motor MG1 implement the identical switching control. In accordance with a concrete procedure, the transistors Tr1 through Tr6 in the first driving circuit 191 are controlled to enable a positive torque to be applied to the sun gear shaft 125 by the combination of the magnetic field generated by the permanent magnets 135 set on the outer surface of the rotor 132 with the revolving magnetic field generated by the currents flowing through the three-phase coils 134. The identical switching control is executed for both the regenerative operation and the power operation of the first motor MG1 as long as the sign of the torque command value Tm1* is not changed. The control routine of the first motor MG1 shown in the flowchart of FIG. 14 is thus applicable to both the regenerative operation and the power operation. When the torque command value Tm1* is negative, the rotational angle θs of the sun gear shaft 125 read at step S180 is varied in a reverse direction. The control routine of the first motor MG1 shown in FIG. 14 is thus also applicable to this case.

Figure 15:
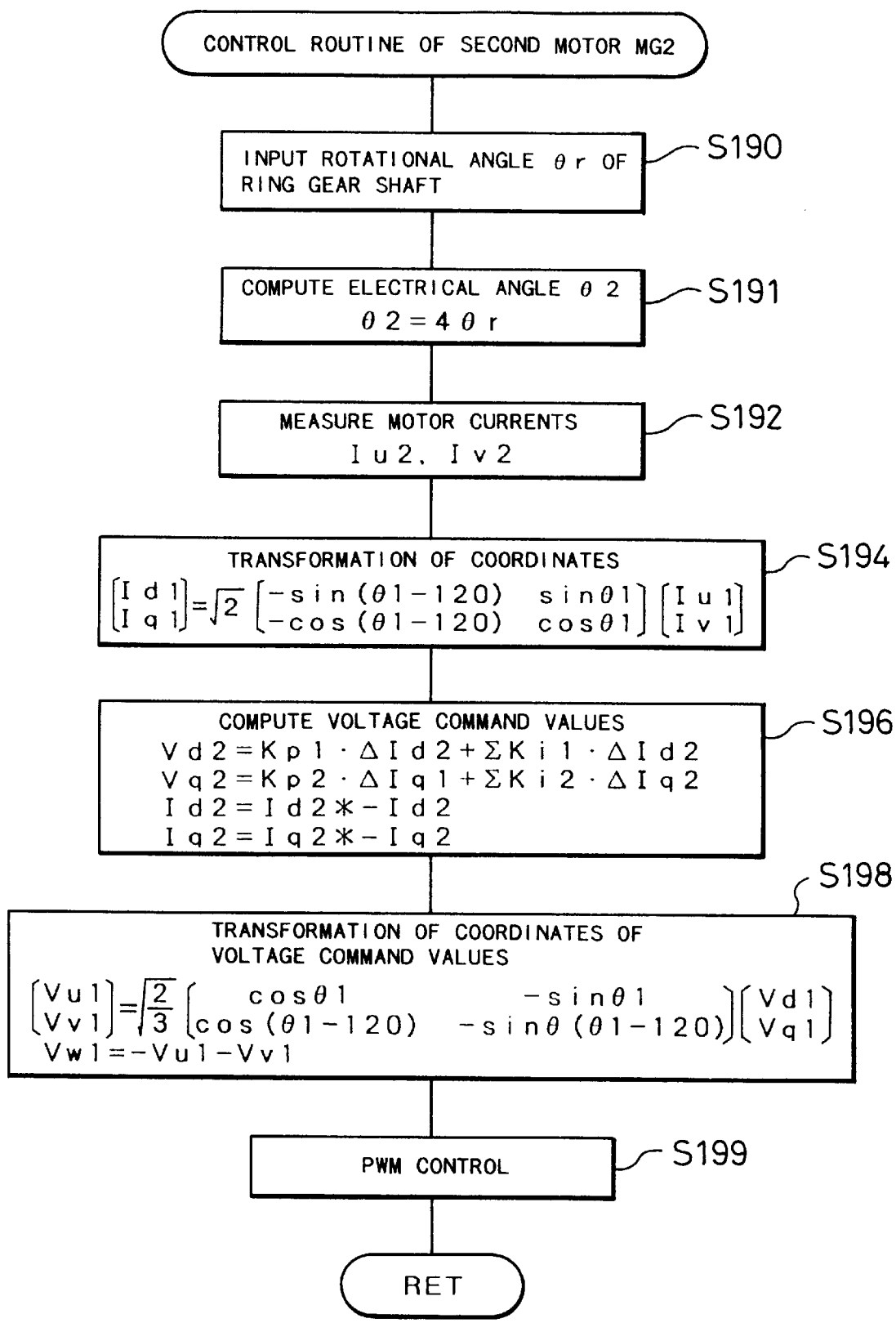
FIG. 15 is a flowchart showing an essential routine of controlling the second motor MG2 executed by the control CPU 190 of the controller 180.

FIG. 15 is a flowchart showing details of the control process of the second motor MG2 executed at step S171 in the flowchart of FIG. 11. The control process of the second motor MG2 is identical with that of the first motor MG1, except that a torque command value Tm2* and the rotational angle θr of the ring gear shaft 126 are used in place of the torque command value Tm1* and the rotational angle θs of the sun gear shaft 125 in the control procedure of the first motor MG1. When the program enters the control routine, the control CPU 190 of the controller 180 first receives the rotational angle θr of the ring gear shaft 126 from the revolver 149 at step S190, quadruples the rotational angle θr of the ring gear shaft 126 to yield an electrical angle θ2 of the second motor MG2 at step S191, and detects phase currents Iu2 and Iv2 of the second motor MG2 with the ammeters 197 and 198 at step S192. The control CPU 190 then executes transformation of coordinates for the phase currents at step S1 94, computes voltage command values Vd2 and Vq2 at step S196, and executes inverse transformation of coordinates for the voltage command values at step S198. At subsequent step S199, the control CPU 190 determines the on- and off-time of the transistors Tr11 through Tr16 in the second driving circuit 192 for driving and controlling the second motor MG2 and carries out the PWM control.

The second motor MG2 is also controlled to carry out either the regenerative operation or the power operation, based on the relationship between the direction of the torque command value Tm2* and the direction of the rotation of the ring gear shaft 126. Like the first motor MG1, the control process of the second motor MG2 shown in the flowchart of FIG. 15 is applicable to both the regenerative operation and the power operation. In this embodiment, it is assumed that the torque command value Tm2* of the second motor MG2 is positive when the torque Tm2 is applied in the direction shown in the nomogram of FIG. 5.

The control of the engine 150 (step S172 in the flowchart of FIG. 11) is executed in the following manner. In order to attain stationary driving at the driving point defined by the target engine torque Te* and the target engine speed Ne* set at step S152 in FIG. 11, the control CPU 190 regulates the torque Te and the revolving speed Ne of the engine 150. In accordance with a concrete procedure, the control CPU 190 transmits an instruction to the EFIECU 170 through communication, and the EFIECU 70 controls the amount of fuel injection from the fuel injection valve 151 and the position of the throttle valve 166, thereby enabling the output torque and the revolving speed of the engine 150 to gradually approach the target engine torque Te* and the target engine speed Ne*. As discussed later on the processing of steps S162 through S172 in the torque control routine in the ordinary driving mode of FIG. 11, the revolving speed Ne of the engine 150 is controlled by regulating the revolving speed Ns of the sun gear shaft 125 with the first motor MG1, so that the engine 150 is controlled to make its actual torque Te approach the target engine torque Te*.

The following describes the processing carried out when the energy Pr to be output to the ring gear shaft 126 is determined to be identical with the previous value of energy Pr at step S150 of the torque control routine in the ordinary driving mode shown in FIG. 11 (that is, the processing of steps S162 through S172). In this case, the control CPU 190 of the controller 180 first receives the revolving speed Ns of the sun gear shaft 125 at step S162, and calculates a target revolving speed Ns* of the sun gear shaft 125 based on the target engine speed Ne* of the engine 150 at step S164 according to Equation (11), which is equivalent to Equation (2) discussed above. The control CPU 190 then determines a deviation ΔNs of the input revolving speed Ns of the sun gear shaft 125 from the calculated target revolving speed Ns* at step S166, and calculates the torque command value Tm1* of the first motor MG1 according to Equation (12) given below at step S168. Km1 in Equation (12) represents a control gain.

$$Ns^* \leftarrow Nr - (Nr - Ne^*) \times \frac{1+\rho}{\rho} \quad (11)$$

$$Tm1^* \leftarrow \text{previous}Tm1^* + Km1 \cdot \Delta Ns \quad (12)$$

After setting the torque command value Tm1* of the first motor MG1, the program proceeds to steps S170 through S172 to carry out the control operations of the first motor MG1, the second motor MG2, and the engine 150. The values used for the respective control operations are identical with those set at steps S152 through S156 based on the previous value of energy Pr in the previous cycle of this routine, except the torque command value Tm1* set at step S168.

The processing f steps S162 through S72 is a feed-back control to make the revolving speed Ns of the sun gear shaft 125 coincident with the target revolving speed Ns*. In this embodiment, the revolving speed Ne of the engine 150 is controlled by regulating the revolving speed Ns of the sun gear shaft 125. As discussed above with the nomograms of FIGS. 5 and 6, in the planetary gear 120, the determination of the two revolving speeds among the revolving speeds of the sun gear shaft 125, the ring gear shaft 126, and the planetary carrier 124 results in automatically setting the remaining one revolving speed. The revolving speed Nr of the ring gear shaft 126 mechanically linked with the driving wheels 116 and 118 is given as input data. Controlling either the revolving speed Ns of the sun gear shaft 125 or the revolving speed Ne of the engine 150 determines the rotating conditions of the three shafts of the planetary gear 120. Controlling the revolving speed Ne of the engine 150 is required, in order to enable the engine 150 to be driven at the driving point of high efficiency defined by the target engine torque Te* and the target engine speed Ne*. In this case, the method of controlling the position of the throttle valve 166 and the amount of fuel injection may be applied to control the revolving speed Ne of the engine 150. This control procedure is, however, rather complicated, since the torque Te of the engine 150 should be controlled simultaneously to the target engine torque Te*. On the other hand, control of the revolving speed Ns of the sun gear shaft 125 can be attained more readily and with a higher accuracy simply by controlling the revolving speed of the first motor MG1. In this embodiment, the revolving speed Ne of the engine 150 is controlled by regulating the revolving speed Ns of the sun gear shaft 125 with the first motor MG1.

As discussed above, the torque control process in the ordinary driving mode converts the power output from the engine 150 to a desired torque by means of the planetary gear 120, the first motor MG1, and the second motor MG2, and outputs the desired torque to the ring gear shaft 126 and thereby to the driving wheels 116 and 118. As long as the output energy Pe coincides with the energy Pr to be output to the ring gear shaft 126, the engine 150 can be driven at any driving point defined by the revolving speed Ne and the torque Te. This allows the engine 150 to be driven at a desired driving point of highest possible efficiency, thereby enhancing the efficiency of the whole apparatus. The first motor MG1 controls the revolving speed NS of the sun gear shaft 125 to the target revolving speed Ns*, thereby enabling the revolving speed Ne of the engine 150 to approach the target engine speed Ne*.

In the power output apparatus 110 of the first embodiment, the feed-back control is carried out with the first motor MG1 to make the revolving speed Ns of the sun gear shaft 125 approach the target revolving speed NS*, when the energy Pr to be currently output to the ring gear shaft 126 is identical with the previous value of energy Pr. Such feed-back control may, however, be omitted. In the power output apparatus 110 of the first embodiment, the target torque Te* and the target revolving speed Ne* of the engine 150 are read from the map that enables the engine 150 to be driven at the highest possible efficiency with respect to the energy Pr to be output to the ring gear shaft 126 and to vary its driving state smoothly with a variation in energy Pr. Other maps applicable for the same purpose include one for storing discontinuous driving points that enable the engine 150 to be driven at the highest possible efficiency but do not enable the engine 150 to vary its driving state smoothly with a variation in energy Pr and one for storing driving points that enable the engine 150 to improve the emission to the lowest possible level, driving points that reduce the noise of the engine 150 to the lowest possible level, or other various driving points.

(5) Process of Controlling Torque in Motor Driving Mode

Figure 16:
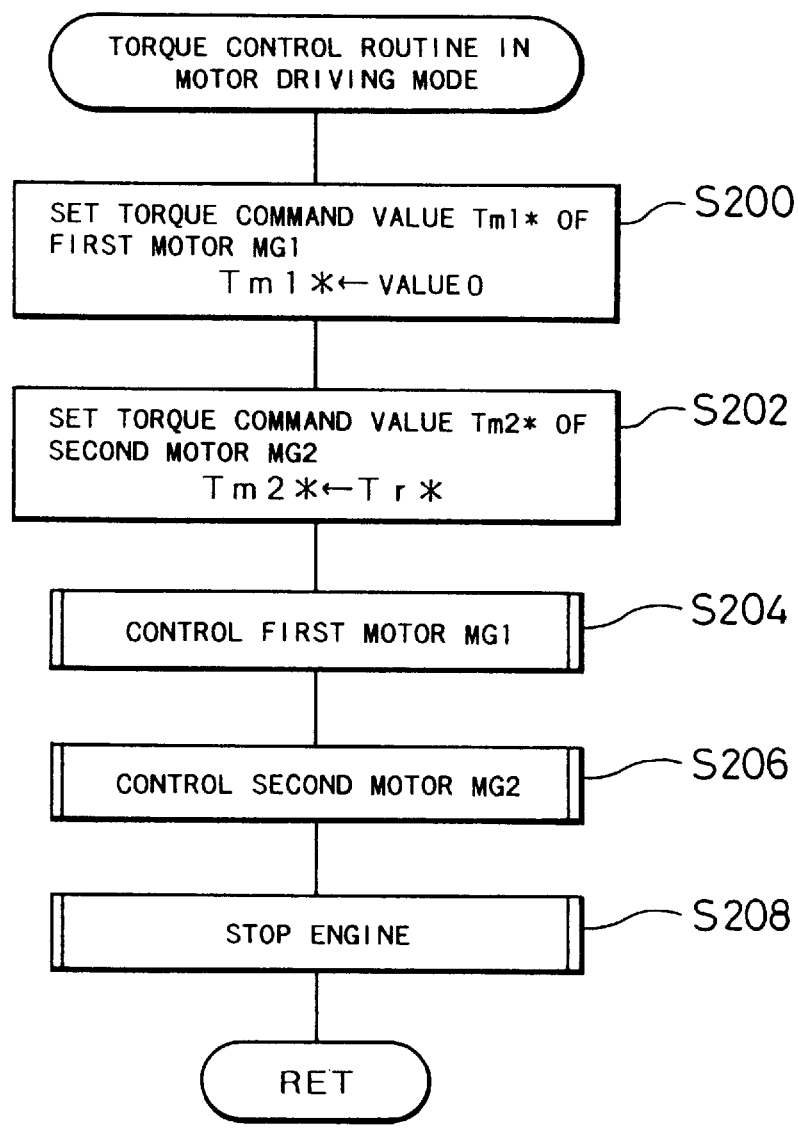
FIG. 16 is a flowchart showing a torque control routine in the motor driving mode executed by the control CPU 190 of the controller 180.

The process of controlling the torque in the motor driving mode at step S120 in the flowchart of FIG. 7 is carried out according to a routine of controlling the torque in the motor driving mode shown in the flowchart of FIG. 16. This routine is activated when it is determined that the energy Pr to be output to the ring gear shaft 126 is smaller than the predetermined energy PML and that the revolving speed Nr of the ring gear shaft 126 is lower than the predetermined revolving speed NML at step S142 in the flowchart of FIG. 9.

Figure 17:
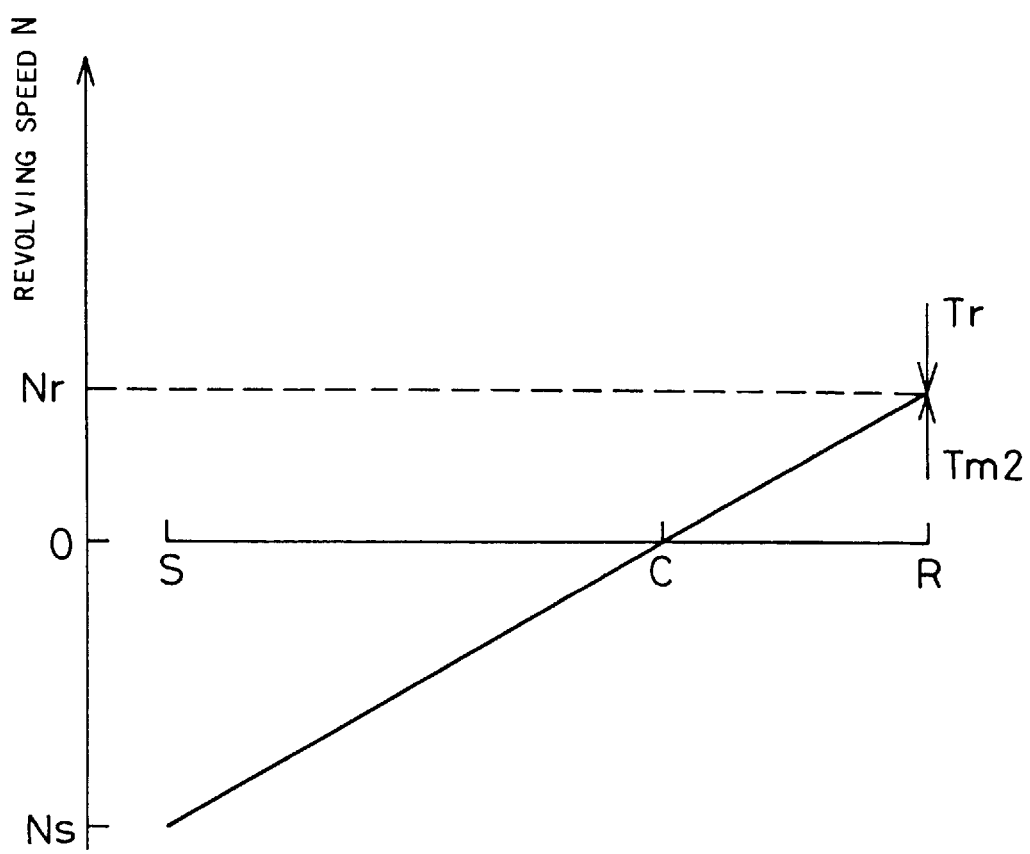
FIG. 17 is a nomogram showing the relationship between the revolving speed and the torque on the three shafts linked with the planetary gear 120 in the torque control in the motor driving mode.

When the program enters the control routine, the control CPU 190 of the controller 180 first sets the torque command value Tm1* of the first motor MG1 equal to zero at step S200 and sets the torque command value Tm2* of the second motor MG2 equal to the torque command value Tr* at step S202. The program then proceeds to steps S204 and S206 to control the first motor MG1 and the second motor MG2 based on the preset command values. Since the torque command value Tm1* is set equal to zero, the control procedure of the first motor MG1 executed at step S204 turns off all the transistors Tr1 through Tr6 in the first driving circuit 191. The program subsequently goes to step S208 to stop the operation of the engine 150. FIG. 17 is a nomogram in the process of controlling the torque in the motor driving mode.

The process of controlling the torque in the motor driving mode stops the operation of the engine 150 and enables only the power from the second motor MG2 to be output to the ring gear shaft 126. The vehicle functions as an electric vehicle under this condition.

As mentioned previously, the process of controlling the torque in the motor driving mode is executed when it is determined that the energy Pr to be output to the ring gear shaft 126 is smaller than the predetermined energy PML and that the revolving speed Nr of the ring gear shaft 126 is lower than the predetermined revolving speed NML at step S142 in the flowchart of FIG. 9. In accordance with another possible structure, the torque control routine in the motor driving mode may be carried out irrespective of the values of the energy Pr to be output to the ring gear shaft 126 and the revolving speed Nr of the ring gear shaft 126. By way of example, this routine may be executed when the driver operates a switch (not shown) to give an instruction. In accordance with a concrete structure, the vehicle is provided with a switch that allows selection of the driving state only with the motor. When the driver operates the switch with the requirement for reducing the noise or decreasing the exhaust, this torque control routine in the motor driving mode is activated.

(6) Other Processes of Torque Control

The following describes the process of controlling the torque in the charge-discharge mode at step S114 in the flowchart of FIG. 7, the process of controlling the torque in the power assist mode at step S116, and the process of controlling the torque in the lock-up mode at step S118. These torque control procedures are not directly related to the essential characteristics of the present invention and are thus described briefly.

In the process of controlling the torque in the charge-discharge mode at step S114, when the remaining charge BRM of the battery 194 is determined to be less than the first threshold value BL and charging the battery 194 is required, the electric power regenerated by either the first motor MG1 or the second motor MG2 is made greater than the electric power consumed by either the second motor MG2 or the first motor MG1. This enables the battery 194 to be charged with the excess energy. When the remaining charge BRM of the battery 194 is determined to be greater than the second threshold value BH and discharging the battery 194 is required, the electric power regenerated by either the first motor MG1 or the second motor MG2 is made smaller than the electric power consumed by either the second motor MG2 or the first motor MG1. This enables the insufficiency of electric power to be supplied by the electrical energy discharged from the battery 194. Such procedures allow the remaining charge BRM of the battery 194 to be within the desired range, and effectively prevent the battery 194 from being excessively charged or discharged. Like the process of controlling the torque in the ordinary driving mode at step S112, this process enables desired power to be output to the ring gear shaft 126 and thereby to the driving wheels 116 and 118 by means of the engine 150, the planetary gear 120, the first motor MG1, the second motor MG2, and the battery 194.

In the process of controlling the torque in the power assist mode at step S116, the electrical energy stored in the battery 194 is added as an assisting power to the power output from the engine 150. This procedure enables the energy greater than the maximum output energy of the engine 150 to be output to the ring gear shaft 126 and thereby to the driving wheels 116 and 118. The engine that has a low rated capacity and gives maximum energy which is smaller than the energy to be output to the ring gear shaft 126 is accordingly applicable to the apparatus. This structure reduces the size of the whole apparatus and effectively saves the required energy.

The process of controlling the torque in the lock-up mode at step S118 locks up the first motor MG1 and interferes with rotation of the sun gear shaft 125, thereby allowing the power from the engine 150 to be directly output to the ring gear shaft 126 at the predetermined gear ratio.

The power output apparatus 110 of the first embodiment carries out one of the torque control processes discussed above and efficiently outputs the power to the ring gear shaft 126 and thereby to the driving wheels 116 and 118. The power output to the ring gear shaft 126 can be taken out of the place between the first motor MG1 and the second motor MG2 and transmitted to the driving wheels 116 and 118.

In addition to the operation control to carry out the respective torque control processes, the power output apparatus 110 executes engine-starting control to start the engine 150 in response to a requirement of starting.

(7) Engine-starting Control

Figure 18:
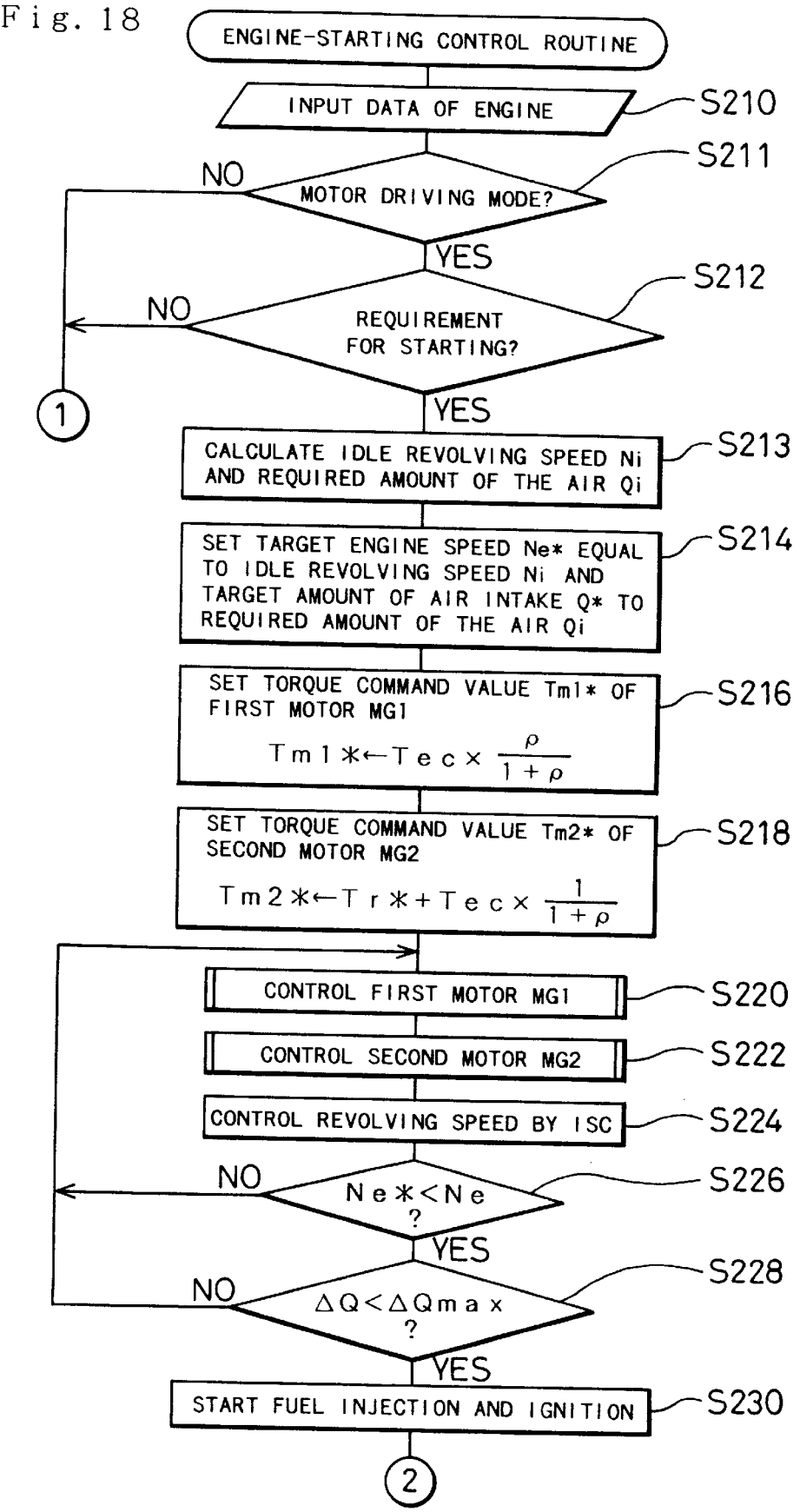
FIGS. 18 and 19 are flowcharts showing an engine-starting control routine executed by the control CPU 190 of the controller 180.
Figure 19:
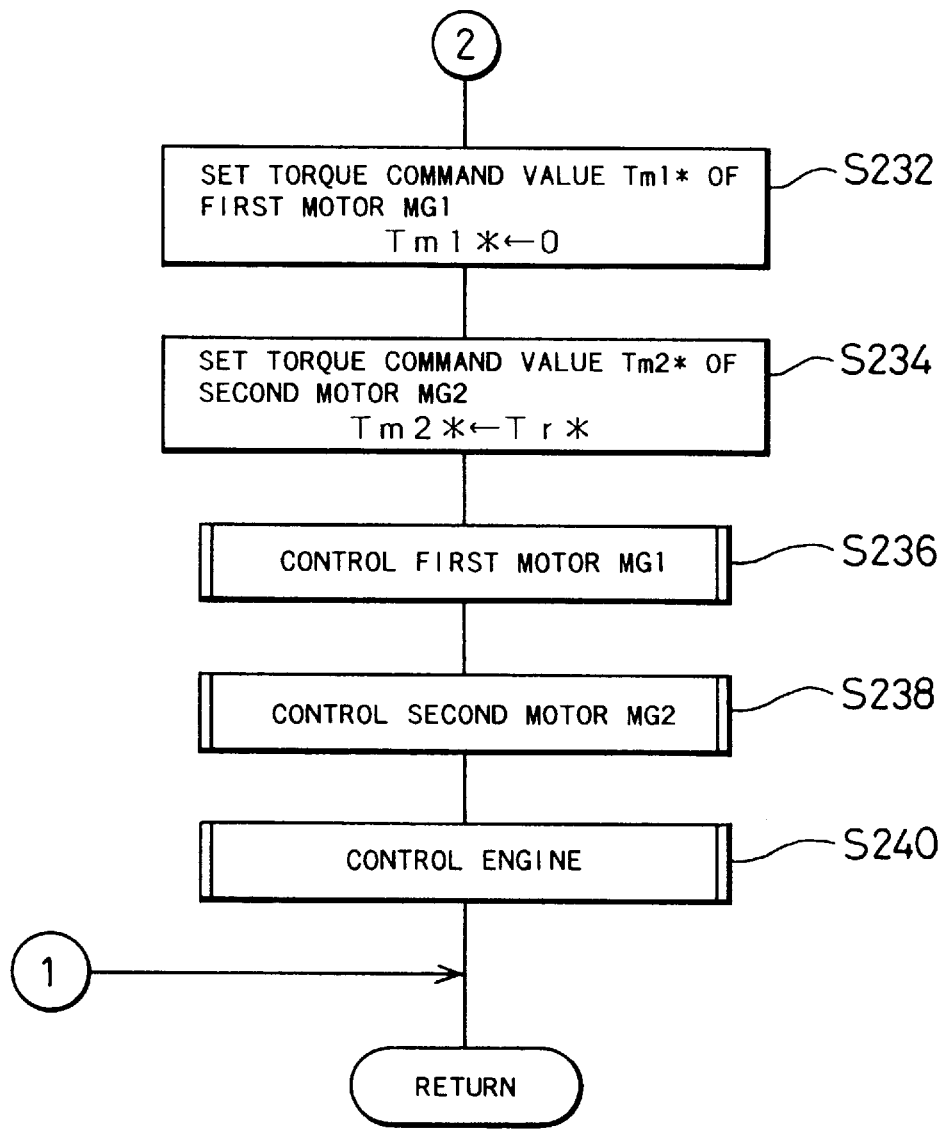

The following describes a concrete procedure of engine-starting control based on an engine-starting control routine shown in the flowcharts of FIGS. 18 and 19. The engine-starting control routine interrupts the operation control routine of FIG. 7 and is repeatedly executed at predetermined time intervals. When the program enters the engine-starting control routine, the control CPU 190 of the controller 180 first receives data of the engine 150 from the EFIECU 170 at step S210. In accordance with a concrete procedure, the control CPU 190 receives the results of measurement with various sensors and switches arranged on the periphery of the engine 150, such as the water temperature sensor 174 and the speed sensor 176, from the EFIECU 170 through communication. It is then determined at step S211 whether or not the motor driving mode has been selected. As discussed previously, the motor driving mode is set at step S144 in the operation mode termination routine of FIG. 9. This step namely determines whether or not the torque control process is executed in the motor driving mode at step S120 in the operation control routine of FIG. 7 or whether or not the vehicle is running only with the power output from the second motor MG2 while the engine 150 stops its operation.

The control CPU 190 then determines whether or not there is a requirement for starting the engine 150 at step S212. This step may be implemented by reading the driving state of the vehicle and determining whether or not the input driving state requires the operation of the engine 150. Alternatively, the requirement for starting the engine 150 may be determined in response to a control instruction given from the outside. In the former case, by way of example, when the driver steps on the accelerator pedal 164 to require acceleration after the driving state has been shifted to the motor driving mode, that is, after the energy Pr to be output to the ring gear shaft 126 has become smaller than the predetermined energy PML and the revolving speed Nr of the ring gear shaft 126 has become smaller than the predetermined revolving speed NML, for example, in the course of reducing the speed of the vehicle, the control CPU 190 recognizes the requirement of acceleration as the requirement for starting the engine 150. In accordance with another possible structure, when the battery 194 has an insufficient remaining charge and needs charging, the control CPU 190 recognizes the above requirement of acceleration as the requirement for starting the engine 150.

In the latter case, by way of example, when a switch for selecting the driving state only with the motor is released after the driver has operated the switch to shift the driving state to the motor driving mode, the control CPU 190 recognizes a switch-releasing instruction as the requirement for starting the engine 150.

When the answer is affirmative at both steps S211 and S212, the program proceeds to step S213. When the answer is negative at either of steps S211 and S212, on the other hand, the program goes to RETURN and exits from this routine.

At step S213, the control CPU 190 calculates an idle revolving speed Ni (for example, 800 [rpm]) that is a target value at the time of starting the engine 150 and a quantity of the air Qi required for maintaining the idle revolving speed Ni, from the data of the engine 150 input at step S210. A detailed procedure determines the idle revolving speed Ni at the starting time which is optimal for the current state of the engine 150 by taking into account a warm-up correction based on the detection result of the water temperature sensor 174 and an electrical loading correction set when a switch of an auxiliary machine, such as headlights, is in ON position. The required amount of the air Qi is then calculated from the idle revolving speed Ni thus obtained. The required amount of the air Qi may alternatively be calculated from the detection result of an intake air temperature sensor as well as the idle revolving speed Ni. The latter structure gives the required amount of the air Qi with a higher accuracy by taking into account the density of the air that is varied with a change in temperature of the air.

At subsequent step S214, the control CPU 190 of the controller 180 sets the target revolving speed Ne* of the engine 150 equal to the idle revolving speed Ni calculated at step S213 and sets a target amount of air intake Q* equal to the required amount of the air Qi calculated at step S213. The control CPU 190 then sets the torque command value Tm1* of the first motor MG1 and the torque command value Tm2* of the second motor MG2 at steps S216 and S218, respectively. The process of setting these torque command values Tm1* and Tm2* is described with the nomograms.

Figure 20:
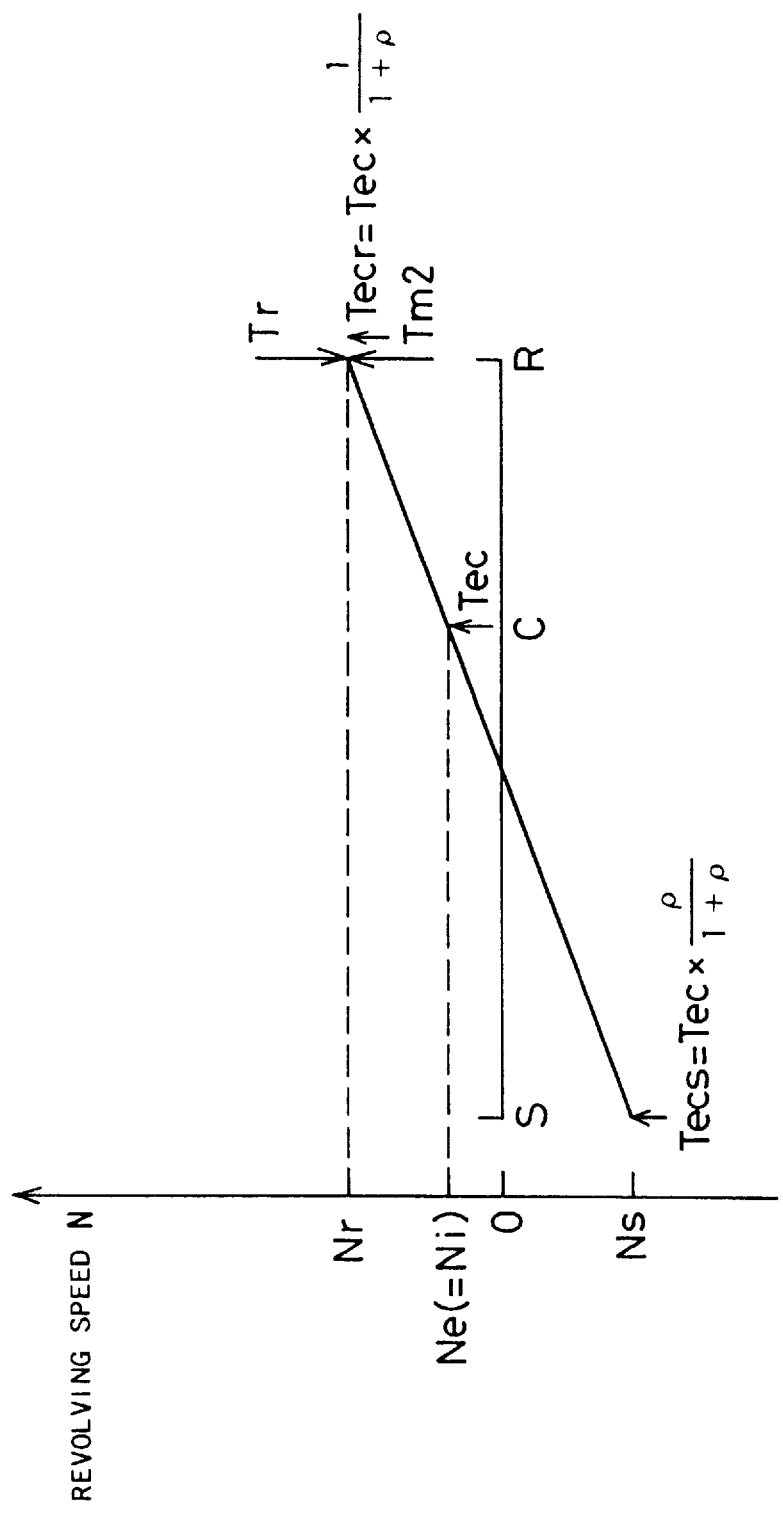
FIG. 20 is a nomogram showing the relationship between the revolving speed and the torque on the three shafts linked with the planetary gear 120 in the engine-starting control.

As mentioned previously, the nomogram of FIG. 17 shows the driving state in the motor driving mode. In order to start the engine 150 according to the engine-starting control routine, the driving state should be shifted from the state of FIG. 17 to the state of FIG. 20. The revolving speed Nr of the ring gear shaft 126 mechanically linked with the driving wheels 116 and 118 is constant in the motor driving mode. The revolving speed Ns of the sun gear shaft 125 is enhanced in the direction of normal rotation while the revolving speed Nr of the ring gear shaft 126 is fixed, so that the revolving speed Ne of the engine 150 is shifted to the target revolving speed Ne* (=idle revolving speed Ni) set at step S214.

In order to enable the engine 150 to be motored at the idle revolving speed Ni, it is required to apply a torque (cranking torque) Tec onto the coordinate axis C, wherein the cranking torque Tec allows the output shaft (crankshaft 156) of the engine 150 to rotate at the idle revolving speed Ni. Since the engine 150 is at a stop, however, the required torque Tec can not be directly applied onto the coordinate axis C. Based on the technique of dividing the force into different lines of action having the same direction, the cranking torque Tec that is to act on the coordinate axis C is divided into a torque Tecs on the coordinate axis S and a torque Tecr on the coordinate axis R. The torques Tecs and Tecr are then applied onto the coordinate axes S and R, respectively. The magnitudes of the torques Tecs and Tecr are defined by Equations (13) and (14) given below:

$$Tecs = Tec \times \frac{\rho}{1+\rho} \quad (13)$$

$$Tecr = Tec \times \frac{1}{1+\rho} \quad (14)$$

The cranking torque Tec depends upon the structure of the engine 150, the volume of the cylinders, the viscosity of lubricating oil, and the other conditions, and is calculated in advance. Since the viscosity of lubricating oil is significantly varied with the temperature while the structure of the engine 150 and the volume of the cylinders are proper to the engine 150 and fixed, a preferable procedure determines the cranking torque Tec as a value varied with the water temperature measured with the water temperature sensor 174.

The control CPU 190 accordingly sets the torque command value Tm1* of the first motor MG1 based on the desired torque Tecs according to the following Equation (15) at step S216, and sets the torque command value Tm2* of the second motor MG2 based on the desired torque Tecr and a torque Tm2 (=Tr*) acting on the coordinate axis R in the motor driving mode according to the following Equation (16) at step S218:

$$Tm1^* \leftarrow Tec \times \frac{\rho}{1+\rho} \quad (15)$$

$$Tm2^* \leftarrow Tr^* + Tec \times \frac{1}{1+\rho} \quad (16)$$

The torque command value Tr* in Equation (16) represents the latest value obtained at step S104 in the operation control routine of FIG. 7. After setting the target revolving speed Ne* of the engine 150, the target amount of air intake Q*, and the torque command values Tm1* and Tm2* of the first and the second motors MG1 and MG2, the program proceeds to steps S220 and S222 to control the first motor MG1 and the second motor MG2. As discussed previously, the control operation of the first motor MG1 follows the control routine of the first motor MG1 shown in the flowchart of FIG. 14, whereas the control operation of the second motor MG2 follows the control routine of the second motor MG2 shown in the flowchart of FIG. 15. As a matter of convenience of illustration, the control operations of the first motor MG1 and the second motor MG2 are shown as separate steps. In the actual procedure, however, these control operations are carried out simultaneously. By way of example, the control CPU 190 simultaneously controls the first motor MG1 and the second motor MG2 by utilizing an interrupting process.

The control operations of steps S220 and S222 allow the engine 150 to be motored at the idle revolving speed Ni. The torque command value Tm2* of the second motor MG2 is set equal to a value obtained by subtracting the torque Tecr acting on the coordinate axis R at the time of motoring the engine 150. This structure effectively prevents a variation in torque on the drive shaft at the time of motoring.

The program then proceeds to step S224 to control the engine 150. Idle speed control (hereinafter referred to as ISC) is carried out to regulate the amount of air intake into the engine 150 and stabilize the revolving speed of the engine 150 at the idle revolving speed Ni. In accordance with a concrete procedure, the control CPU 190 outputs a driving signal of control based on the target amount of air intake Q* set at step S214 to the ISCV 167a, thereby adjusting the position of the ISCV 167a and changing the amount of air intake into the engine 150 to the required amount of the air Qi.

At step S226, the actual revolving speed Ne of the engine 150 is compared with the target engine speed Ne* set at step S214 or the idle revolving speed Ni calculated at step S213. When Ne is determined not to be greater than Ne*, the program returns to step S220 to continue controlling the first motor MG1. At subsequent step S228, a variation ΔQ in amount of air intake for a predetermined time period is compared with a predetermined allowable variation ΔQmax. When ΔQ is determined not to be smaller than ΔQmax, the program returns to step S220 to continue controlling the first motor MG1. When the actual revolving speed Ne is determined to be greater than the target engine speed Ne* at step S226 and the variation ΔQ in amount of air intake is determined to be smaller than the allowable variation ΔQmax at step S228, the program determines that the revolving speed Ne of the engine 150 and the amount of air intake Q are both stabilized at the target revolving speed Ne* and the target amount of air intake Q* and proceeds to step S230 to execute fuel injection control and ignition timing control and output driving signals to the fuel injection valve 151 and the igniter 158, thus starting the engine 150.

The fuel injection control and the ignition timing control determine the amount of fuel injection and the ignition timing based on the target engine speed Ne* and the target amount of air intake Q*, that is, the idle revolving speed Ni and the required amount of the air Qi calculated at step S213. In accordance with a concrete procedure, the control CPU 190 transmits an instruction to the EFIECU 170 through communication, and the EFIECU 170 determines the amount of fuel injection from the fuel injection valve 151 and the ignition timing with the igniter 158 from the idle revolving speed Ni and the required amount of the air Qi to implement the fuel injection control and the ignition timing control of the engine 150.

When the engine 150 starts, the program proceeds to steps S232 and S234 in the flowchart of FIG. 19, at which the control CPU 190 of the controller 180 removes the torques Tecs and Tecr respectively applied onto the coordinate axes S and R for starting the engine 150. In accordance with a concrete procedure, the torque command value Tm1* of the first motor MG1 is set equal to zero, that is the result obtained by subtracting the torque Tecs, at step S232, and the torque command value Tm2* of the second motor MG2 is set equal to the torque command value Tr*, that is the result obtained by subtracting the torque Tecr, at step S234. The program then proceeds to steps S236 and S238 to control the first motor MG1 and the second motor MG2 with the newly set torque command values. The control operations of the first motor MG1 and the second motor MG2 follow the control routines of FIGS. 14 and 15 discussed above.

The program subsequently goes to step S240 to control the engine 150. The target engine speed Ne* and the target amount of air intake Q* set at step S214 in the flowchart of FIG. 18 are controlled here, in order to enable the engine 150 to be stationarily driven in the idling state, that is, at the driving point defined by the target engine speed Ne* and the target amount of air intake Q*. In accordance with a concrete procedure, the control CPU 190 transmits an instruction to the EFIECU 170 through communication, and the EFIECU 170 increases or decreases the amount of fuel injection from the fuel injection valve 151 and the position of the ISCV 167a, thereby stabilizing the engine 150 in the idling state, where the revolving speed Ne of the engine 150 and the amount of air intake Q are respectively equal to the idle revolving speed Ni and the required amount of the air Qi.

Figure 21:
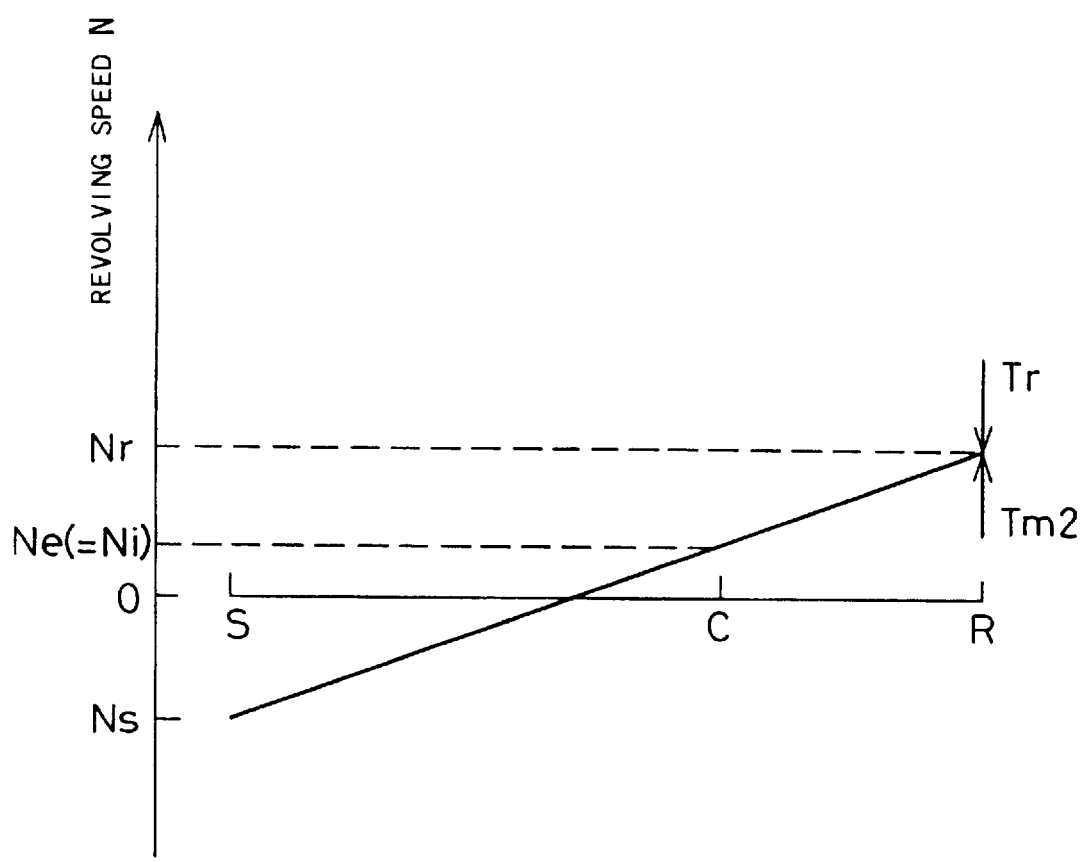
FIG. 21 is a nomogram showing the relationship between the revolving speed and the torque on the three shafts linked with the planetary gear 120 in the engine-starting control.

The nomogram of FIG. 21 shows the state of the planetary gear 120 when the control of the first motor MG1 at step S236, the control of the second motor MG2 at step S238, and the control of the engine 150 at step S240 have been completed. Referring to FIG. 21, the torque Tm2 is applied onto the coordinate axis R, whereas the torque Te of the engine 150 acting on the coordinate axis C and the torque acing on the coordinate axis S are equal to zero. This enables the engine 150 to be stably driven at the idle revolving speed Ni. After the completion of steps S236 through S240, the program goes to RETURN and exits from the routine.

Figure 22:
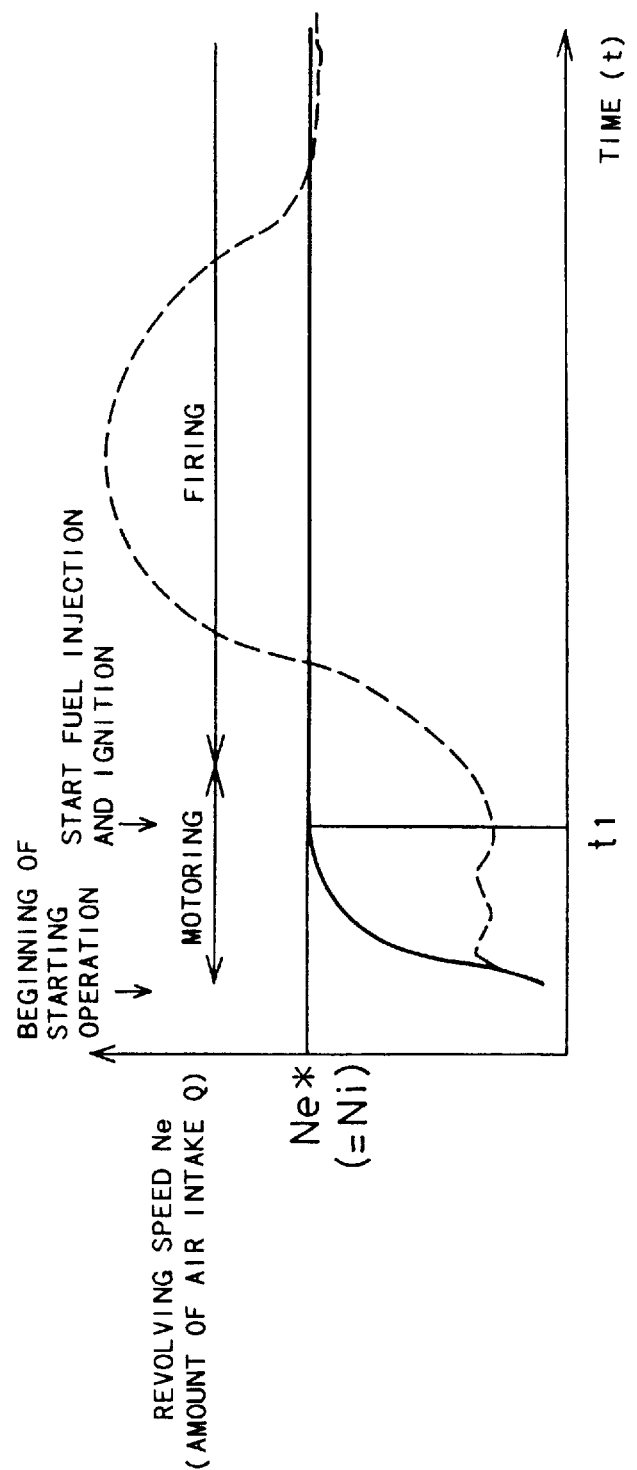
FIG. 22 is a timing chart showing a driving state of the engine started by the engine-starting control.

FIG. 22 shows a time-based variation in revolving speed Ne of the engine 150 at the starting time and in amount of air intake Q, which is realized by the engine-starting control routine discussed above. The characteristic curve shown by the broken line in FIG. 22 is obtained when the engine is started with a conventional starter motor.

Referring to FIG. 22, the engine 150 of the embodiment is driven and rotated by means of the first motor MG1 and the second motor MG2 at the beginning of the engine-starting control, reaches the target level, that is, the idle revolving speed Ni, within a short time (time point t1), and is stably maintained in the idling state. The amount of air intake Q varies on the identical characteristic curve in response to the revolving speed Ne of the engine 150. The fuel injection control and the ignition timing control are carried out in the stable state (that is, the stationary state which the characteristic curve reaches in the graph of FIG. 22), where the revolving speed Ne and the variation ΔQ in amount of air intake are respectively equal to the idle revolving speed Ni and the allowable variation ΔQmax.

As shown by the broken line in FIG. 22, on the other hand, the conventional starting control unstably drives and rotates the engine 150 at a low speed with a powerless starter motor (motoring period), and utilizes its rotation to carry out fuel injection control and ignition timing control for firing. After the self-powered operation is completed by firing, the engine is restored to the target level, that is, the idle revolving speed Ni.

As clearly shown by the comparison between the characteristic curves in FIG. 22, the structure of the first embodiment ensures remarkable stability of the revolving speed Ne and the amount of air intake Q at the time of starting the engine 150, and thereby readily realizes a preferable accuracy of control in the fuel injection control and the ignition timing control carried out with the stable revolving speed Ne and amount of air intake Q. This structure effectively reduces emission at the time of starting the engine 150, thus realizing preservation of the environment that is one object of hybrid automobiles. The excellent control accuracy of the fuel injection control and the ignition timing control maintains the torque output from the engine 150 at a substantially constant level. This results in substantially no variation in torque on the drive shaft 112 mechanically linked with the engine 150, thus reducing a shock to the vehicle.

The first motor MG1, the second motor MG2 and the planetary gear 120 in the first embodiment correspond to the driving device in claims. The motoring control means in claims is realized by the hardware of the controller 180 and the software executed by the controller 180, such as the processing of steps S220 and S222 in the engine-starting control routine. The calculation means in claims is functioned by the hardware of the controller 180 and the software executed by the controller 180, such as the processing of step S214 in the engine-starting control routine. The starter means in claims is functioned by the hardware of the fuel injection valve 151, the ignition plug 162, the ISCV 167a, and the controller 180 and the software executed by the controller 180, such as the processing of steps S224 through S230 in the engine-starting control routine.

2. Second Embodiment
(1) Hardware Structure

Figure 23:
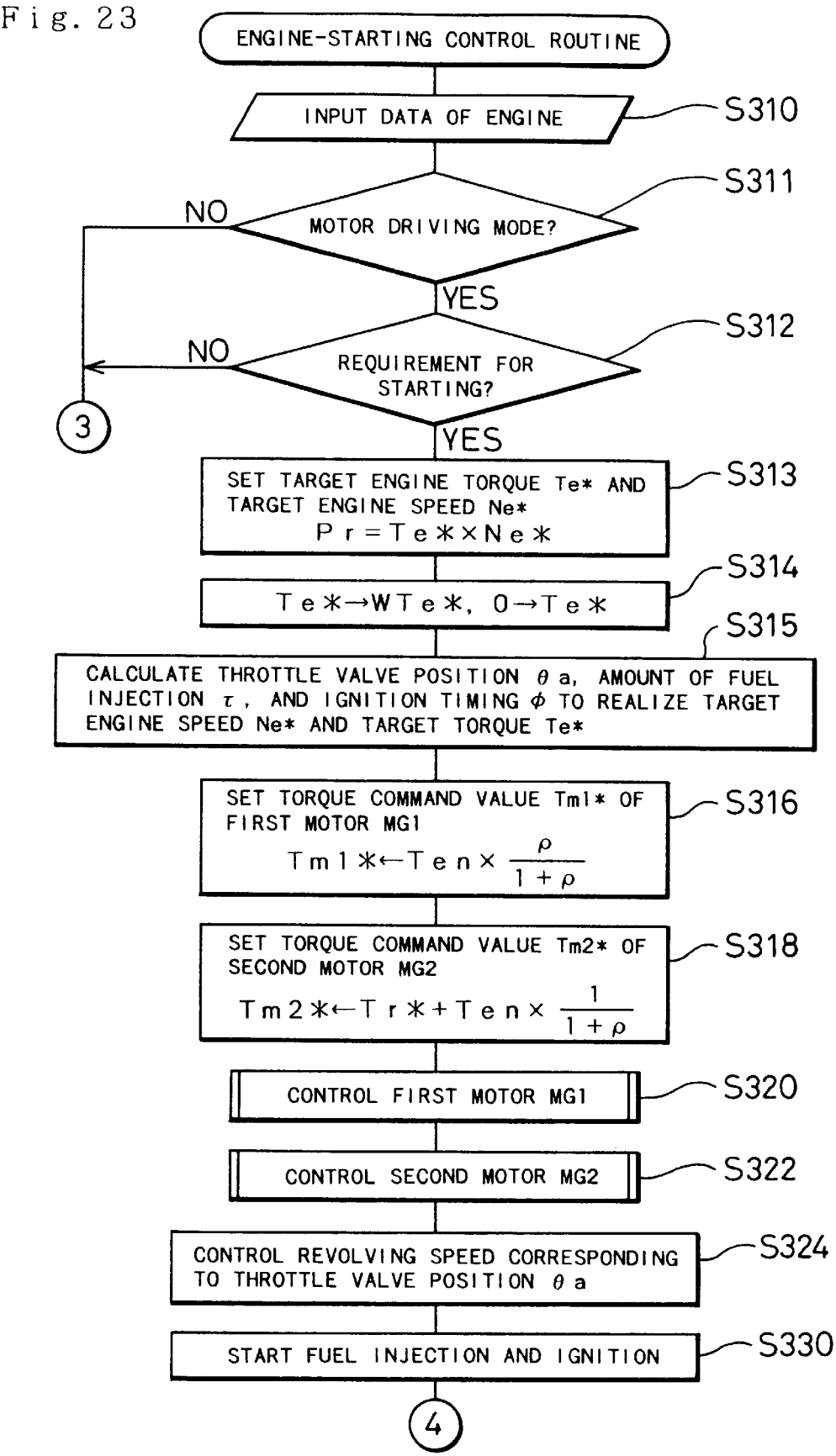
FIGS. 23 and 24 are flowcharts showing an engine-starting control routine executed in a second embodiment according to the present invention.

The following describes another power output apparatus as a second embodiment according to the present invention. The power output apparatus of the second embodiment has the identical software and hardware structure with that of the power output apparatus 110 of the first embodiment, except the engine-starting control process executed by the control CPU 190 of the controller 180. The constituents of the second embodiment that are identical with those of the first embodiment are expressed by the like numerals and symbols. (2) Engine-starting Control The engine-starting control in the second embodiment follows an engine-starting control routine shown in the flowcharts of FIGS. 23 and 24. The engine-starting control routine interrupts the operation control routine of FIG. 7 discussed in the first embodiment and is repeatedly executed at predetermined time intervals. When the program enters the engine-starting control routine, the control CPU 190 of the controller 180 first executes the processing identical with that of steps S210 through S212 in the engine-starting control routine of the first embodiment shown in FIGS. 18 and 19. The control CPU 190 receives data of the engine 150 from the EFIECU 170 at step S310, determines whether or not the motor driving mode has been selected at step S311, and determines whether or not there is a requirement for starting the engine 150 at step S312.

When the answer is affirmative at both steps S311 and S312, the program proceeds to step S313. When the answer is negative at either of steps S311 and S312, on the other hand, the program goes to RETURN and exits from this routine.

The control CPU 190 determines the target torque Te* and the target revolving speed Ne* of the engine 150 at step S313 in the manner described below.

For the determination, it is required to calculate the energy Pr to be output to the ring gear shaft 126 from the calculated torque command value Tr* and the input revolving speed Nr of the ring gear shaft 126 according to the equation Pr=Tr*×Nr. The torque command value Tr* is the target torque to be output to the ring gear shaft 126 and is calculated from the input accelerator pedal position AP of the accelerator pedal 164, which is stepped on by the driver. The output energy Pr obtained at step S106 in the operation control routine of FIG. 7 can be used directly for this purpose. At step S313, the control CPU 190 accordingly sets the target torque Te* and the target revolving speed Ne* of the engine 150 based on the output energy Pr. The concrete procedure of setting is identical with the process of step S152 of the torque control routine in the ordinary driving mode shown in the flowchart of FIG. 11. The target engine torque Te* and the target engine speed Ne* thus obtained enable the engine 150 to be driven at the highest possible efficiency with respect to the output energy Pr and to vary its driving state smoothly with a variation in energy Pr.

The target engine torque Te* and the target engine speed Ne* are set at step S313 on the assumption that all the output energy Pr calculated at step S106 in the flowchart of FIG. 7 is output to the ring gear shaft 126. In accordance with an alternative structure, the target engine torque Te* and the target engine speed Ne* are set on the assumption that the battery 194 is charged with part of the output energy Pr calculated at step S106 and the residual energy is actually output to the ring gear shaft 126. In this case, the relationship between the energy Pr to be output to the ring gear shaft 126, charging energy Pb of the battery 194, and the target torque Te* and the target revolving speed Ne* of the engine 150 is expressed as Pr+Pb=Te*×Ne*. The target torque Te* and the target revolving speed Ne* of the engine 150 are then set to satisfy this relationship.

In accordance with another possible structure, the total of the output energy Pr calculated at step S106 and the energy Pb discharged from the battery 194 is actually output to the ring gear shaft 126. In this case, the relationship between the energy Pr to be output to the ring gear shaft 126, the energy Pb discharged from the battery 194, and the target torque Te* and the target revolving speed Ne* of the engine 150 is expressed as Pr−Pb=Te*×Ne*. The target torque Te* and the target revolving speed Ne* of the engine 150 are then set to satisfy this relationship.

After setting the target engine torque Te* and the target engine speed Ne* at step S313, the program proceeds to subsequent steps to start the engine 150 and set the engine 150 in a specific driving state that is defined by the preset target engine speed Ne* and the torque equal to or close to zero.

At step S314, the control CPU 190 substitutes the target engine torque Te* set at step S313 into another variable, for example, a working target torque WTe* and sets the target engine torque Te* equal to zero. The control CPU 190 subsequently determines a throttle valve position θa, an amount of fuel injection τ, and an ignition timing φ at step S315, in order to set the engine 150 in a specific driving state that is defined by the target engine speed Ne* and the target engine torque Te* equal to or close to zero. In accordance with a preferable procedure, the relationship between the target engine speed Ne*, the throttle valve position θa, the amount of fuel injection τ, and the ignition timing φ is determined experimentally and stored in advance as a map in the ROM 190b. At step S315, the throttle valve position θa, the amount of fuel injection τ, and the ignition timing φ corresponding to the target engine speed Ne* set at step S313 are read from the map.

The control CPU 190 then sets the torque command value Tm1* of the first motor MG1 and the torque command value Tm2* of the second motor MG2 at steps S316 and S318, respectively. The process of setting these torque command values Tm1* and Tm2* is described with the nomograms.

As discussed in the first embodiment, the nomogram of FIG. 17 shows the driving state in the motor driving mode. In order to start the engine 150 according to the engine-starting control routine, the driving state should be shifted from the state of FIG. 17 to the state of FIG. 25. The revolving speed Nr of the ring gear shaft 126 mechanically linked with the driving wheels 116 and 118 is constant in the motor driving mode. The revolving speed Ns of the sun gear shaft 125 is enhanced in the direction of normal rotation while the revolving speed Nr of the ring gear shaft 126 is fixed, so that the revolving speed Ne of the engine 150 is shifted to the target revolving speed Ne* set at step S313.

Figure 25:
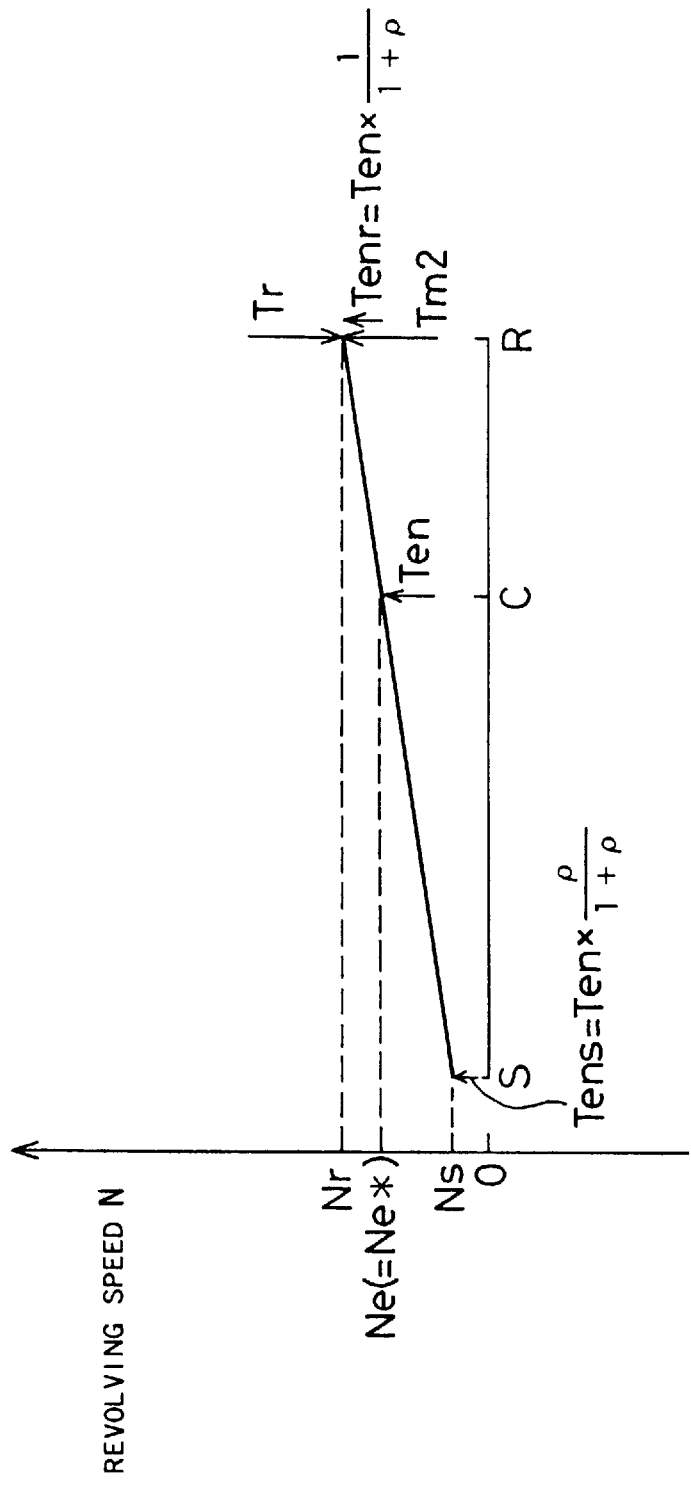
FIG. 25 is a nomogram showing the relationship between the revolving speed and the torque on the three shafts linked with the planetary gear 120 in the engine-starting control of the second embodiment.

In order to enable the engine 150 to be motored at the target revolving speed Ne*, as shown in FIG. 25, it is required to apply a torque Ten of certain magnitude onto the coordinate axis C, wherein the torque Ten allows the output shaft of the engine 150 to rotate at the target revolving speed Ne*. Since the engine 150 is at a stop, however, the required torque Ten can not be directly applied onto the coordinate axis C. Based on the technique of dividing the force into different lines of action having the same direction, the torque Ten that is to act on the coordinate axis C is divided into a torque Tens on the coordinate axis S and a torque Tenr on the coordinate axis R. The torques Tens and Tenr are then applied onto the coordinate axes S and R, respectively. The magnitudes of the torques Tens and Tenr are defined by Equations (17) and (18) given below:

$$Tens = Ten \times \frac{\rho}{1+\rho} \quad (17)$$

$$Tenr = Ten \times \frac{1}{1+\rho} \quad (18)$$

The torque Ten depends upon the structure of the engine 150, the volume of the cylinders, the viscosity of lubricating oil, and the other conditions, and has the value corresponding to the desired revolving speed of the engine 150. In accordance with a preferable procedure, the torque Ten corresponding to the target engine speed Ne* is calculated by taking into account the structure of the engine 150, the volume of the cylinders, and the viscosity of lubricating oil, and stored in advance as a map in the ROM 190b. The torque Ten corresponding to the target engine speed Ne* set at step S313 is then read from this map. Since the viscosity of lubricating oil is significantly varied with the temperature while the structure of the engine 150 and the volume of the cylinders are proper to the engine 150 and fixed, a preferable procedure determines the torque Ten as a value varied with the water temperature measured with the water temperature sensor 174.

The control CPU 190 accordingly sets the torque command value Tm1* of the first motor MG1 based on the desired torque Tens according to the following Equation (19) at step S316, and sets the torque command value Tm2* of the second motor MG2 based on the desired torque Tenr and the torque Tm2 (=Tr*) acting on the coordinate axis R in the motor driving mode according to the following Equation (20) at step S318:

$$Tm1^* \leftarrow Ten \times \frac{\rho}{1+\rho} \quad (19)$$

$$Tm2^* \leftarrow Ten \times \frac{1}{1+\rho} \quad (20)$$

The torque command value Tr* in Equation (20) represents the latest value obtained at step S104 in the operation control routine of FIG. 7. After setting the target torque Te* and target revolving speed Ne* of the engine 150 and the torque command values Tm1* and Tm2* of the first and the second motors MG1 and MG2, the program proceeds to steps S320 and S322 to control the first motor MG1 and the second motor MG2. Like the processing of steps S220 and S222 in the first embodiment, the control operations of the first motor MG1 and the second motor MG2 follow the control routine of the first motor MG1 shown in the flowchart of FIG. 14 and the control routine of the second motor MG2 shown in the flowchart of FIG. 15, respectively.

The control operations of steps S320 and S322 allow the engine 150 to be motored at the target revolving speed Ne*. The torque command value Tm2* of the second motor MG2 is set equal to a value obtained by subtracting the torque Tenr acting on the coordinate axis R at the time of motoring the engine 150. This structure effectively prevents a variation in torque on the drive shaft at the time of motoring.

The program then proceeds to subsequent steps to control the engine 150. The revolving speed of the engine 150 is controlled to the target engine speed Ne* at step S324 by outputting a driving signal of control based on the throttle valve position θa calculated at step S315 to the actuator 168 to regulate the amount of air intake into the engine 150.

The program then determines that the revolving speed Ne of the engine 150 is stabilized at the target engine speed Ne* and proceeds to step S330 to execute fuel injection control and ignition timing control and output driving signals to the fuel injection valve 151 and the igniter 158, thus starting the engine 150. The fuel injection control and the ignition timing control are carried out in response to the amount of fuel injection τ and the ignition timing φ calculated at step S315. In accordance with a concrete procedure, the control CPU 190 transmits an instruction to the EFIECU 170 through communication, and the EFIECU 170 determines the amount of fuel injection from the fuel injection valve 151 and the ignition timing with the igniter 158 based on the data of τ and φ, so as to implement the fuel injection control and the ignition timing control of the engine 150.

In the structure of the second embodiment, after the control of the revolving speed at step S324, the program automatically determines that the revolving speed Ne of the engine 150 is stabilized at the target engine speed Ne* and immediately carries out the control procedure of step S330 to start the engine 150. Like the processing of steps S226 and S228 of FIG. 18 in the first embodiment, however, another possible structure carries out the control procedure to start the engine 150 after ensuring that both the revolving speed Ne and the amount of air intake Q are stabilized. In this case, the steps of determining whether or not the actual revolving speed Ne of the engine 150 is greater than the target engine speed Ne* and determining whether or not the variation ΔQ in amount of air intake for a predetermined time period is smaller than the predetermined allowable variation ΔQmax are added for that purpose.

Figure 24:
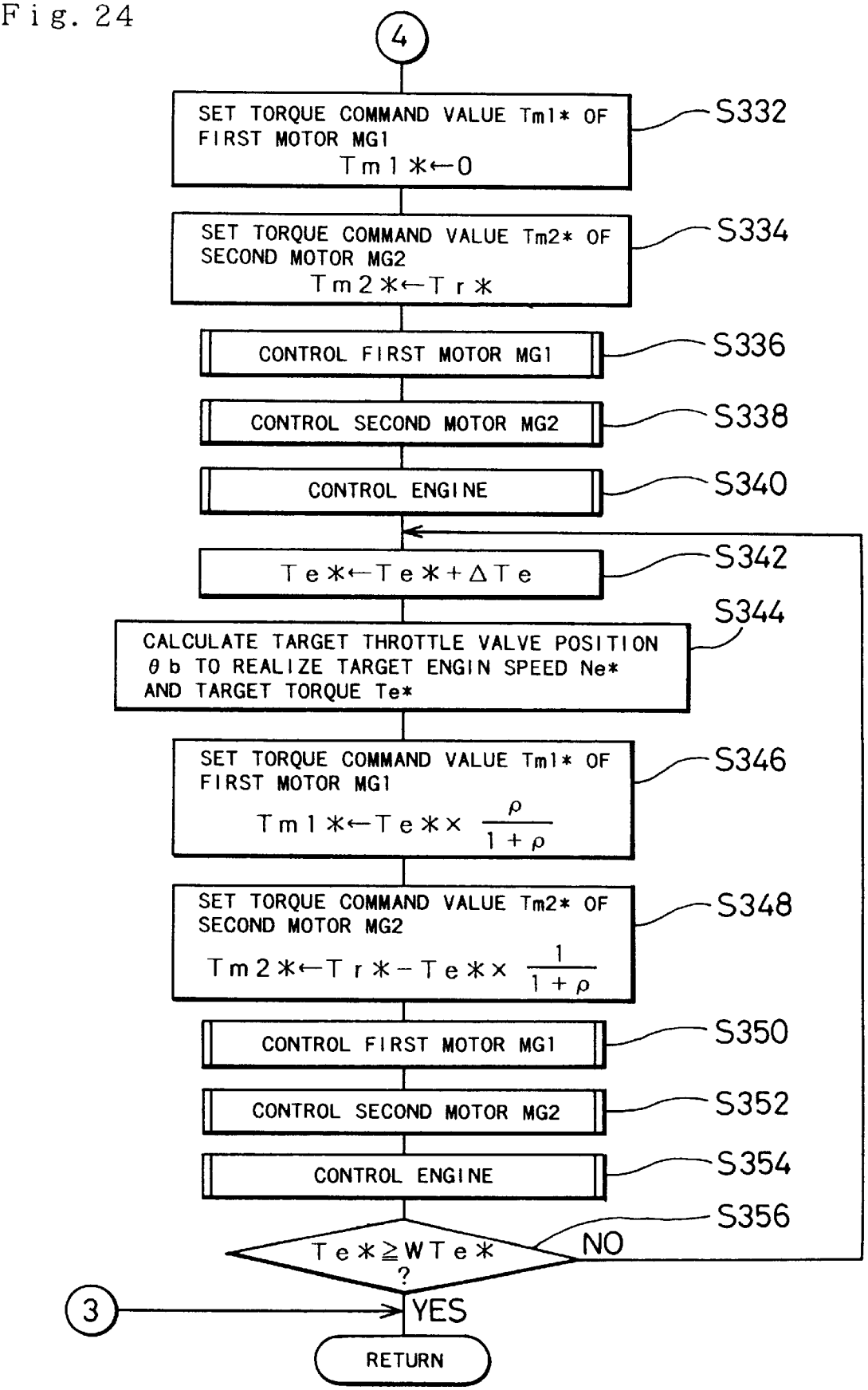

When the engine 150 starts, the program proceeds to steps S332 and S334 in the flowchart of FIG. 24, at which the control CPU 190 of the controller 180 removes the torques Tens and Tenr respectively applied onto the coordinate axes S and R for starting the engine 150. In accordance with a concrete procedure, the torque command value Tm1* of the first motor MG1 is set equal to zero, that is the result obtained by subtracting the torque Tens, at step S332, and the torque command value Tm2* of the second motor MG2 is set equal to the torque command value Tr*, that is the result obtained by subtracting the torque Tenr, at step S334. The program then proceeds to steps S336 and S338 to control the first motor MG1 and the second motor MG2 with the newly set torque command values.

The program subsequently goes to step S340 to control the engine 150. The torque Te and the revolving speed Ne of the engine 150 are controlled here, in order to enable the engine 150 to be stationarily driven at a specific driving point defined by the target engine speed Ne* set at step S313 and the target engine torque Te* (=0) set at step S314. In accordance with a concrete procedure, the control CPU 190 transmits an instruction to the EFIECU 170 through communication, and the EFIECU 170 increases or decreases the amount of fuel injection from the fuel injection valve 151 and the position of the throttle valve 166a, so as to keep the torque Te equal to zero and the revolving speed Ne equal to the target engine speed Ne*.

Figure 26:
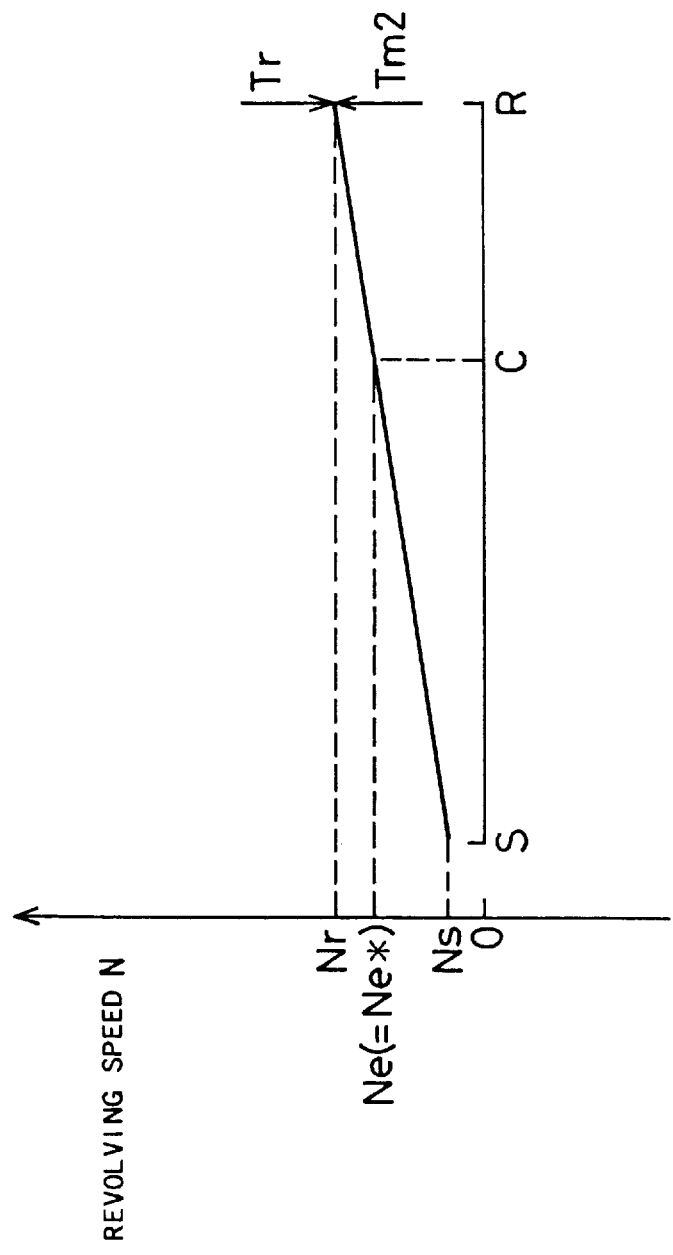
FIG. 26 is a nomogram showing the relationship between the revolving speed and the torque on the three shafts linked with the planetary gear 120 in the engine-starting control of the second embodiment.

The nomogram of FIG. 26 shows the state of the planetary gear 120 when the control of the first motor MG1 at step S336, the control of the second motor MG2 at step S338, and the control of the engine 150 at step S340 have been completed. Referring to FIG. 26, the torque Tm2 is applied onto the coordinate axis R, whereas the torque Te of the engine 150 acting on the coordinate axis C and the torque acing on the coordinate axis S are equal to zero. This enables the engine 150 to be stably driven in the driving state defined by the revolving speed equal to the target revolving speed Ne* and the torque equal to zero.

After conclusion of the processing at step S340, the program proceeds to step S342 and subsequent steps to change the output torque Te of the engine 150 from zero to the target engine torque Te* set at step S313.

At step S342, the target engine torque Te* is incremented by a small amount ΔTe. The control CPU 190 then determines a throttle valve position θb at step S344, in order to enable the engine 150 to be driven in the driving state defined by the target engine speed Ne* and the target engine torque Te*. In accordance with a preferable procedure, the relationship between the target engine speed Ne* and the throttle valve position θb is experimentally determined and stored in advance as a map in the ROM 190b. The throttle valve position θb corresponding to the target engine speed Ne* set at step S313 is then read from the map.

The control CPU 190 then sets the torque command value Tm1* of the first motor MG1 and the torque command value Tm2* of the second motor MG2 at steps S346 and S348, respectively. The process of setting these torque command values Tm1* and Tm2* is described with the nomograms.

Figure 27:
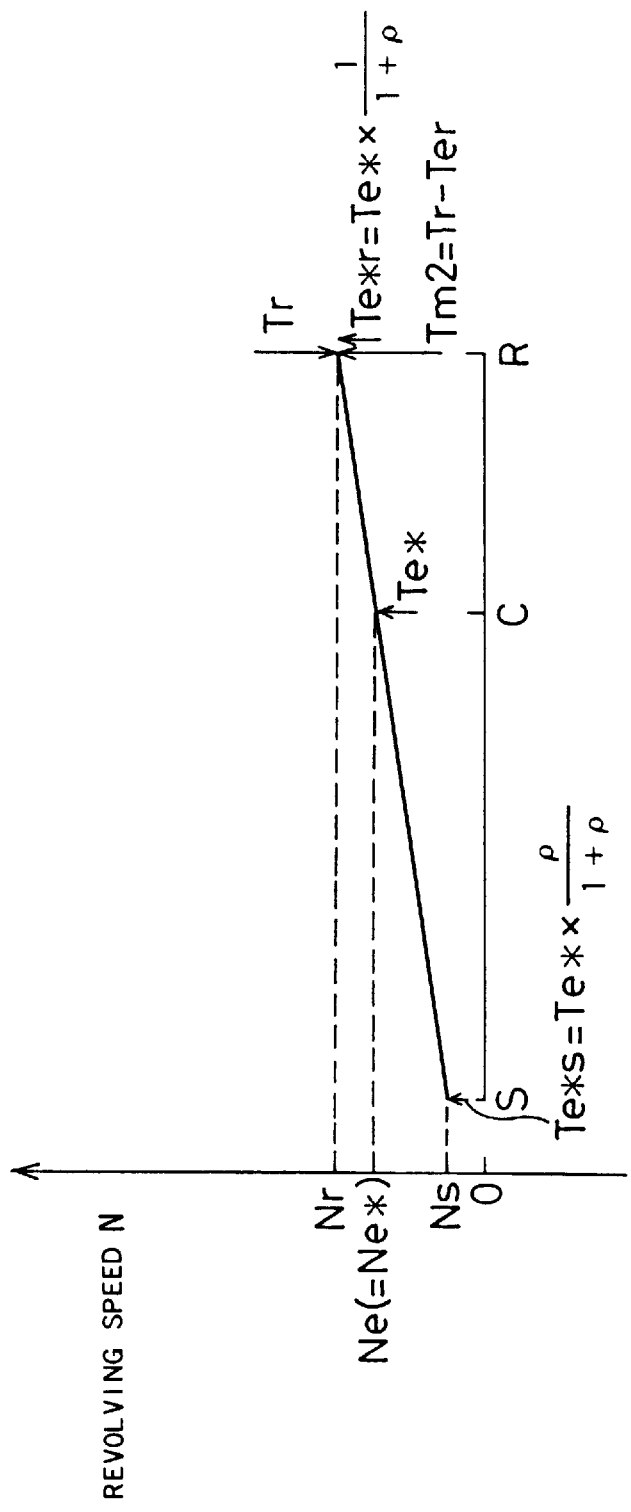
FIG. 27 is a nomogram showing the relationship between the revolving speed and the torque on the three shafts linked with the planetary gear 120 in the engine-starting control of the second embodiment.

The nomogram of FIG. 26 shows the state immediately before the process of step S346. When the output torque Te of the engine 150 is changed to the target engine torque Te*, the target engine torque Te* is applied (upward in the drawing) to the dynamic collinear line at the coordinate axis C of the planetary carrier 124 as a line of action. The nomogram of FIG. 27 shows this state. Based on the technique of dividing the force into different lines of action having the same direction, the target engine torque Te* acting on the coordinate axis C is divided into a torque Te*s on the coordinate axis S and a torque Te*r on the coordinate axis R. The magnitudes of the torques Te*s and Te*r are defined by Equations (21) and (22) given below:

$$Te^*s = Te^* \times \frac{\rho}{1 + \rho} \tag{21}$$

$$Te^*r = Te^* \times \frac{1}{1 + \rho} \tag{22}$$

The equilibrium of forces on the dynamic collinear line is essential for the stable state of the dynamic collinear line. In accordance with a concrete procedure, a torque Tm1 having the same magnitude as but the opposite direction to the torque Te*s is applied to the coordinate axis S, whereas a torque Tm2 having the same magnitude as but the opposite direction to a resultant force of the torque Te*r and the torque that has the same magnitude as but the opposite direction to the torque Tr output to the ring gear shaft 126 is applied to the coordinate axis R. The torque Tm1 is given by the first motor MG1, and the torque Tm2 by the second motor MG2. The first motor MG1 applies the torque Tm1 in reverse of its rotation and thereby works as a generator to regenerate an electrical energy Pm1, which is given as the product of the torque Tm1 and the revolving speed Ns, from the sun gear shaft 125. The second motor MG2 applies the torque Tm2 in the direction of its rotation and thereby works as a motor to output an electrical energy or power Pm2, which is given as the product of the torque Tm2 and the revolving speed Nr, to the ring gear shaft 126.

The control CPU 190 accordingly sets the torque command value Tm1* of the first motor MG1 based on the desired torque Te*s according to the following Equation (23) at step S346, and sets the torque command value Tm2* of the second motor MG2 based on the desired torque Te*r and the torque Tm2 (=Tr*) acting on the coordinate axis R in the motor driving mode according to the following Equation (24) at step S348:

$$Tm1^* = Te^* \times \frac{\rho}{1 + \rho} \tag{23}$$

$$Tm2^* = Tr^* - Te^* \times \frac{1}{1 + \rho} \tag{24}$$

The program then proceeds to steps S350 and S352 to control the first motor MG1 and the second motor MG2 with the torque command values set at steps S346 and S348, and goes to step S354 to control the engine 150. The torque Te and the revolving speed Ne of the engine 150 are controlled here, in order to enable the engine 150 to be driven at a specific driving point defined by the target engine speed Ne* set at step S313 and the target engine torque Te* incremented at step S342. In accordance with a concrete procedure, the control CPU 190 transmits an instruction to the EFIECU 170 through communication, and the EFIECU 170 increases or decreases the amount of fuel injection from the fuel injection valve 151 and the position of the throttle valve 166a, so as to keep the torque Te equal to the target engine torque Te* and the revolving speed Ne equal to the target engine speed Ne*.

After the control operation of the engine 150 is completed at step S354, the program proceeds to step S356, at which it is determined whether the target engine torque Te* has reached the working target torque WTe* set at step S314. When it is determined that the target engine torque Te* has not yet reached the working target torque WTe*, the program returns to step S342 to further increment the target engine torque Te* by the small amount ΔTe and repeat the processing of steps S344 through S354.

When it is determined that the target engine torque Te* has already reached the working target torque WTe* at step S356, on the other hand, the program determines that the process of changing the output torque Te of the engine 150 to the target engine torque Te* has been completed and goes to RETURN to exit from this engine-starting control routine.

Figure 28:
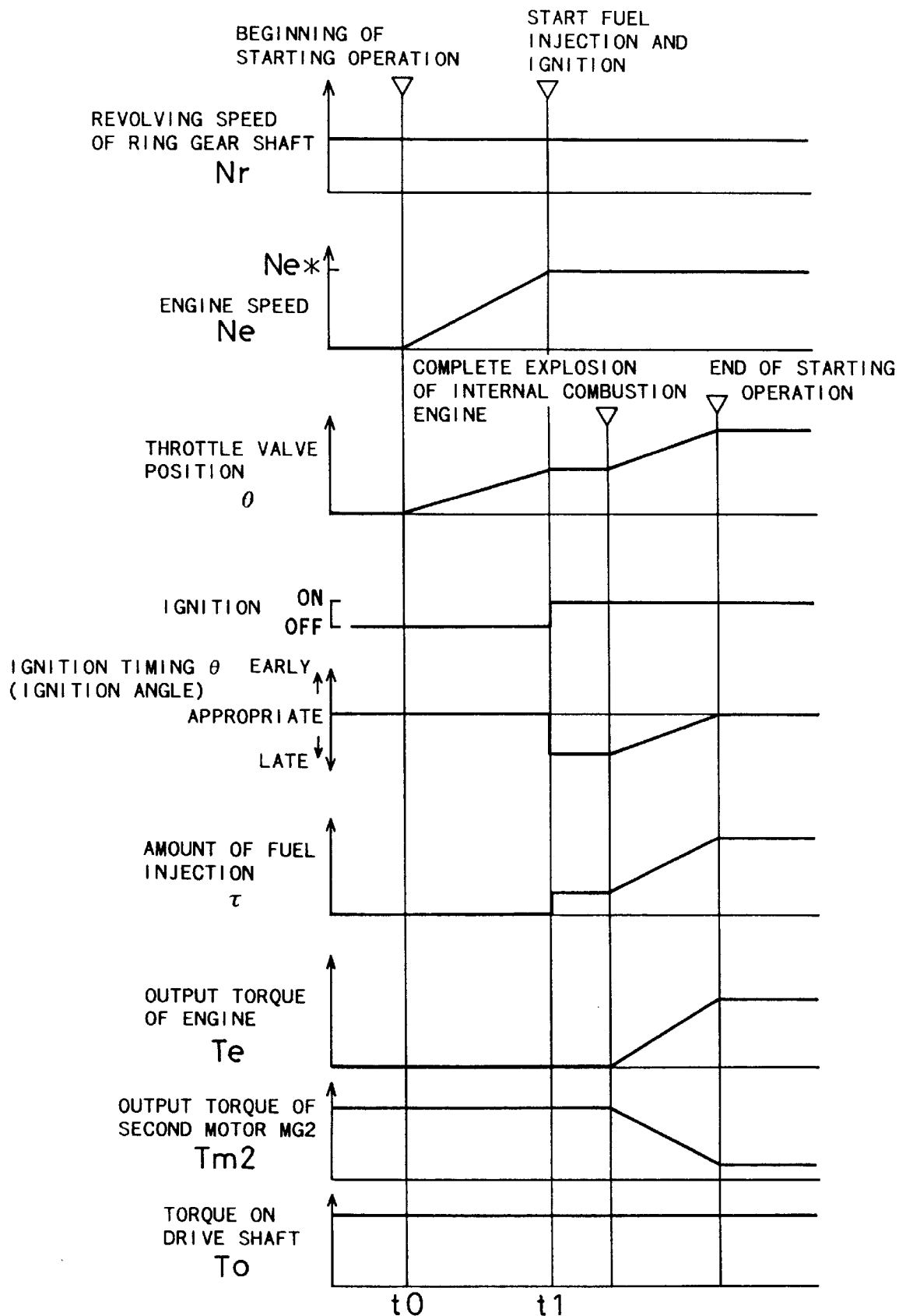
FIG. 28 is a timing chart showing a driving state of the engine started by the engine-starting control of the second embodiment.

FIG. 28 shows time-based variations in revolving speed Ne of the engine 150 at the starting time, throttle valve position θ, revolving speed Nr of the ring gear shaft 126, on-off condition of ignition, ignition timing (ignition angle) φ, amount of fuel injection τ, output torque Te of the engine 150, output torque is Tm2 of the second motor MG2, and torque To of the drive shaft 112, which are realized by the engine-starting control routine discussed above.

Referring to the timing chart of FIG. 28, the engine 150 of the second embodiment is driven and rotated by means of the first and the second motors MG1 and MG1 at the beginning of the engine-starting control (time point t0), reaches the target revolving speed Ne* within a short time (time point t1), and is stably maintained at the target level. The throttle valve position θ varies simultaneously in response to the revolving speed Ne of the engine 150. The fuel injection control and the ignition timing control are carried out in the specific state where the revolving speed Ne of the engine is equal to the target engine speed Ne* and the output torque Te of the engine 150 is equal to zero.

In the structure of the second embodiment, the output torque Te of the engine 150 is set equal to zero at the time of starting the engine 150. There is accordingly no variation in torque on the drive shaft 112 mechanically linked with the engine 150, which effectively reduces a shock to the vehicle. The structure of the second embodiment ensures remarkable stability of the revolving speed Ne and the throttle valve position θ immediately after the starting operation of the engine 150, and thereby readily realizes a preferable accuracy of control in the fuel injection control and the ignition timing control carried out with the stable revolving speed Ne and throttle valve position θ. This structure effectively reduces emission at the time of starting the engine 150, thus realizing preservation of the environment that is one object of hybrid automobiles.

As shown in FIG. 28, after the starting operation of the engine 150, the output torque Te of the engine 150 gradually increases (the output torque Te is incremented by the small amount ΔTe in the actual state although the variation is shown as a straight line in FIG. 28), whereas the output torque Tm2 of the second motor MG2 gradually decreases. The drive shaft 112, onto which both the output torque Te of the engine 150 and the output torque Tm2 of the second motor MG2 are applied, accordingly has a fixed torque. The driving force can thus be smoothly linked when the power source is switched from the motors MG1 and MG2 to the engine 150 after the starting operation of the engine 150.

The first motor MG1 and the second motor MG2 in the second embodiment correspond to the motors in claims. The motoring control means in claims is realized by the hardware of the controller 180 and the software executed by the controller 180, such as the processing of steps S320 and S322 in the engine-starting control routine. The calculation means in claims is functioned by the hardware of the controller 180 and the software executed by the controller 180, such as the processing of step S315 in the engine-starting control routine. The starter means in claims is functioned by the hardware of the fuel injection valve 151, the ignition plug 162, the ISCV 167a, and the controller 180 and the software executed by the controller 180, such as the processing of steps S324 through S330 in the engine-starting control routine.

3. Modifications

Figure 29:
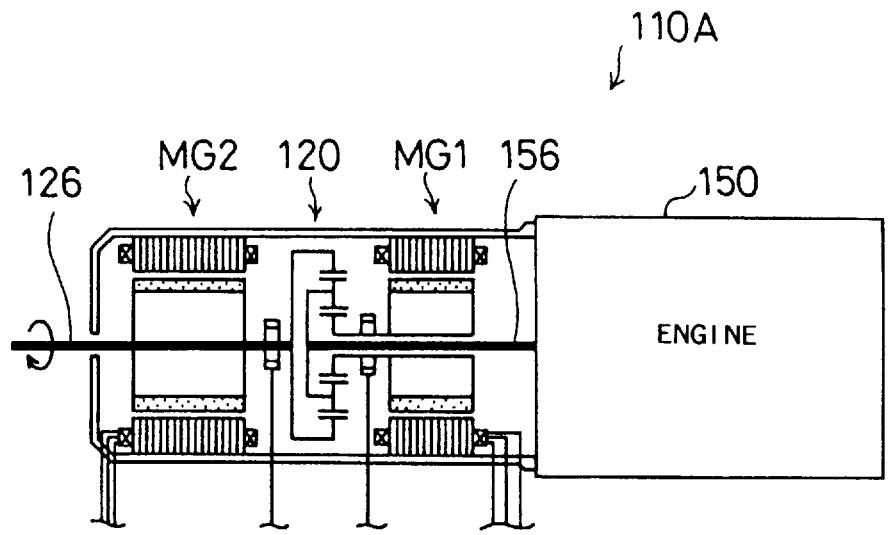
FIG. 29 schematically illustrates structure of another power output apparatus 110A as a modification of the power output apparatus 110 of the first embodiment.
Figure 30:
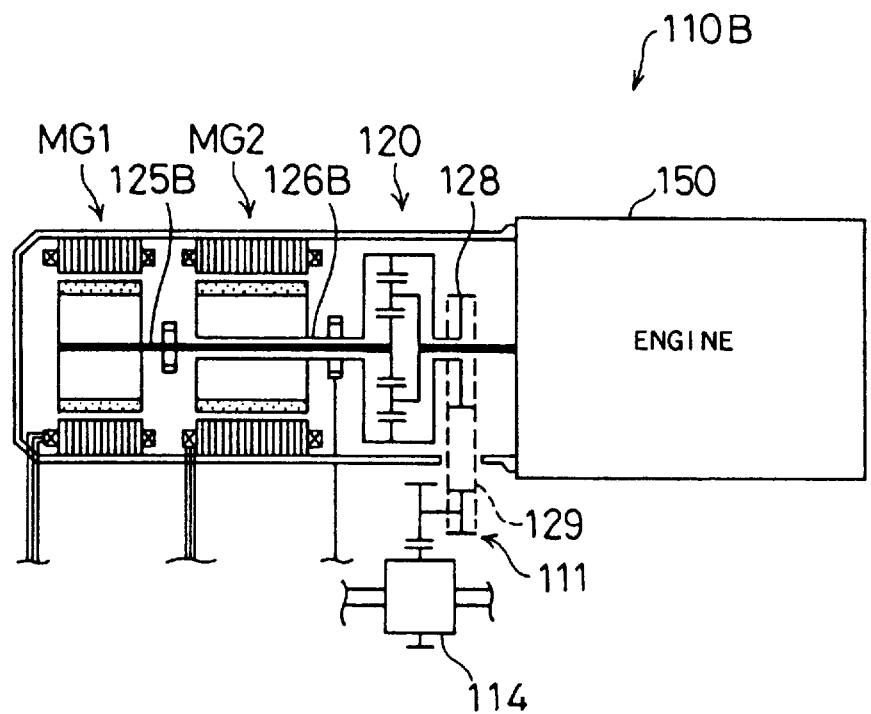
FIG. 30 schematically illustrates structure of still another power output apparatus 110B as another modification of the power output apparatus 110 of the first embodiment.

In the first and the second embodiments, the power output to the ring gear shaft 126 is taken out of the place between the first motor MG1 and the second motor MG2 via the power feed gear 128 connecting with the ring gear 122. As shown by another power output apparatus 110A of FIG. 29 given as a possible modification, however, the power may be taken out of the casing 119, from which the ring gear shaft 126 is extended. FIG. 30 shows still another a power output apparatus 110B as another possible modification, wherein the engine 150, the planetary gear 120, the second motor MG2, and the first motor MG1 are arranged in this order. In this case, a sun gear shaft 125B may not have a hollow structure, whereas a hollow ring gear shaft 126B is required. This modified structure enables the power output to the ring gear shaft 126B to be taken out of the place between the engine 150 and the second motor MG2.

Figure 31:
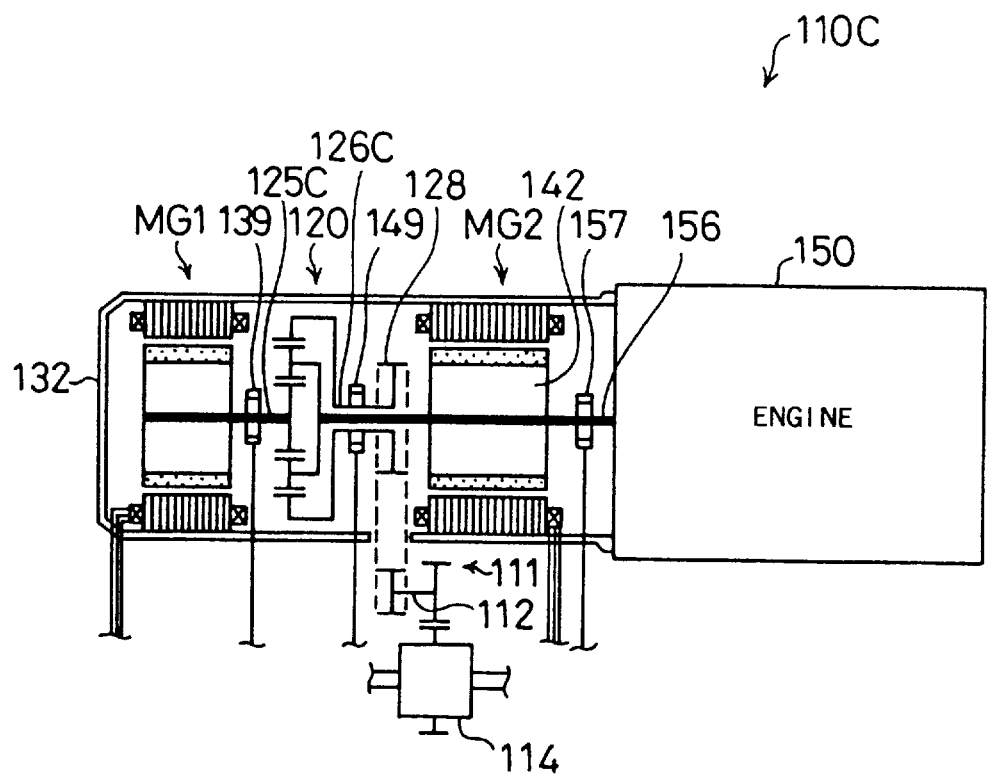
FIG. 31 schematically illustrates structure of another power output apparatus 110C as still another modification of the power output apparatus 110 of the first embodiment.

FIG. 31 shows another power output apparatus 110C as still another modification, wherein the rotor 142 of the second motor MG2 is attached to the crankshaft 156 and the positions of the first motor MG1 and the second motor MG2 are exchanged to arrange the engine 150, the second motor MG2, the planetary gear 120, and the first motor MG1 in this order. The input and output powers under such conditions, that is, the respective command values in each torque control procedure, can be readily obtained from the corresponding nomograms.

In the first and the second embodiments and these modifications (power output apparatuses 110A through 110C), the planetary carrier 124 of the planetary gear 120 is linked with the crankshaft 156, the sun gear shaft 125 is linked with the first motor MG1, and the ring gear shaft 126 is connected with the power transmission gear 111 having the drive shaft 112 via the power feed gear 128. The crankshaft 156, the first motor MG1, and the power transmission gear 111 may be linked in any combination with the three shafts of the planetary gear 120. The input and output powers under such conditions, that is, the respective command values in each torque control procedure, can be readily obtained from the corresponding nomograms.

In the embodiments discussed above, the revolving speed NS of the sun gear shaft 125 is regulated to the target revolving speed Ns* with the first motor MG1, in order to control the revolving speed Ne of the engine 150 to the target engine speed Ne*. The revolving speed NS of the sun gear shaft 125 may, however, be regulated to the target revolving speed Ns* with the first motor MG2, in order to control the torque Te of the engine 150 to the target engine torque Te*. This is because the torque Te and the revolving speed Ne of the engine 150 correlate to each other.

In the embodiments discussed above, permanent magnet (PM)-type synchronous motors are used for the first motor MG1 and the second motor MG2. Any other motors which can implement both the regenerative operation and the power operation, such as variable reluctance (VR)-type synchronous motors, vernier motors, d.c. motors, induction motors, superconducting motors, and stepping motors, may, however, be used according to the requirements.

Transistor inverters are used for the fist and the second driving circuits 191 and 192 of the above embodiments. Other available examples include IGBT (insulated gate bipolar mode transistor) inverters, thyristor inverters, voltage PWM (pulse width modulation) inverters, square-wave inverters (voltage inverters and current inverters), and resonance inverters.

The battery 194 in the above embodiments may include Pb cells, NiMH cells, Li cells, or the like cells. A capacitor may be used in place of the battery 194.

4. Third Embodiment
(1) Hardware Structure

Figure 32:
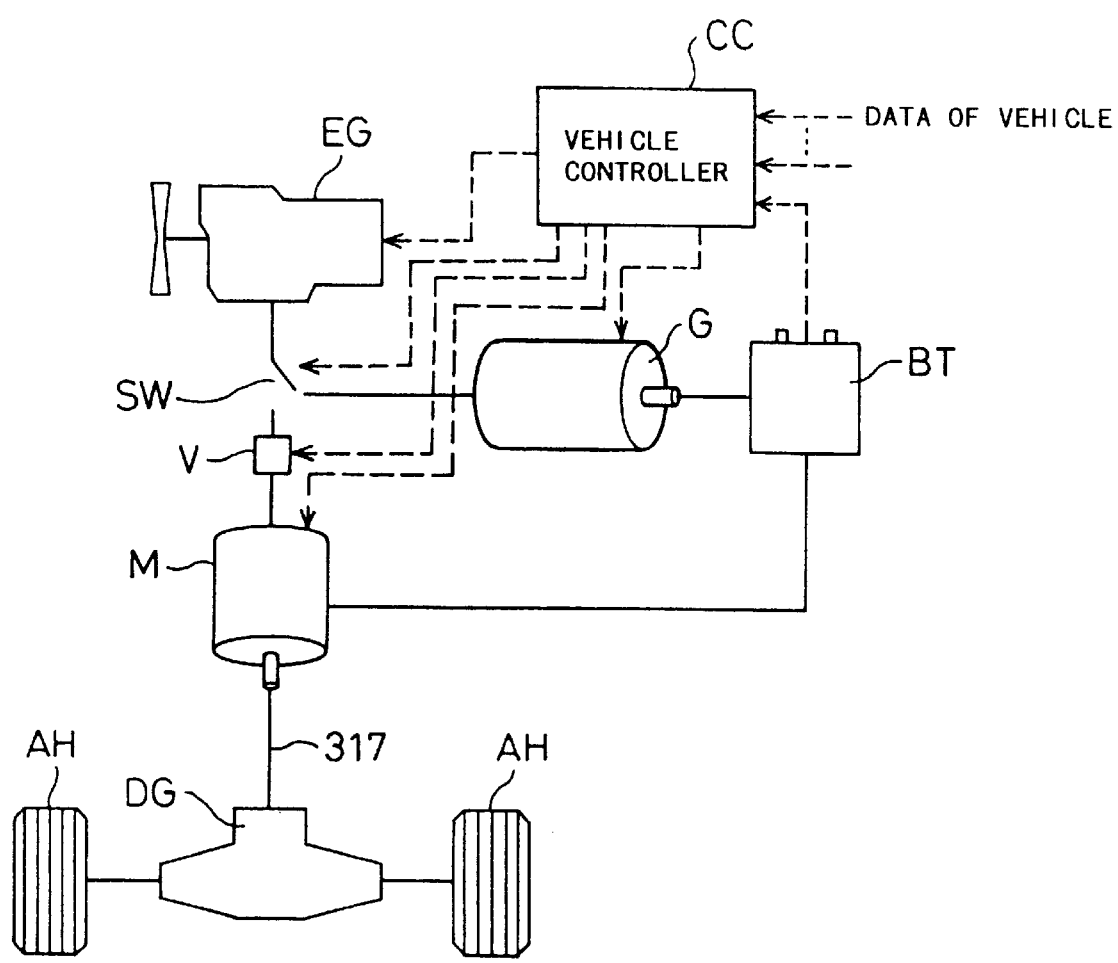
FIG. 32 schematically illustrates a vehicle with a starting control apparatus of a third embodiment according to the present invention mounted thereof.
Figure 33:
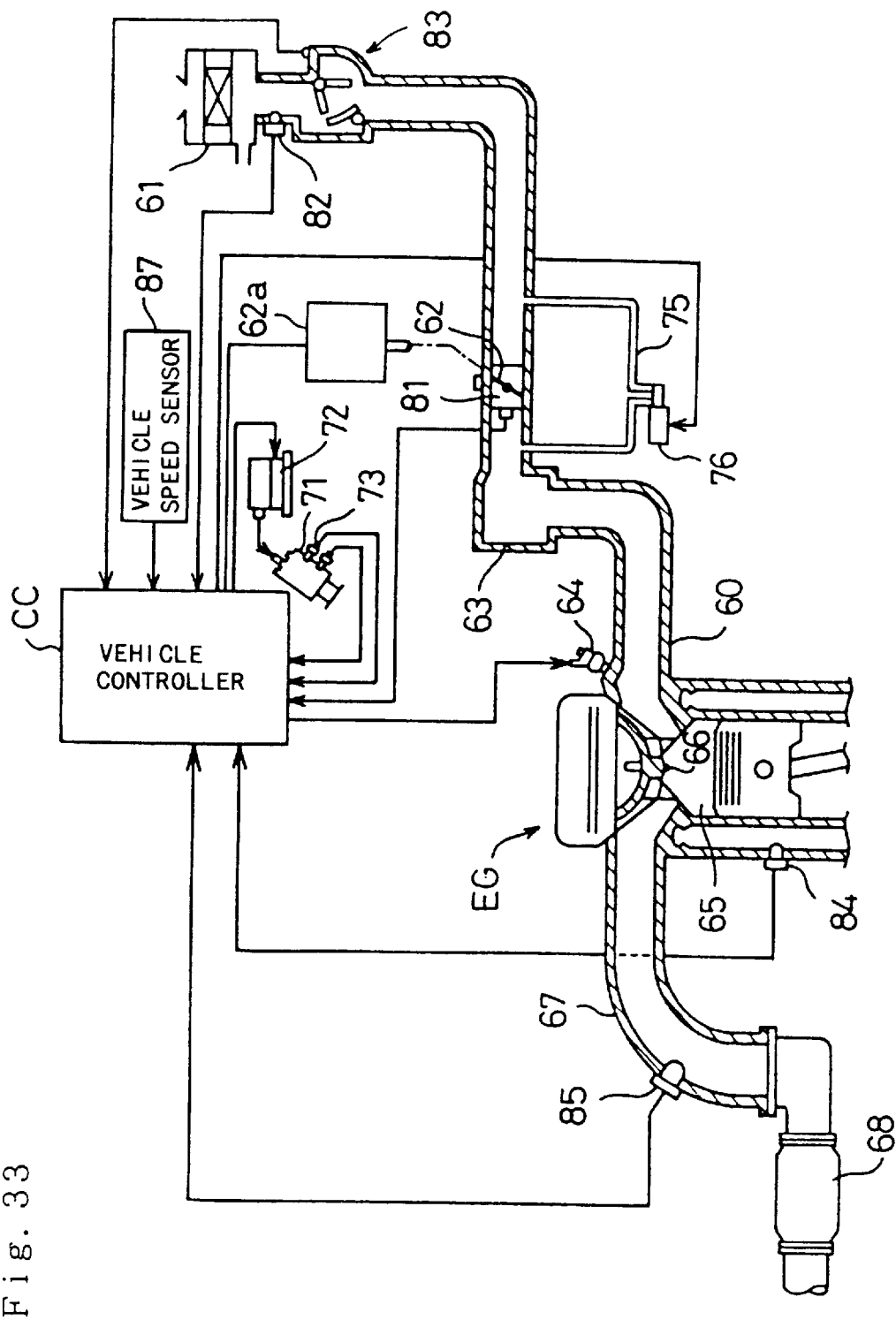
FIG. 33 schematically illustrates an engine EG and the peripheral constituents mounted on the vehicle.
Figure 34:
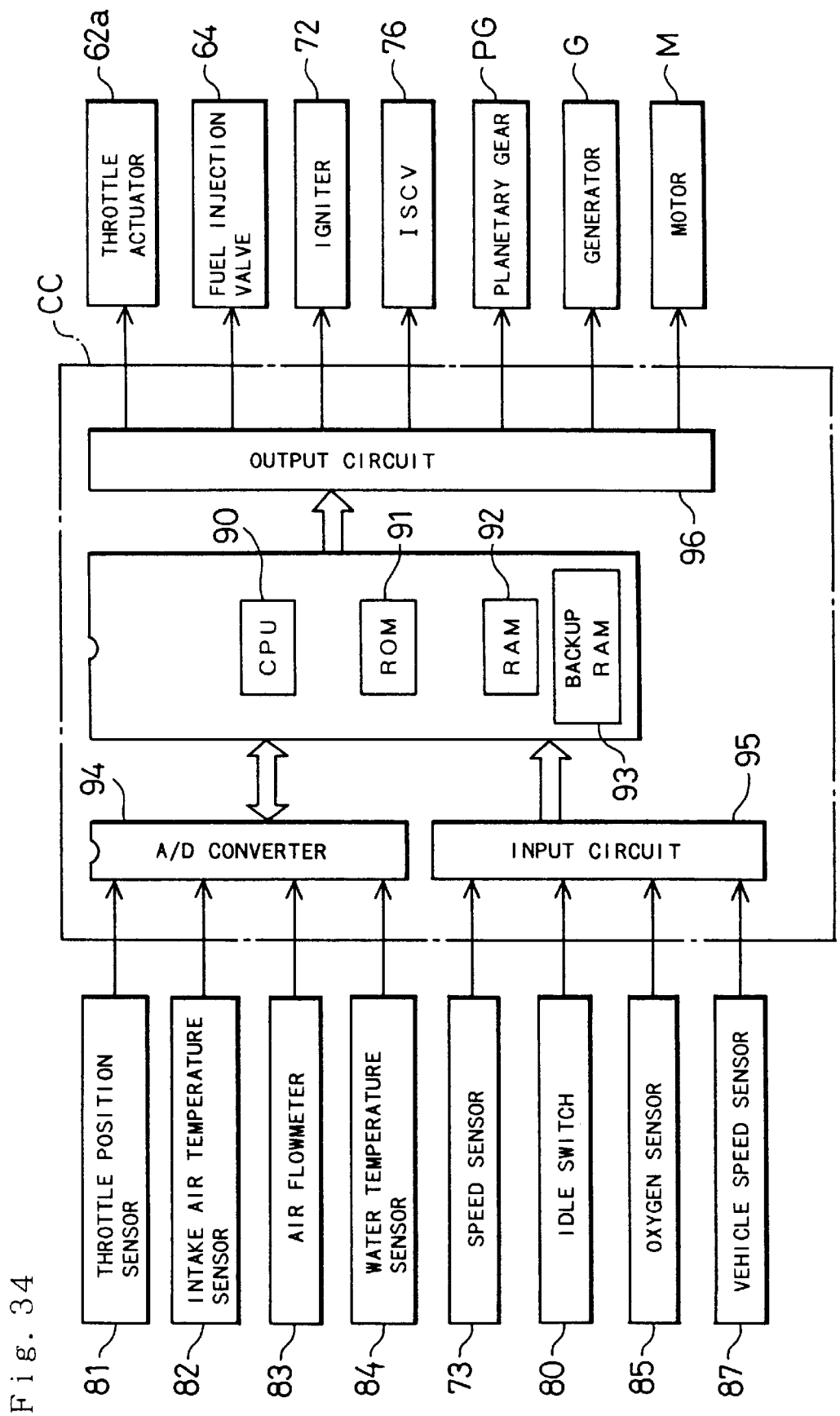
FIG. 34 is a block diagram showing an electrical structure of a vehicle controller CC and the other essential constituents.

FIG. 32 schematically illustrates a vehicle with a starting control apparatus of a third embodiment according to the present invention mounted thereof; FIG. 33 schematically illustrates an engine EG and the peripheral constituents mounted on the vehicle; and FIG. 34 is a block diagram showing an electrical structure of a vehicle controller CC and the other essential constituents.

The vehicle (hybrid automobile) has an engine EG that is driven with a supply of fuel fed from a fuel tank (not shown) and has an output shaft connecting with a linkage switching device SW. The linkage switching device SW is further linked with a generator G and a motor M, so that the rotational motion of the output shaft of the engine EG is transmitted to either the generator G or the motor M via the linkage switching device SW. A revolving speed regulator V is interposed between the linkage switching device SW and the motor M. An output shaft of the motor M is connected to a differential gear DG, which is further linked with driving wheels AH of the vehicle.

The linkage switching device SW switches the direction of linkage of the revolving shaft between two positions in response to a control signal output from a vehicle controller CC. The output of the engine EG is selectively transmitted to either the generator G or the motor M by switching the linkage switching device SW. The revolving speed regulator V is a gear mechanism that can regulate the revolving speed of the revolving shaft in response to a control signal output from the vehicle controller CC. The motor M is, for example, a d.c. brushless motor including a rotor with six pole-permanent magnets and a stator with three-phase windings. The generator G has a similar structure to that of the motor M. A variety of secondary cells, such as lead acid storage batteries, nickel-cadmium batteries, sodium-sulfur batteries, lithium secondary cells, hydrogen secondary cells, and redox cells, fuel cells, and capacitors with large capacity are applicable for a battery BT.

In the vehicle thus constructed, the linkage switching device SW is generally in a first position that links the output shaft of the engine EG with the generator G. The output of the engine EG is used to drive the generator G and charge the battery BT. The motor M is then driven with electric power supplied from the battery BT. Under this condition, the driving wheels AH are driven by the motor M, while the engine EG is used for charging the battery of the motor M.

When the linkage switching device SW is switched to a second position that links the output shaft of the engine EG with the motor M, rotations of a drive shaft 317 due to driving of the vehicle are transmitted to the output shaft of the engine EG. Regulation of the revolving speed regulator V enables the revolving speed of the output shaft of the engine EG to be controlled in a forcible manner. The output of the engine EG is kept at a constant level by switching the linkage switching device SW to the second position that links the output shaft of the engine EG with the motor M and making an amount of air intake into the engine EG constant. The revolving speed of the engine EG is then forcibly controlled by regulating the revolving speed regulator V.

Referring to FIG. 33, an air supply conduit 60 of the engine EG is provided with an inlet of the intake air, an air cleaner 61, a throttle valve 62 opened and closed by a throttle actuator 62*a*, a surge tank 63 for suppressing pulsation of the intake air, and a fuel injection valve 64 for feeding a supply of fuel to the engine EG.

The air ingested via the air supply conduit 60 is mixed with a fuel injected from the fuel injection valve 64. The air/fuel mixture is supplied into a combustion chamber 65 of the engine EG and ignited with a spark from an ignition plug 66 in the combustion chamber 65 to drive the engine EG. The emission or exhaust generated by the combustion in the combustion chamber 65 is led into a catalytic converter 68 via an exhaust conduit 67, purified, and discharged to the atmosphere.

A high voltage from an igniter 72 is applied to the ignition plug 66 via a distributor 71, and this timing of application of the voltage determines the ignition timing. The distributor 71 distributes the high voltage generated from the igniter 72 to ignition plugs 56 of the respective cylinders. The distributor 71 is provided with a speed sensor 73 for outputting twentyfour pulse signals per rotation.

The air supply conduit 60 of the engine EG is further provided with a bypass passage 75 that makes a circuit round a portion of air ingestion with the throttle valve 62. An ISCV 76 is disposed in the bypass passage 75. The ISCV 76 has a valve disc having an excellent high-speed response and its valve travel controlled by a linear solenoid, and outputs a duty signal, which has a duty ratio corresponding to a ratio of closing time to opening time of the valve disc, to the linear solenoid, so as to control the air flow with a high accuracy. The ISCV 76 enables the amount of intake air at the time of idling the engine EG to be controlled at a high speed without using the throttle actuator 62*a* that generally includes a large-sized DC motor.

The driving conditions of the engine EG are detected by a variety of sensors and input into the vehicle controller CC as data of the vehicle. These sensors include the speed sensor 73, a throttle position sensor 81 with an idle switch 80 (see FIG. 34) incorporated therein for measuring the position of the throttle valve 62 and detecting a full-close state of the throttle valve 62, an intake air temperature sensor 82 disposed in the air supply conduit 60 for measuring the temperature of the intake air, an air flowmeter 83 for measuring the flow of the intake air, a water temperature sensor 84 disposed in a cylinder block for measuring the temperature of cooling water, an oxygen sensor 85 disposed in the exhaust conduit 67 for measuring the concentration of oxygen included in the exhaust, and a vehicle speed sensor 86 for measuring the speed of the vehicle.

Referring to FIG. 34, the vehicle controller CC is constructed as a logical operation circuit including a microcomputer. The vehicle controller CC includes a CPU 90 for executing a variety of operations to control the engine EG according to preset control programs, a ROM 91, in which control programs and control data required for the variety of operations executed by the CPU 90 are stored in advance, a RAM 92, which a variety of data required for the various operations executed by the CPU 90 are temporarily written into and read from, a backup RAM 93 for maintaining data during power-off time, an A/D converter 94 and an input circuit 95 for receiving data of the vehicle, an output circuit 96 for outputting driving signals to the throttle actuator 62*a*, the fuel injection valve 64, the igniter 72, and the ISCV 76 based on the results of the operations by the CPU 90. The output circuit 96 outputs driving signals to the linkage switching device SW, the revolving speed regulator V, the generator G, and the motor M as well as the actuators included in the engine EG.

In the third embodiment, the vehicle controller CC having the above construction drives the fuel injection valve 64, the igniter 72, and the other related elements by optimal amounts at an optimum timing, that is, carries out fuel injection control and ignition timing control in order to drive the engine EG under desired conditions. The fuel injection control and the ignition timing control follow known procedures and are not specifically described here. When the vehicle of the embodiment starts its operation, the vehicle controller CC first determines whether or not preset driving conditions are fulfilled. In case that the required conditions are satisfied, the vehicle controller CC starts driving the engine and carries out the fuel injection control and the ignition timing control.

(2) Engine-starting Control

Figure 35:
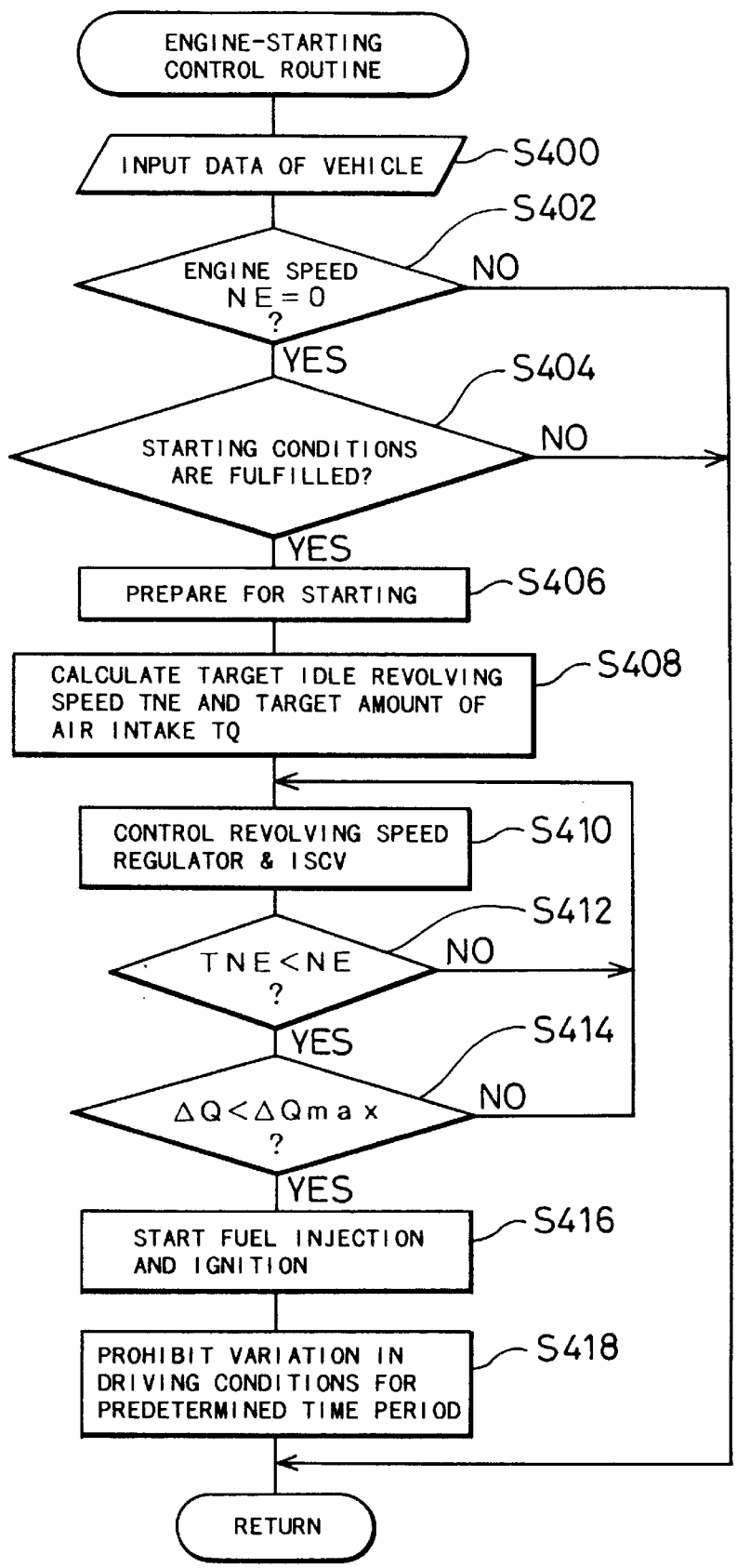
FIG. 35 is a flowchart showing an engine-starting control routine executed by the CPU 90 of the vehicle controller CC.

FIG. 35 is a flowchart showing an engine-starting control routine executed by the CPU 90 of the vehicle controller CC. The engine-starting control routine is repeatedly executed as an interrupting process at predetermined time intervals.

When the program enters the routine, the CPU 90 first receives the current data of the vehicle to grasp the driving conditions of the vehicle at step S400. Based on the input data regarding the vehicle, the CPU 90 first determines whether or not a revolving speed NE of the engine EG is equal to zero, that is, whether or not the engine EG is at a stop, at step S402 and subsequently determines whether or not starting conditions of the engine EG are fulfilled at step S404. In this embodiment, the engine EG is used exclusively for charging the power source of the motor M and is driven only when the remaining charge of the battery BT is lowered to or below a certain level. The starting conditions of the engine EG thus represent that the remaining charge of the battery BT is lowered to or below a certain level, that is, the voltage of the battery BT measured with a voltmeter (not shown) is equal to or lower than a predetermined level, and that the idle switch 80 is in ON position. When these starting conditions are not fulfilled, the program goes to RETURN and exits from the routine.

When these starting conditions are fulfilled and there is a requirement for starting the engine EG, the program proceeds to step S406 to prepare for starting the engine EG. The preparation for starting the engine EG switches the linkage switching device SW to the second position that links the output shaft of the engine EG with the motor M. When the linkage switching device SW is switched to the second position for linking the output shaft of the engine EG with the motor M, rotations of the drive shaft 317 due to driving of the vehicle are transmitted to the engine EG. This process establishes the driving system required for starting the engine EG. In this driving system, the revolving speed of the engine EG can be controlled forcibly through regulation of the revolving speed regulator V as mentioned previously.

After the completion of the processing at step S406, the program proceeds to step S408, at which the control CPU 90 calculates a target idle revolving speed TNE at the time of starting the engine EG and a target amount of air intake TQ required for maintaining the target idle revolving speed TNE, from the data of the vehicle input at step S400. A detailed procedure determines the target idle revolving speed TNE at the starting time which is optimal for the current state of the engine EG by taking into account a warm-up correction based on the detection result of the water temperature sensor 84 and an electrical loading correction set when a switch of headlights is in ON position. The target amount of air intake TQ is then calculated from the target idle revolving speed TNE thus obtained. The target amount of air intake TQ may alternatively be calculated from the detection result of the intake air temperature sensor 82 as well as the idle revolving speed TNE. The latter structure gives the target amount of air intake TQ with a higher accuracy by taking into account the density of the air that is varied with a change in temperature of the air.

At subsequent step S410, the control CPU 90 outputs driving signals based on the target idle revolving speed TNE and the target amount of air intake TQ to the revolving speed regulator V and the ISCV 76. In accordance with a concrete procedure, a driving signal of control based on the target idle revolving speed TNE is output to the revolving speed regulator V, so that the revolving speed of the engine EG is forcibly controlled to the target idle revolving speed TNE. A driving signal of control based on the target amount of air intake TQ is, on the other hand, output to the ISCV 76, so as to regulate the position of the ISCV 76 and change the amount of air intake into the engine EG to the target amount of air intake TQ.

At step S412, the actual revolving speed NE of the engine EG is compared with the target idle revolving speed TNE calculated at step S408. When NE is determined not to be greater than TNE, the program returns to step S410. At subsequent step S414, a variation $\Delta Q$ in amount of air intake for a predetermined time period is compared with a predetermined allowable variation $\Delta Q$max. When $\Delta Q$ is determined not to be smaller than $\Delta Q$max, the program returns to step S410. When the actual revolving speed NE is determined to be greater than the target idle revolving speed TNE at step S412 and the variation $\Delta Q$ in amount of air intake is determined to be smaller than the allowable variation $\Delta Q$max at step S414, the program determines that both the revolving speed NE of the engine EG and the amount of air intake Q are stabilized and proceeds to step S416 to execute fuel injection control and ignition timing control and output driving signals to the fuel injection valve 64 and the igniter 72, thus starting the engine EG. At subsequent step S418, the control CPU 90 prohibits variation in driving state for a predetermined time period, in order to continue the starting operation of the engine EG under the above conditions for the predetermined time period. The program then goes to RETURN to exit from this routine.

The time-based variation in revolving speed NE of the engine EG at the starting time and in amount of air intake Q, which is realized by the engine-starting control routine discussed above, practically follows the characteristic curve on the timing chart of the first embodiment shown in FIG. 22.

Referring to FIG. 22, the engine EG of the embodiment is driven and rotated by means of the motor M at the beginning of the engine-starting control, reaches the target idle revolving speed TNE within a short time (time point t1), and is stably maintained in the idling state. The amount of air intake Q varies on the identical characteristic curve in response to the revolving speed NE of the engine EG. The fuel injection control and the ignition timing control are carried out in the stable state (that is, the stationary state which the characteristic curve reaches in the graph of FIG. 22), where the revolving speed NE and the variation $\Delta Q$ in amount of air intake are respectively equal to the target idle revolving speed TNE and the allowable variation $\Delta Q$max.

The structure of the third embodiment ensures remarkable stability of the revolving speed NE and the amount of air intake Q at the time of starting the engine EG, and thereby readily realizes a preferable accuracy of control in the fuel injection control and the ignition timing control carried out with the stable revolving speed NE and amount of air intake Q. This structure effectively reduces emission at the time of starting the engine EG, thus realizing preservation of the environment that is one object of hybrid automobiles. The excellent control accuracy of the fuel injection control and the ignition timing control maintains the torque output from the engine EG at a substantially constant level. This results in substantially no variation in torque on the drive shaft 317 mechanically linked with the engine EG, thus reducing a shock to the vehicle.

In the third embodiment, the processing of step S418 in the engine-starting control routine prohibits variation in driving state of the engine EG for a predetermined time period after a start of the engine EG. The stable idling operation is accordingly continued until the catalytic converter 68 of the engine EG is activated. This further functions to preserve the environment.

In the structure of the third embodiment, the engine EG is exclusively used for charging the power source of the motor M, so that the engine EG is intermittently driven with a decrease in remaining charge of the battery BT. This means that there are many opportunities of starting the engine EG in such hybrid automobiles, and the effect of environmental preservation is thus fully exerted.

The motor M in the third embodiment corresponds to the driving device in claims. The motoring control means in claims is realized by the hardware of the revolving speed regulator V and the vehicle controller CC and the software executed by the vehicle controller CC, such as the processing of step S410 in the engine-starting control routine (control of the revolving speed regulator V). The calculation means in claims is functioned by the hardware of the vehicle controller CC and the software executed by the vehicle controller CC, such as the processing of step S408 in the engine-starting control routine. The starter means in claims is functioned by the hardware of the fuel injection valve 64, the ignition plug 66, and the vehicle controller CC and the software executed by the vehicle controller CC, such as the processing of steps S410 (control of the ISCV 76) through S416 in the engine-starting control routine.

5. Modifications

In the third embodiment, the bypass passage 75 is formed to make a circuit round the portion of air ingestion in the engine EG, and the amount of air intake at the idling time is controlled with the ISCV 76. In accordance with another possible structure, the throttle valve 62 is directly driven and rotated by the throttle actuator 62a. This latter structure does not require the bypass passage 75 and simplifies the construction of the engine EG.

In the third embodiment, the target idle revolving speed TNE is calculated from the warm-up correction based on the detection result of the water temperature sensor 84 and the loading correction of the headlights. The target idle revolving speed TNE may further be corrected to increase or decrease based on the voltages of the battery terminals, the driving conditions of the vehicle, the state of the atmosphere, and the temperatures in the respective parts of the engine. By way of example, a D range correction is set in response to a gear shift of an automatic transmission to a D range, or an air conditioning correction is set when a switch of an air conditions is in ON position.

Although the revolving speed for motoring the engine EG is set equal to the idle revolving speed TNE in the third embodiment, the engine EG may be motored at the revolving speed of the drive shaft 317 (corresponding to the vehicle speed). In this alternative structure, the revolving speed regulator V directly transmits the revolving speed. This structure also reduces the emission while preventing a variation in torque on the drive shaft 317.

The third embodiment relates to a hybrid automobile that utilizes a planetary gear mechanism to mechanically take the energy required for generating electricity and driving the motor out of the energy output from the engine and drives the axle with the residual energy. The starting control apparatus for an internal combustion engine according to the present invention may, however, be also applied to other hybrid automobiles. For example, the principle of the apparatus is applicable to another hybrid automobile that electrically takes the energy required for generating electricity and driving the motor out of the energy output from the internal combustion engine. Details of this latter structure are specified in JAPANESE PATENT LAID-OPEN GAZETTE Nos. 7-145575 and 7-225869 by the applicant of the present invention, wherein a clutch motor and an assist motor are attached to an output shaft of an internal combustion engine and the assist motor is driven with electric power regenerated by the clutch motor.

The starting control apparatus for an internal combustion engine according to the present invention is not restrictively applied to such hybrid automobiles, but is also applicable to the structure that has a motor exclusively used for motoring in a vehicle which drives the axle only with an internal combustion engine.

6. Others

The present invention is not restricted to the above embodiments or applications, but there may be many modifications, changes, and alterations without departing from the scope or spirit of the main characteristics of the present invention. The following are some examples of possible modification. For example, the principle of the invention is applicable to a variety of internal combustion engines, such as Diesel engines and turbine engines, other than the gasoline engines in the above embodiments. Although the starting control apparatus for an internal combustion engine according to the present invention is mounted on the vehicle in all of the above embodiments, it may be mounted on other transportation means like ships and airplanes as well as a variety of industrial machines.

It should be clearly understood that the above embodiments discussed above are only illustrative and not restrictive in any sense. The scope and spirit of the present invention are limited only by the terms of the appended claims.

What is claimed is:

1. A starting control apparatus for an internal combustion engine, said apparatus comprising:

an internal combustion engine having an output shaft;

a driving device linked with said output shaft;

motoring means for controlling said driving device and motoring said internal combustion engine at a predetermined revolving speed in response to a requirement for starting said internal combustion engine;

calculation means for calculating a value of a specified physical quantity among a plurality of physical quantities used for controlling said internal combustion engine, said value enabling said internal combustion engine to be stably driven at the predetermined revolving speed; and starter means for starting said motored internal combustion engine by a control corresponding to the value calculated by said calculation means.

2. A starting control apparatus in accordance with claim 1, wherein the predetermined revolving speed is an idle revolving speed.

3. A starting control apparatus in accordance with claim 1, wherein said driving device comprises:

a first motor having a revolving shaft;

a second motor connected in order to input and output a power from and to a drive shaft that is an object to be driven; and three shaft-type power input/output means having three shafts linked with said output shaft, said revolving shaft, and said drive shaft to allow transmission of powers therebetween, when powers input into or output from any two shafts among said three shafts are determined, said power input/output means automatically setting a power input into or output from a residual shaft based on the powers thus determined, said motoring means further comprising motor control means for controlling said first motor and said second motor, so as to enable said three shaft-type power input/output means to output a required power for motoring to said output shaft.

4. A starting control apparatus in accordance with claim 3, wherein said motor control means comprises:

means for controlling said first motor, which accordingly outputs a predetermined power; and means for controlling said second motor, in order to cancel a variation power applied to said drive shaft via said three shaft-type power input/output means.

5. A starting control apparatus in accordance with claim 1, said apparatus further comprising a drive shaft that is an object to be driven, said internal combustion engine being mechanically linked with said drive shaft, wherein the predetermined revolving speed is a revolving speed that is determined based on a revolving speed of said drive shaft, the value of said specified physical quantity calculated by said calculation means being a value that enables said internal combustion engine to be driven at said predetermined revolving speed with an output torque substantially equal to zero.

6. A starting control apparatus in accordance with claim 5, said apparatus further comprising:

target torque setting means for setting a target value of the output torque of said internal combustion engine as a target torque; and engine torque increase means for controlling said internal combustion engine, so as to enable the output torque of said internal combustion engine to gradually increase from substantially zero to said target torque, after said starter means starting said internal combustion engine.

7. A starting control apparatus in accordance with claim 6, said apparatus further comprising:

motor torque decrease means for controlling said motor, so as to enable an output torque of said motor to gradually decrease, while said engine torque increase means carrying out the control.

8. A starting control apparatus in accordance with claim 5, wherein said driving device comprises:

a first motor having a revolving shaft;

a second motor connected in order to input and output a power from and to a drive shaft that is an object to be driven; and three shaft-type power input/output means having three shafts linked with said output shaft, said revolving shaft, and said drive shaft to allow transmission of powers therebetween, when powers input into or output from any two shafts among said three shafts are determined, said power input/output means automatically setting a power input into or output from a residual shaft based on the powers thus determined, said motoring means comprising motor control means for controlling said first motor and said second motor, so as to enable said three shaft-type power input/output means to output a required power for motoring to said output shaft.

9. A starting control apparatus in accordance with claim 8, wherein said motor control means comprises:

means for controlling said first motor, which accordingly outputs a predetermined power; and means for controlling said second motor, in order to cancel a variation power applied to said drive shaft via said three shaft-type power input/output means.

10. A starting control apparatus in accordance with claim 8, said apparatus further comprising:

target power setting means for setting a target power to be input into said drive shaft and calculating said predetermined revolving speed and a target torque from said target power; and control means for controlling to enable said three shaft-type power input/output means, said first motor, and said second motor to output a power based on said internal combustion engine to drive shaft as the target power, after said starter means starting said internal combustion engine.

11. A starting control apparatus in accordance with claim 1, said apparatus further comprising:

a vehicle; and transmission means mounted on said vehicle for transmitting an output of said motor to an axle of said vehicle.

12. A starting control apparatus in accordance with claim 11, said apparatus further comprising:

a chargeable battery working as a power source of said motor;

a generator for receiving a rotational force of said internal combustion engine and generating electricity supplied to said battery; and operation timing determination means for determining an operation timing of said internal combustion engine according to a remaining charge of said battery.

13. A method of controlling a start of an internal combustion engine, said method comprising the steps of:

(a) motoring said internal combustion engine at a predetermined revolving speed in response to a requirement for starting said internal combustion engine; and (b) controlling a specified physical quantity among a plurality of physical quantities used for controlling said internal combustion engine, so as to enable said motored internal combustion engine to be driven at the predetermined revolving speed.

14. A method in accordance with claim 13, wherein the predetermined revolving speed is an idle revolving speed.

15. A method of controlling a start of an internal combustion engine, said method comprising the steps of:

(a) setting a target revolving speed at a time of starting said internal combustion engine based on a revolving speed of a drive shaft mechanically linked with said internal combustion engine, in response to a requirement for starting said internal combustion engine;

(b) motoring said internal combustion engine at the target revolving speed set in said step (a); and (c) controlling a specified physical quantity among a plurality of physical quantities used for controlling said internal combustion engine, so as to enable said motored internal combustion engine to be driven at said target revolving speed with an output torque substantially equal to zero.

16. A method in accordance with claim 15, said method further comprising the steps of:

(d) setting a target value of the output torque of said internal combustion engine as a target torque; and (e) controlling said internal combustion engine, so as to enable the output torque of said internal combustion engine to gradually increase from substantially zero to said target torque, after a start of said internal combustion engine.

* * * * *